(12) United States Patent
Nishimura

(10) Patent No.: US 6,970,294 B2
(45) Date of Patent: Nov. 29, 2005

(54) BEAM SPLITTING UNIT, BEAM-EMISSION-ANGLE COMPENSATING OPTICAL UNIT, AND LASER MARKING APPARATUS

(75) Inventor: Takashi Nishimura, Hitachinaka (JP)

(73) Assignee: Hitachi Koki Co., LTD, Tokyo (JP)

( * ) Notice: Subject to any disclaimer, the term of this patent is extended or adjusted under 35 U.S.C. 154(b) by 0 days.

(21) Appl. No.: 10/681,261

(22) Filed: Oct. 9, 2003

(65) Prior Publication Data

US 2004/0070820 A1    Apr. 15, 2004

(30) Foreign Application Priority Data

| Oct. 10, 2002 | (JP) | ............... P2002-297884 |
| Oct. 15, 2002 | (JP) | ............... P2002-301089 |
| Feb. 7, 2003  | (JP) | ............... P2003-031306 |
| Mar. 31, 2003 | (JP) | ............... P2003-094117 |

(51) Int. Cl.$^7$ .............................................. G02B 27/14
(52) U.S. Cl. ........................ 359/629; 359/618; 359/639
(58) Field of Search ................................ 359/589, 618, 359/629, 639; 33/227, 281, 282, 290

(56) References Cited

U.S. PATENT DOCUMENTS 4,850,686 A * 7/1989 Morimoto et al. .......... 359/196
5,461,513 A * 10/1995 Maruyama .................. 359/837

FOREIGN PATENT DOCUMENTS

JP          9-159451          6/1997

\* cited by examiner

*Primary Examiner*—Hung Xuan Dang
*Assistant Examiner*—Joseph Martinez
(74) *Attorney, Agent, or Firm*—McGuireWoods LLP

(57) ABSTRACT

A beam splitter is constructed from three light transmissive members formed of a glass or plastic that are bonded together to form a rectangular parallelepiped when taken as a whole. First and second light separating surfaces are formed at the bonding surfaces of the first and second light transmissive members and the bonding surfaces of the second and third light transmissive members, respectively. Accordingly, three light beams can easily be formed from a single beam of incident light.

14 Claims, 33 Drawing Sheets

BEAM SPLITTING UNIT, BEAM-EMISSION-ANGLE COMPENSATING OPTICAL UNIT, AND LASER MARKING APPARATUS

BACKGROUND OF THE INVENTION

1. Field of the Invention

The present invention relates to a beam splitting unit for dividing a single laser beam into a plurality of laser beams, a beam-emission-angle compensating optical unit for correcting a beam emission angle, and a laser marking apparatus used for indoor and outdoor marking operations in house construction work.

2. Description of Related Art

In house building and particularly in the beginning phase of construction, marking operations are essential for producing level lines needed to set reliable baselines for positioning various building members when machining the members and for installing the building members. Level instruments and other tools are used at the building site to achieve level measurements. A plurality of marks is made on the walls of target structure, and marking lines are formed by connecting these marks to produce the baselines for construction.

These marking lines include various line beams, such as vertical lines drawn from the floor over the wall and to the ceiling, perpendicular (right angle) lines drawn on the ceiling and made from two vertical lines, and horizontal lines drawn on the walls; ground mark dots formed on the floor; and the like.

Marking operations performed manually require at least two workers. Conventionally, marking operations have required much time and effort and have been inefficient. However, in order to overcome this problem, recently more efficient marking operations have been performed using a laser marking apparatus having a line beam irradiation function. Since one worker can easily perform marking operations using a laser marking apparatus, this apparatus is becoming an essential tool in construction work.

In order to improve the efficiency of marking operations using a laser marking apparatus, it is desirable to be able to irradiate a plurality of marking lines with a single laser marking apparatus. Hence, devices capable of irradiating two or more lines with a single apparatus are now being proposed.

Systems known in the art for irradiating a plurality of lines from a single laser marking apparatus include a system using a plurality of laser light sources and a system that obtains a plurality of lines by dividing a laser beam emitted from a single laser light source.

The former system is problematic in that the cost of the apparatus increases as more laser light sources are added.

On the other hand, the latter system uses a light-emitting optical system constructed of a plurality of half mirrors arranged serially in the laser emitting direction. An example of such a system is disclosed in Japanese patent application publication No. HEI-9-159451. In this system, however, the intensity of the light is cut in half after passing through the first half mirror and is reduced by halt again when passing through the second half mirror. Since the intensity of the light is gradually reduced when passing through each of the half mirrors in this way, the light intensity of the resulting divided beams is different from each other. Hence, a different brightness is obtained for each of the plurality of line beams. Further, a plurality of half mirrors must be arranged to divide the beam, thereby increasing the complexity of the optical system and, moreover, increasing the number of optical elements.

Accordingly, most conventional laser marking apparatuses capable of irradiating a plurality of line beams are equipped with a laser light source for each line beam generated. However, as described above, the cost of the apparatus rises as the number of light sources increases. As a result, an expensive apparatus is required to perform efficient marking operations.

The line directing precision of the laser marking apparatus becomes higher as the line beams irradiated by the laser marking apparatus approach ideal horizontal and vertical lines. In the conventional laser marking devices using the plurality of laser light sources, therefore, it is necessary to perform optical adjustments onto an optical system mounted in each laser light source in order to achieve good precision in directing lines. However, a lot of time and effort is required for assembling and adjusting these optical systems, thereby increasing the costs of the entire apparatus.

In the light-emitting optical system constructed of the plurality of half mirrors arranged serially in the laser emitting direction as disclosed in the Japanese patent application publication No. HEI-9-159451, it is necessary to finely adjust the angles at which the half mirrors are disposed in order to adjust the light-emission angle, at which light is emitted. This increases the complexity of the mechanism and the number of parts required therein. It is difficult to increase the precision for directing emitted light in this system disclosed in this publication, since this system has no particular mechanism for adjusting the angles of the half mirrors.

SUMMARY OF THE INVENTION

In view of the foregoing, it is an object of the present invention to provide a beam splitting unit having a simple construction that is capable of forming a plurality of beams from a single laser beam. It is another object of the present invention to provide a low cost laser marking apparatus equipped with the above-described beam splitting unit and capable of emitting a plurality of line beams. It is still another object of the present invention to provide a simple beam-emission-angle compensating optical unit for correcting the beam emission angle and a laser marking apparatus equipped with this correcting unit.

In order to attain the above and other objects, the present invention provides a beam splitting unit for obtaining a plurality of separated light beams from a single light beam, comprising: a plurality of light-separating portions, each light-separating portion separating incident light into transmitted light and reflected light; and a maintaining portion maintaining positional relationship among the plurality of light-separating portions into a predetermined positional relationship that allows the plurality of light-separating portions to cooperate to generate a plurality of separated light beams from a single light beam that originally falls incident on one of the plurality of light-separating portions.

According to another aspect, the present invention provides a laser marking apparatus comprising: a laser generating a light beam; a beam splitting unit receiving the light beam generated by the laser and generating a plurality of separated light beams, the beam splitting unit including: a plurality of light-separating portions, each light-separating portion separating incident light into transmitted light and reflected light; and a maintaining portion maintaining positional relationship among the plurality of light-separating portions into a predetermined positional relationship that allows the plurality of light-separating portions to cooperate to generate a plurality of separated light beams from a single light beam that originally falls incident on one of the plurality of light-separating portions; a plurality of line-beam-generating optical elements, each line-beam-generating optical element generating a line beam from a corresponding one of the is plurality of light beams generated by the beam splitting unit; and a support unit supporting the laser, the beam splitting unit, and the plurality of line-beam-generating optical elements.

According to another aspect, the present invention provides a beam-emission-angle compensating optical unit for correcting a beam emission angle, comprising: an optical element formed of a light-transmissive member having a refractive index n, including: a light incident surface receiving an incident light beam in an incident beam direction which is defined with respect to a reference axis; and a light emitting surface emitting an output light beam in an output beam direction which is defined with respect to the reference axis, the light incident surface and the light emitting surface forming an angle $\alpha$ therebetween and defining an imaginary normal plane, which is orthogonal to both the light incident surface and the light emitting surface and which extends along the reference axis, the output beam direction being shifted by an angle $\delta$ from the incident beam direction, the angle $\delta$ having a value that depends on the refractive index n, the angle $\alpha$, and a rotational position of the imaginary normal plane relative to the reference axis.

According to another aspect, the present invention provides a beam-emission-angle compensating optical unit for correcting a beam emission angle, comprising: an optical element formed of a light-transmissive member having a refractive index n, including: a light incident surface receiving an incident light beam in an incident beam direction which is defined with respect to a reference axis; and a light emitting surface emitting an output light beam in an output beam direction which is defined with respect to the reference axis, the light incident surface and the light emitting surface forming an angle $\alpha$ therebetween, the angle $\alpha$ having a value that depends on the refractive index n.

According to another aspect, the present invention provides a beam-emission-angle compensating optical unit for correcting a beam emission angle, comprising: a wedge prism formed of a light-transmissive member and including: a first surface receiving an incident light beam; and a second surface emitting an output light beam, the first surface and the second surface forming an apex angle $\alpha$; and a holding unit holding the wedge prism such that the wedge prism is capable of rotating about a reference axis, the holding unit holding the wedge prism at a rotational angle about the reference axis from a reference rotational position.

According to another aspect, the present invention provides a laser marking apparatus comprising: a laser generating a light beam; a collimating optical element collimating the light beam into a collimated light beam; a beam-emission-angle compensating optical unit receiving the collimated light beam, as an incident light beam, and correcting a beam emission angle by outputting an output light beam, the beam-emission-angle compensating optical unit having: an optical element formed of a light-transmissive member having a refractive index n, including: a light incident surface receiving the incident light beam in an incident beam direction which is defined with respect to a reference axis; and a light emitting surface emitting the output light beam in an output beam direction which is defined with respect to the reference axis, the light incident surface and the light emitting surface forming an angle $\alpha$ therebetween and defining an imaginary normal plane, which is orthogonal to both the light incident surface and the light emitting surface and which extends along the reference axis, the output beam direction being shifted by an angle $\delta$ from the incident beam direction, the angle $\delta$ having a value that depends on the refractive index n, the angle $\alpha$, and a rotational position of the imaginary normal plane relative to the reference axis; a line-beam-generating optical element generating a line beam from the output light beam from the beam-emission-angle compensating optical unit; and a support unit supporting the laser, the collimating optical element, the beam-emission-angle compensating optical unit, and the line-beam-generating optical element.

According to another aspect, the present invention provides a beam splitter for obtaining a plurality of separated light beams from a single light beam, comprising: a light-transmissive member unit having three light-transmissive members, the three light-transmissive members are bonded with each other on two bonding surfaces, the two bonding surfaces including first and second bonding surfaces; a first light-separating layer formed on the first bonding surface within the light-transmissive member unit, the first light-separating layer separating incident light into reflected light and transmitted light, the first light-separating layer defining a first light-separating surface; a second light-separating layer formed on the second bonding surface within the light-transmissive member unit, the second light-separating layer separating either one of the transmitted light and the reflected light from the first light-separating layer into reflected light and transmitted light, the second light-separating layer defining a second light-separating surface parallel to the first light-separating surface, thereby obtaining three separated light beams from a single light beam.

According to another aspect, the present invention provides a beam splitter for obtaining a plurality of separated light beams from a single light beam, comprising: a first light-transmissive member unit having a plurality of light-transmissive members, the plurality of light-transmissive members are bonded with each other on a plurality of bonding surfaces, the plurality of bonding surfaces including first, second, and third bonding surfaces; a second light-transmissive member unit disposed in contact with the first light-transmissive member unit, the second light-transmissive member unit having two light-transmissive members, the two light-transmissive members are bonded with each other on a fourth bonding surface; a third light-transmissive member unit disposed in contact with the first light-transmissive member unit, the third light-transmissive member unit having two light-transmissive members, the two light-transmissive members are bonded with each other on a fifth bonding surface; a first light-separating layer formed on the first bonding surface within the first light-transmissive member unit, the first light-separating layer separating incident light into reflected light and transmitted light, the first light-separating layer defining a first light-separating surface; a second light-separating layer formed on the second bonding surface within the first light-transmissive member unit, the second light-separating layer separating transmitted light from the first light-separating layer into reflected light and transmitted light, the second light-separating layer defining a second light-separating surface parallel to the first light-separating surface; a light-reflecting layer formed on the third bonding surface within the first light-transmissive member unit, the light-reflecting layer reflecting transmitted light from the second light-separating layer, the light-reflecting layer defining a light-reflecting surface parallel to the first light-separating surface; a third light-separating layer formed on the fourth bonding surface within the second light-transmissive member unit, the third light-separating layer separating reflected light from the first light-separating layer into transmitted light and reflected light, the third light-separating layer defining a third light-separating surface orthogonal to the first light-separating surface; and a fourth light-separating layer formed on the fifth bonding surface within the third light-transmissive member unit, the fourth light-separating layer separating reflected light from the light-reflecting layer into transmitted light and reflected light, the fourth light-separating layer defining a fourth light-separating surface parallel to the first light-separating surface, thereby obtaining five separated light beams from a single light beam.

According to another aspect, the present invention provides a beam splitter for obtaining a plurality of separated light beams from a single tight beam, comprising: a first light-transmissive member unit having a plurality of light-transmissive members, the plurality of light-transmissive members are bonded with each other on a plurality of bonding surfaces, the plurality of bonding surfaces including first and second bonding surfaces; a second light-transmissive member unit disposed in contact with the first light-transmissive member unit, the second light-transmissive member unit having two light-transmissive members, the two light-transmissive members are bonded with each other on a third bonding surface; a third light-transmissive member unit disposed in contact with the first light-transmissive member unit, the third light-transmissive member unit having two light-transmissive members, the two light-transmissive members are bonded with each other on a fourth bonding surface; a first light-separating layer formed on the first bonding surface within the first light-transmissive member unit, the first light-separating layer separating incident light into reflected light and transmitted light, the first light-separating layer defining a first light-separating surface; a light-reflecting layer formed on the second bonding surface within the first light-transmissive member unit, the light-reflecting layer reflecting transmitted light from the first light-separating layer, the light-reflecting layer defining a light-reflecting surface parallel to the first light-separating surface; a second light-separating layer formed on the third is bonding surface within the second light-transmissive member unit, the second light-separating layer separating reflected light from the first light-separating layer into transmitted light and reflected light, the second light-separating layer defining a second light-separating surface orthogonal to the first light-separating surface; and a third light-separating layer formed on the fourth bonding surface within the third light-transmissive member unit, the third light-separating layer separating reflected light from the light-reflecting layer into transmitted light and reflected light, the third light-separating layer defining a third light-separating surface parallel to the first light-separating surface, thereby obtaining four separated light beams from a single light beam.

According to another aspect, the present invention provides a beam splitting unit for obtaining a plurality of separated light beams from a single light beam, comprising; a first beam splitter formed with a first light-separating layer; a second beam splitter formed with a second light-separating layer; a holder main body mounted with the first beam splitter; and a movable holder mounted with the second beam splitter, the movable holder being movably mounted in the holder main body to maintain a positional relationship between the first and second light-separating layers into a predetermined positional relationship that allows the first and second light-separating layers to generate three separated light beams from the single light beam.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

Figure 1:
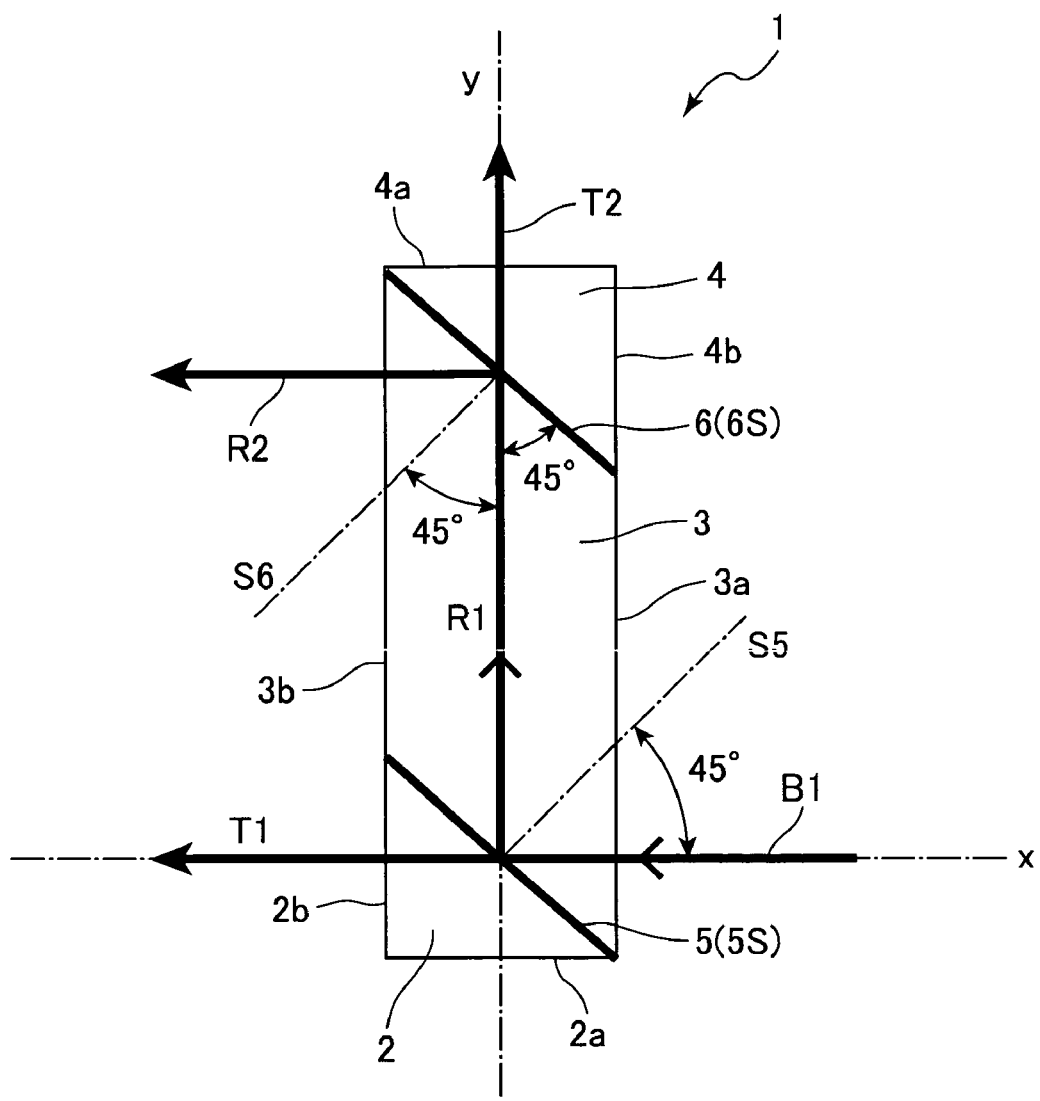
FIG. 1 is a side view showing the construction of a beam splitter according to a first embodiment of the present invention.

A beam splitting unit, a beam-emission-angle compensating optical unit, and a laser marking apparatus according to preferred embodiments of the present invention will be described while referring to the accompanying drawings wherein like parts and components are designated by the same reference numerals to avoid duplicating description.

<First Embodiment>

FIG. 1 shows a beam splitter 1 according to a first embodiment of the present invention. The beam splitter 1 is formed of a glass or plastic capable of transmitting light. In the present embodiment, the beam splitter 1 is formed of a BK7 glass material having a refractive index of 1.5. The beam splitter 1 is constructed of light transmissive members 2, 3, and 4 that are bonded or affixed together to form a rectangular parallelepiped when taken as a whole. More specifically, the light transmissive members 2, 3, and 4 are bonded or affixed by using fusion bond method or adhesive.

First and second light separating layers 5 and 6 are formed at the interface between the light transmissive members 2 and 3 and the interface between the light transmissive members 3 and 4, respectively The first and second light separating layers 5 and 6 define first and second light separating surfaces 5S and 6S. In the present embodiment, the first and second light separating surfaces 5S and 6S are formed parallel to one another with a distance of 40 mm separating the two. The beam splitter 1 has a length of 50 mm, a width of 10 mm, and a thickness of 7 min. A normal S5 of the first light separating surface 5S forms an angle of 45° with an optical axis x of an incident light B1. Similarly, a normal S6 of the second light separating surface 6S forms an angle of 45° with an optical axis y of an incident light R1.

A portion of the incident light B1 is reflected off the first light separating surface 5S and becomes the reflected light R1. The remaining light passes through the beam splitter 1 as transmitted light T1. A portion of the reflected light R1 is reflected off the second light separating surface 6S and becomes a reflected light R2. The remaining light in the reflected light R1 passes through the second light separating layer 6 and becomes a transmitted light T2.

Hence, the beam splitter 1 can easily form three beams of light, including the transmitted light T1 and reflected light R2 parallel to the incident light B1 and the transmitted light T2 that is orthogonal to the incident light B1.

More specifically, the beam splitter 1 includes the first light-separating portion 5 and the second light-separating portion 6. The first light-separating portion 5 receives the single light beam B1 falling incident thereon and separates the single light beam B1 into a transmitted light T1 and a reflected light R1. The second light-separating portion 6 receives the reflected light R1 from the first light-separating portion 5 and separates the received light into another transmitted light T2 and another reflected light R2. The beam splitter 1 also includes the main light-transmissive member 3 maintaining the positional relationship between the first light-separating portion 5 and the second light-separating portion 6 into the predetermined positional relationship that allows the reflected light R1 from the first light-separating portion 5 to reach the second light-separating portion 6. Accordingly, the beam splitting unit 1 can allow the first light-separating portion 5 and the second light-separating portion 6 to obtain three separated light beams T1, T2, R2 from the single light beam B1.

The main light-transmissive member 3 has a first surface 3a and a second surface 3b, which are parallel to each other. The first light-separating portion 5 is in the form of the first light-separating layer 5. The second light-separating portion 6 is in the form of the second light-separating layer 6. The beam splitting unit 1 further includes the first additional light-transmissive member 2 and the second additional light-transmissive member 4. The first additional light-transmissive member 2 is provided in contact with the first light-separating layer 5. The first light-separating layer 5 is located between the main light-transmissive member 3 and the first additional light-transmissive member 2. The second additional light-transmissive member 4 is provided in contact with the second light-separating layer 6. The second light-separating layer 6 is located between the main light-transmissive member 3 and the second additional light-transmissive member 4. The main light-transmissive member 3, the first additional light-transmissive member 2, and the second additional light-transmissive member 4 form a shape of a rectangular parallelepiped as a whole.

The first light-separating layer 5 defines the first light-separating surface 5S and the second light-separating layer 6 defines the second light-separating surface 6S The first light separating surface 5S forms an angle of 45° with the first surface 3a. The second light-separating surface 6S forms an angle of 45° with the first surface 3a. The first and second light-separating surfaces 5S, 6S are therefore parallel to each other. Each two separated light beams among the three separated light beams T1, T2, R2 have therefore either one of parallel and orthogonal relationships with each other.

The first surface 3a of the main light-transmissive member 3 receives the single light beam B1 falling incident thereto. The optical axis x of the light beam B1 is normal to the first surface 3a. The main light-transmissive member 3 guides the single light beam B1 to the first light-separating portion 5. The first additional light-transmissive member 2 has an end surface 2a and an end surface 2b. The end surface 2a is orthogonal to the first surface 3a and the second surface 3b. The end surface 2b is parallel to the first surface 3a and the second surface 3b. More specifically, the end surface 2b is on the same plane with the second surface 3b. The end surface 2b transmits the transmitted light beam T1 from the first light separating portion 5.

The main light-transmissive member 3 guides the reflected light R1 from the first light-separating portion 5 to the second light-separating portion 6. The second light-separating portion C receives the reflected light R1 from the first light-separating portion 5 and separates the received light R1 into the transmitted light T2 and the reflected light R2. The second additional light-transmissive member 4 has an end surface 4a and an end surface 4b. The end surface 4a is orthogonal to the first surface 3a and the second surface 3b and outputs the transmitted light T2 from the second light-separating layer 6. The end surface 4b is parallel to the first surface 3a and the second surface 3b. More specifically, the end surface 4b is on the same plane with the first surface 3a. The second surface 3b outputs the reflected light R2 from the second light-separating layer 6.

<First Modification>

Figure 2:
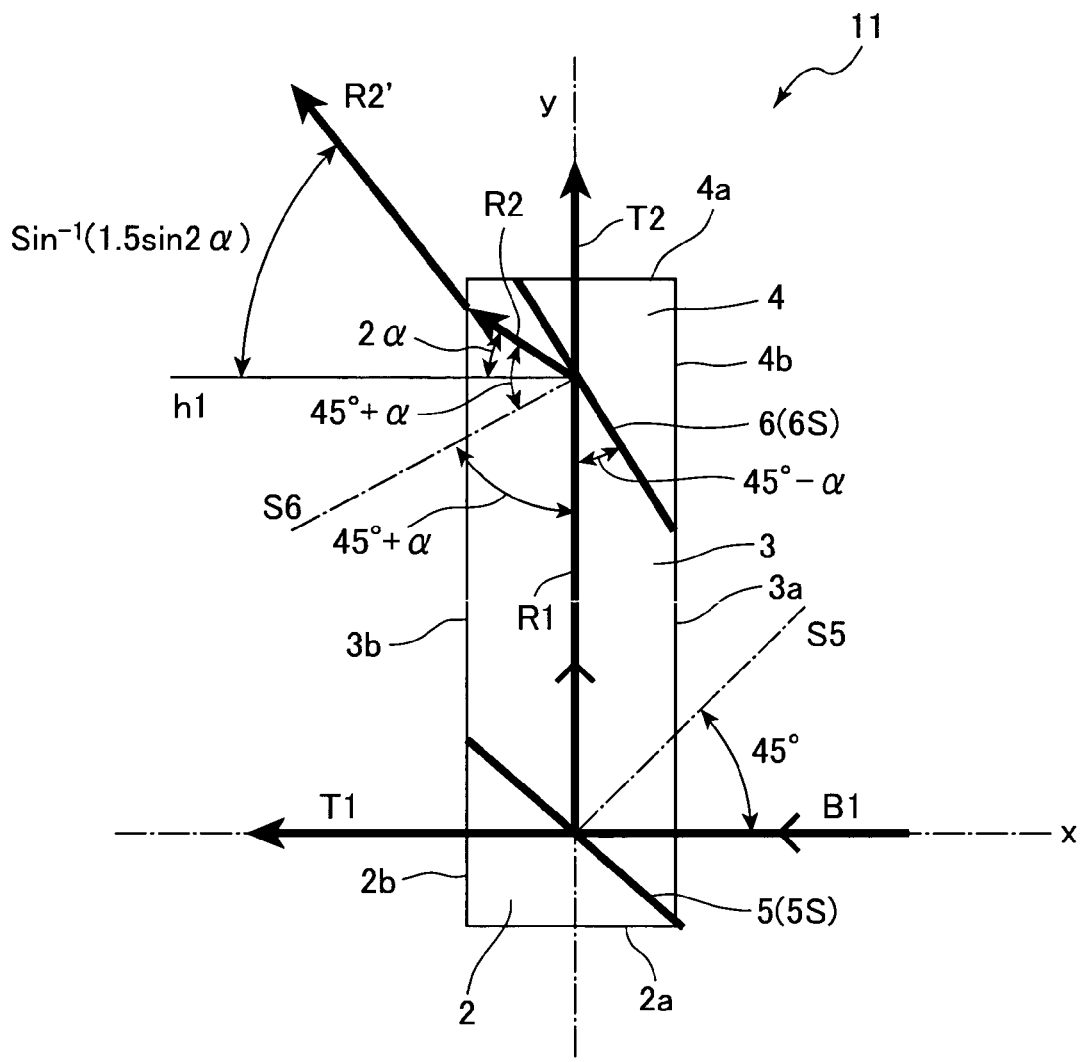
FIG. 2 is a side view showing the construction of a beam splitter according to a first modification of the first embodiment.

FIG. 2 shows a beam splitter 11 according to a first modification of the present embodiment.

According to this modification, the normal S5 to the first light separating surface 5S forms an angle of 45° with the optical axis x of the incident light B1, while the normal S6 to the second light separating surface 6S forms an angle of 45°+α (wherein 0°<α<45°) with the optical axis y of the reflected light R1. As in the first embodiment, the beam splitter 11 is configured of the light transmissive members 2, 3, and 4 that are bonded or affixed together to form a rectangular parallelepiped when taken as a whole. The first and second light separating layers 5 and 6 are formed at the interfaces between the light transmissive members 2 and 3 and the light transmissive members 3 and 4, respectively. While the normal S5 to the first light separating surface 5S forms an angle of 45° with the optical axis x of the incident light B1, the normal S6 to the second light separating surface 6S forms an angle of 45°+α with the optical axis y of the reflected light R1. In other words, the second light separating surface 6S forms an angle of 45°−α with the surface 3a. Therefore, the reflected light R2 forms an angle of 45°+α with the normal S6. That is, the reflected light R2 forms an angle of 2(45°+α) with the reflected light R1. Therefore, the reflected light R2 forms an angle of 2(45°+α)−90°=2α with a horizontal line h1, The reflected light R2 is refracted when transmitting the surface 3b and becomes a reflected light R2', From Snell's law, the reflected light R2' forms an angle of $\sin^{-1}(1.5 \sin 2\alpha)$ with the horizontal line h1 with this construction, the beam splitter 1 can easily form not only light beams parallel to and orthogonal to the incident light, but also a light beam having an arbitrary angle.

<Second Modification>

Figure 3:
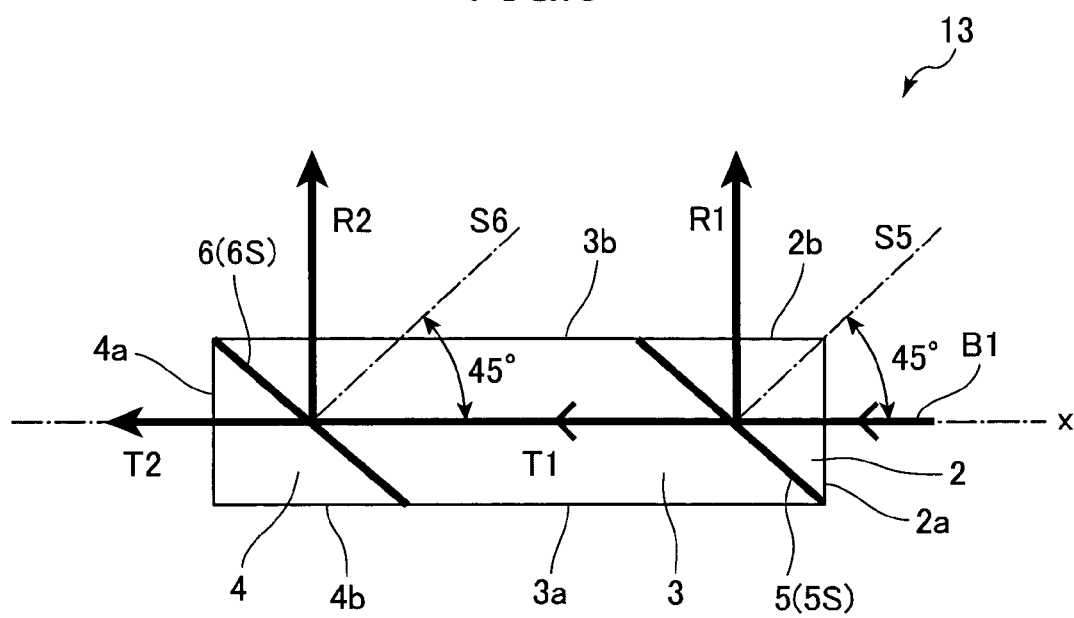
FIG. 3 is a side view showing the construction of a beam splitter according to a second modification of the first embodiment.

FIG. 3 shows a beam splitter 13 according to a second modification of the present embodiment. The beam splitter 13 has the same structure as the beam splitter 1 shown in FIG. 1. However, incident light strikes the end surface 2a of the beam splitter 13. The optical axis x of the incident light is normal to the end surface 2a. The normal S5 to the first light separating surface 5 forms an angle of 45° with the optical axis x of the incident light B1. Similarly, the normal S6 to the second light separating surface 6 forms an angle of 45° with the optical axis x of the incident light B1.

The incident light B1 travels in the longitudinal direction of the parallelepiped. A portion of the incident light B1 becomes the reflected light R1 when reflected off the first light separating surface 5S. The remaining light passes through the beam splitter 1 as the transmitted light T1. A portion of the transmitted light T1 becomes the reflected light R2 when reflected off the second light separating surface 6S. The remaining light of the transmitted light T1 passes through the second light separating surface GS and becomes the transmitted light T2.

The beam splitter 13 can easily form three light beams, including the transmitted light T2 that is parallel to the incident light B1 and the reflected light R1 and R2 that are orthogonal to the incident light B1. Moreover, since the beam splitter 13 is formed longer from side to side, the beam splitter 13 is convenient for use in layouts having little space in the vertical direction.

As described above, according to this modification, the first additional light-transmissive member 2 has the end surface 2a that is orthogonal to the first surface 3a and the second surface 3b and that receives the single light beam B1 falling incident thereto. The first additional light-transmissive member 2 guides the single light beam to the first light-separating layer 5. The first additional light-transmissive member 2 has another end surface 2b that is parallel to the first surface 3a and the second surface 3b and that outputs the reflected light R1 from the first light-separating layer 5. The second light-separating portion 6 receives the transmitted light T1 from the first light-separating portion 5 and separates the received light T1 into the transmitted light T2 and the reflected light R2. The main light-transmissive member 3 guides the transmitted light T1 from the first light-separating portion 5 to the second light-separating portion 6. The second additional light-transmissive member 4 has the end surface 4a. The end surface 4a is orthogonal to the first surface 3a and the second surface 3b and outputs the transmitted light T2 from the second light-separating layer 6. The second surface 3b of the main light-transmissive member 3 outputs the reflected light R2 from the second light-separating layer 6.

<Third Modification>

Figure 4:
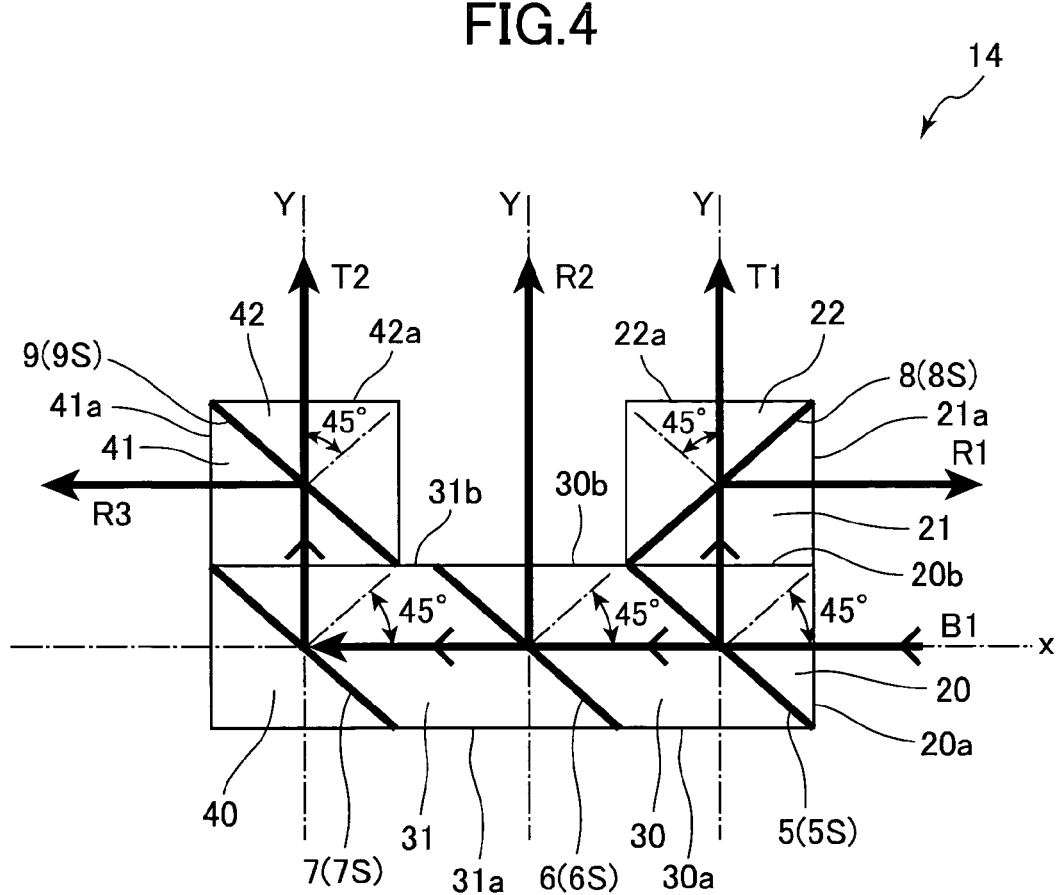
FIG. 4 is a side view showing the construction of a beam splitter according to a third modification of the first embodiment.

FIG. 4 shows a beam splitter 14 according to a third modification of the present embodiment The beam splitter 14 is configured to obtain five light beams from a single incident light B1.

The beam splitter 14 is formed of a BK7 glass material having a refractive index of 1.5. The beam splitter 14 is configured of light transmissive members 20, 21, 22, 30, 31, 40, 41, and 42. The first light separating layer 5 (first light separating surface 5S) is formed at the interface between the light transmissive members 20 and 30, while the second light separating layer 6 (second light separating surface 6S) is formed at the interface between the light transmissive members 30 and 31. In addition, a light reflecting layer 7 (light reflecting surface 7S) is formed at the interface between the light transmissive members 31 and 40; a third light separating layer 8 (third light separating surface 8S) is formed at the interface between the light transmissive members 21 and 22; and a fourth light separating layer 9 (fourth light separating surface 9S) is formed at the interface between the light transmissive members 41 and 42. The incident light B1 is split into transmitted light and reflected light by the first light separating layer 8. The reflected light is further split into the transmitted light T1 and the reflected light R1 by the light separating layer 8. The portion of light that passes through the first light separating layer 5 is split into a transmitted light and the reflected light R2 by the second light separating layer 6. The transmitted light that passes through the second light separating layer 6 is redirected by the light reflecting layer 7 to be incident on the light separating layer 9. The light incident on the light separating layer 9 is split into a reflected light R3 and the transmitted light T2. As a result, five beams of light are obtained from a single incident beam B1.

Here, the normals to the first light separating surface 5S, the second light separating surface 6S, and the light reflecting surface 7S all form an angle of 45° with the optical axis x of the incident light B1. Further, the normal to the light separating surface 8 forms an angle of 45° with the optical axis y, while the normal to the light separating surface 9S forms an angle of 45° to the optical axis y.

Therefore, the beam splitter 14 can easily form five light beams including the reflected light R1 and reflected light R3 that are parallel to the incident light B1, and the transmitted light T1, transmitted light T2, and reflected light R2 that are orthogonal to the incident light B1. The beam splitter 14 can form the reflected light R1 and reflected light R3 at the same distance from the optical axis X.

More specifically, the beam splitting unit 14 includes the main light-transmissive member 30. The main light-transmissive member 30 has a first surface 30a and a second surface 30b, which are parallel to each other. The beam splitting unit 14 further includes the first additional light-transmissive member 20, the another main light-transmissive member 31, the light-reflecting layer 7, the second additional light-transmissive member 21, the third light-separating layer 8, the third additional light-transmissive member 22, the fourth additional light-transmissive member 41, the fourth light-separating layer 9, the fifth additional light-transmissive member 42, and a sixth additional light-transmissive member 40.

The first additional light-transmissive member 20 is provided in contact with the first light-separating layer 5. The first light-separating layer 5 is located between the main light-transmissive member 30 and the first additional light-transmissive member 20. The first additional light-transmissive member 20 has an end surface 20a that is orthogonal to the first surface 30a and the second surface 30b and that receives the single light beam B1 falling incident thereto. The optical axis x of the light beam B1 is normal to the end surface 20a. The first additional light-transmissive member 20 guides the single light beam B1 to the first light-separating layer 5. The other main light-transmissive member 31 is provided in contact with the second light-separating layer 6. The other main light-transmissive member 31 has a first surface 31a that is located on the same plane of the first surface 30a and a second surface 31b that is located on the same plane of the second surface 30b. The second light-separating layer 6 is located between the main light-transmissive member 30 and the other main light-transmissive member 31. The light-reflecting layer 7 is provided in contact with the other main light-transmissive member 31. The light-reflecting layer 7 defines the light-reflecting surface 7S. The sixth additional light-transmissive member 40 is provided in contact with the light-reflecting layer 7. The light-reflecting layer 7 is located between the other main light-transmissive member 31 and the sixth additional light-transmissive member 40.

The second additional light-transmissive member 21 is provided in contact with the first additional light-transmissive member 31. The third light-separating layer 8 is provided in contact with the second additional light-transmissive member 21. The third light-separating layer 8 defines the third light-separating surface 8S. The third additional light-transmissive member 22 is provided in contact with the third light-separating layer 8. The third light-separating layer 8 is located between the second additional light-transmissive member 21 and the third additional light-transmissive member 22.

The fourth additional light-transmissive member 41 is provided in contact with the other main light-transmissive member 31. The fourth light-separating layer 9 is provided in contact with the fourth additional light-transmissive member 41. The fourth light-separating layer 9 defines the fourth light-separating surface 9S. The fifth additional light-transmissive member 42 is provided in contact with the fourth light-separating layer 9. The fourth light-separating layer 9 is located between the fourth additional light-transmissive member 41 and the fifth additional light-transmissive member 42.

The second additional light-transmissive member 21 has an end surface 21a that is parallel to the end surface 20a and that transmits light reflected from the third light-separating layer B. The third additional light-transmissive member 22 has an end surface 22a that is orthogonal to the end surface 20a and that transmits light transmitted through the third light-separating layer 8. The fourth additional light-transmissive member 41 has an end surface 41a that is parallel to the end surface 20a and that transmits light reflected from the fourth light-separating layer 9. The fifth additional light-transmissive member 42 has an end surface 42a that is orthogonal to the end surface 20a and that transmits light transmitted through the fourth light-separating layer 9. The first, second, and fourth light-separating surfaces 5S, 6S, 9S, and the light-reflecting surface 7S are parallel to one another, and form angles of 45° with the end surface 20a. The third light-separating surface as is orthogonal to the first, second, and fourth light-separating surfaces 5S, 6S, 9S.

<Fourth Modification>

Figure 5:
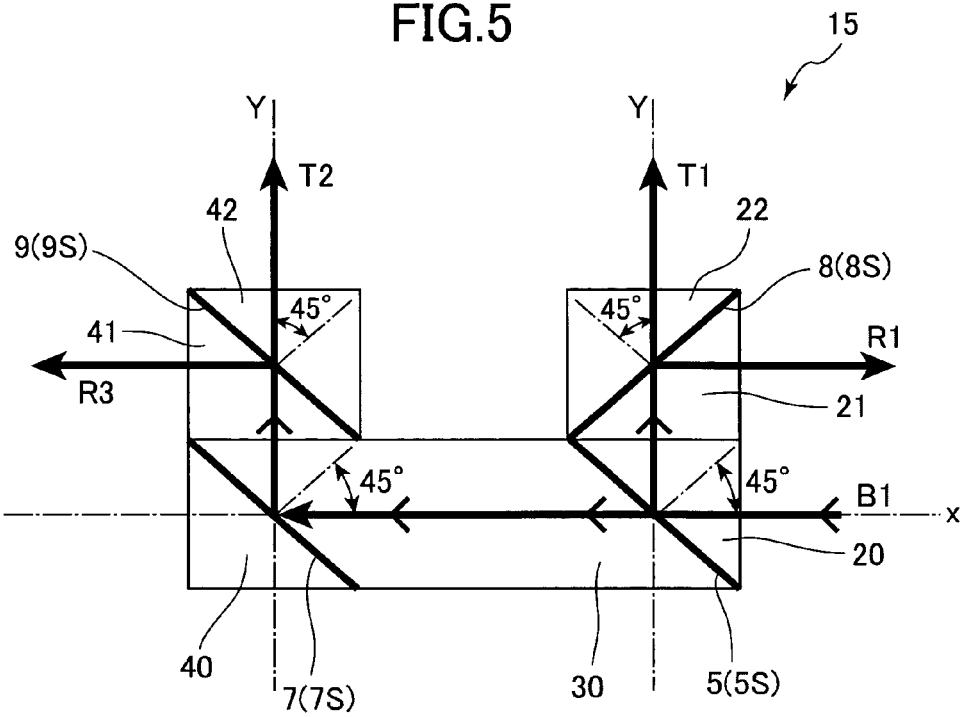
FIG. 5 is a side view showing the construction of a beam splitter according to a fourth modification of the first embodiment.

While five light beams are generated from a single incident beam in FIG. 4, it is also possible to omit the second light separating layer 6 and form two horizontal beams R1 and R3 and two vertical beams T1 and T2 as shown in FIG. 5.

Next will be described a laser marking apparatus 85 of the first embodiment.

Figure 6:
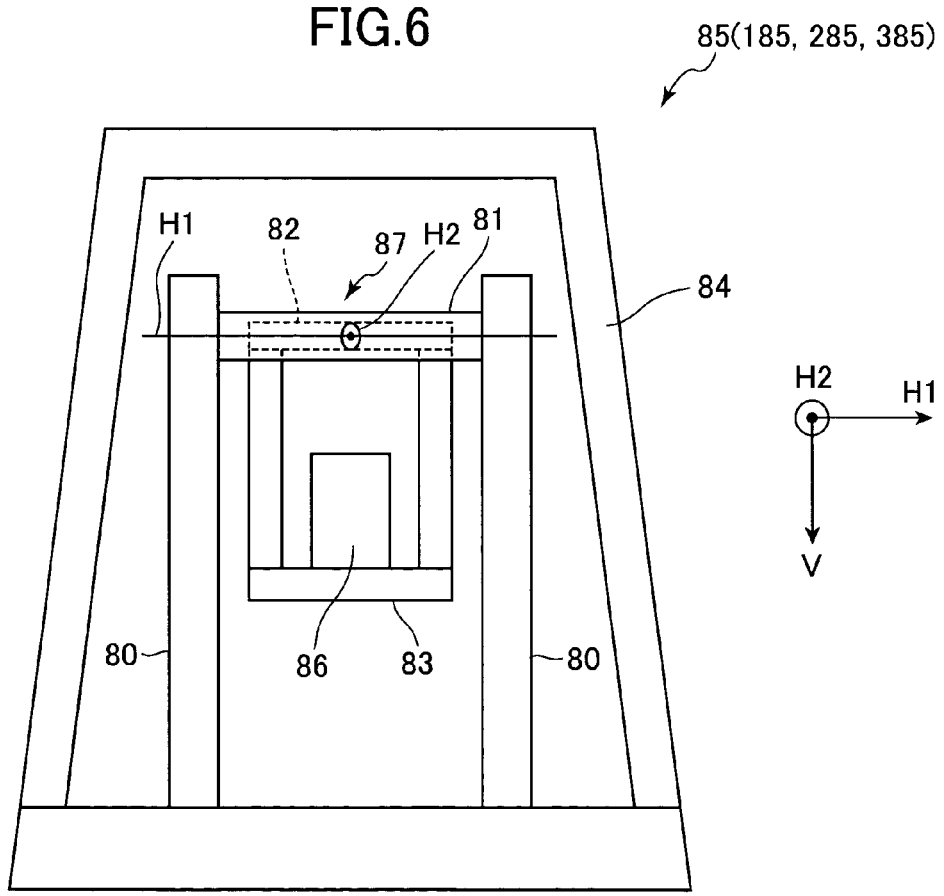
FIG. 6 is an explanatory diagram (side view) showing a laser marking apparatus according to the first embodiment.

As shown in FIG. 6, the laser marking apparatus 85 basically includes a line-beam-generating optical system 86 to be described later, a support mechanism 87 for keeping the line-beam-generating optical system 86 level, and a case 84 covering the line-beam-generating optical system 86 and support mechanism 87. The line-beam-generating optical system 86 includes the beam splitter 1 of the first embodiment as will be described later.

The support mechanism 87 employs a gimbal mechanism well known in the art. The gimbal mechanism includes a support frame 80, a large ring 81, a small ring 82, and a mounting platform 83. The large ring 81 is capable of pivoting around a horizontal axis H1 in relation to the support frame 80 by means of bearings (not shown). The small ring 82 is capable of pivoting around another horizontal axis H2 (perpendicular to the surface of the drawing) in relation to the large ring 81 by means of bearings (not shown). The mounting platform 83 is fixed to the small ring 82 and supports the line-beam-generating optical system 86.

With this construction, the mounting platform 83 on which the line-beam-generating optical system 86 is mounted can be maintained level.

Figure 7:
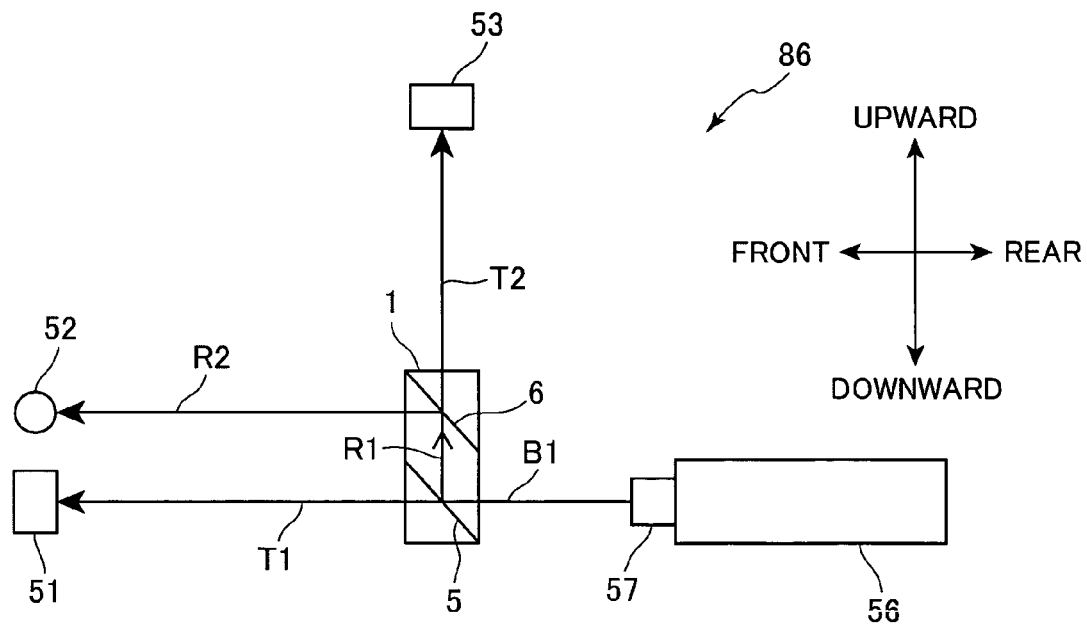
FIG. 7 is an explanatory diagram (side view) showing a line beam generating optical system provided in the laser marking apparatus of FIG. 6.

As shown in FIG. 7, the line beam generating optical system 86 includes a semiconductor laser 56 disposed horizontally in relation to the laser marking apparatus 85. A collimating lens 57 converts the laser beam emitted from the semiconductor laser 56 into a collimated light (parallel rays) or incident light B1 having a circular beam cross-section. In the present embodiment, the diameter of the collimated light B1 is set to 2 mm.

According to the properties of the first light separating layer 5, 67% of incident light is reflected, while 33% is transmitted. Accordingly, 67% of the collimated light 51 is reflected by the first light separating layer 5 and becomes the reflected light R1. The remaining 33% of light passes through the beam splitter 1 and becomes the transmitted light T1. According to the properties of the second light separating layer 6, 50% of incident light is reflected and 50% is transmitted. Accordingly, 33.5% of the original B1 is reflected by the second light separating layer 6 and becomes the reflected light R2. The remaining 33.5% of the original B1 passes through the second light separating layer 6 as the transmitted light T2. By disposing a rod lens along the optical path of each beam, line beams can be obtained A rod lens 51 is disposed on the optical path of the transmitted light T1 such that the axial direction of the lens is vertical and orthogonal to the light emitting direction of the semiconductor laser 56. Accordingly, the rod lens 51 produces a horizontal line beam that spreads along an imaginary horizontal plane that passes normal to the sheet of drawing. Thus, the rod lens 51 generates a horizontal line beam in the front and rear of the apparatus. In addition, a rod lens 52 is disposed on the optical path of the reflected light R2 and is oriented in a direction orthogonal to the rod lens 51. Accordingly, the rod lens 52 produces a vertical line beam that spreads along an imaginary vertical plane that is on the same plane of the sheet of drawing. Thus, the rod lens 52 generates a vertical line beam in the front and rear of the apparatus.

Further, a rod lens 53 is disposed on the optical path of the transmitted light T2 such that the axial direction of the rod lens 53 is parallel to the light-emitting direction of the semiconductor laser 56. Accordingly, the rod lens 53 produces a vertical line beam that spreads along an imaginary vertical plane that passes normal to the sheet of drawing. Thus, the rod lens 53 generates a vertical line beam in the left and right of the apparatus.

As described above, the laser marking apparatus 85 includes the laser 56 generating a light beam, the beam splitting unit 1, the plurality of line-beam-generating optical elements 51, 52, 53, and the support unit 87. Each line-beam-generating optical element 51, 52, 53 generates a line beam from a corresponding one of the plurality of light beams generated by the beam splitting unit 1. The support unit 87 supports the laser 56, the beam splitting unit 1, and the plurality of line-beam-generating optical elements 51, 52, 53.

<Modification>

Figure 8:
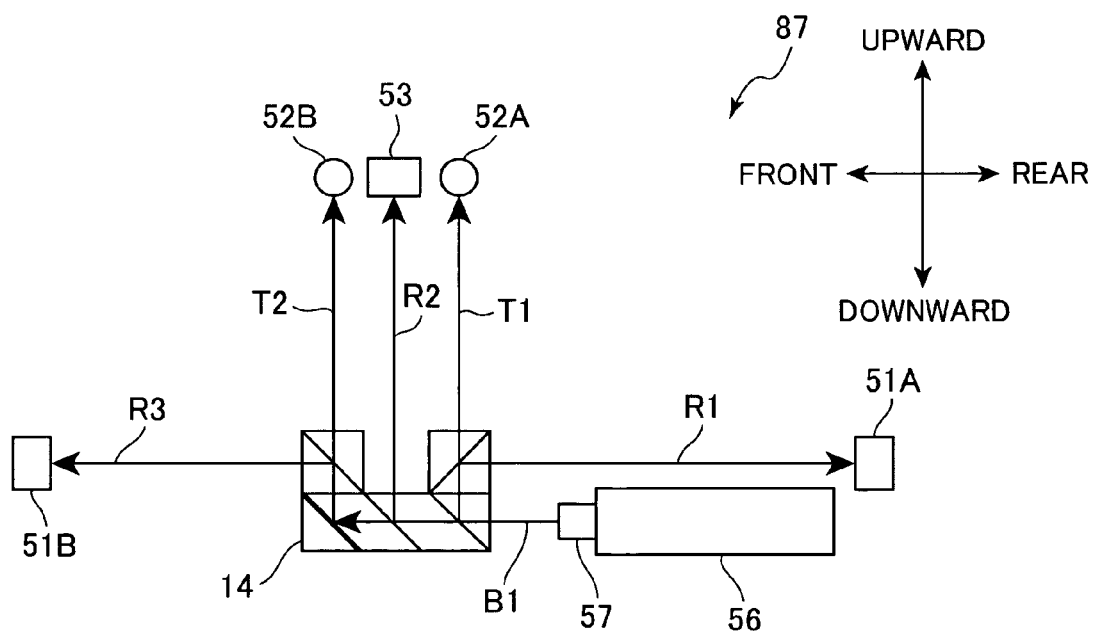
FIG. 8 is an explanatory diagram (side view) showing a modification of the line beam generating optical system provided in the laser marking apparatus of FIG. 6.

FIG. 8 shows a modification of the line-beam generating optical system that is capable of producing five line beams from a single incident beam and that can be mounted in the laser marking apparatus 85 of FIG. 6.

The line-beam generating optical system 87 of this modification employs the beam splitter 14 of the third modification (FIG. 4). The semiconductor laser 56 is disposed horizontally and emits a laser beam The collimating lens 57 converts the laser beam emitted from the semiconductor laser 56 into a collimated light (parallel rays) B1 having a circular beam cross-section. Incident light is divided into a total of five beams, including transmitted light T1 and T2 and reflected light R1, R2, and R3, by the light separating layers 5, 6, 8, 9 and the reflecting layer 7. Each divided light beam passes through rod lenses 51A, 51B, 52A, 52B, and 53 to form line beams. The rod lenses 51A and 51B generate horizontal line beams that spread along an imaginary horizontal plane that passes normal to the sheet of drawing. The rod lenses 51A and 51S therefore generate horizontal line beams in the front and rear of the apparatus. The rod lenses 52A and 52B generate vertical line beams that spread along an imaginary vertical plane that is on the same plane of the sheet of drawing. The rod lenses 52A and 52B therefore generate vertical line beams in the front and rear of the apparatus. Further, the rod lens 53 produces a vertical line beam that spreads along an imaginary vertical plane that passes normal to the sheet of drawing. The rod lens 53 therefore generates a vertical line beam in the left and right of the apparatus.

<Another Modification>

Figure 9:
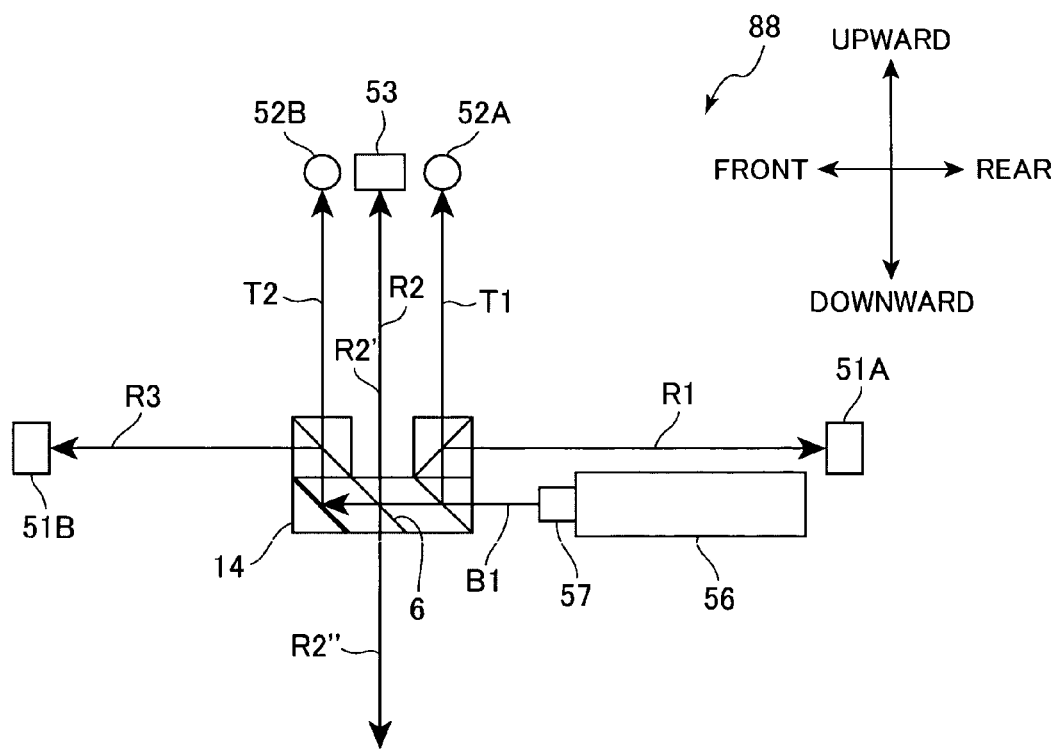
FIG. 9 is an explanatory diagram (side view) showing another modification of the line beam generating optical system provided in the laser marking apparatus of FIG. 6.

FIG. 9 shows another modification of the line-beam generating optical system that can be mounted in the laser marking apparatus 85 of FIG. 6.

The line-beam generating optical system 88 of this modification has the same structure as the above-described line-beam generating optical system 87 (FIG. 8).

When the reflected light R2 is irradiated on the rod lens 53, a part of the reflected light R2 is reflected by the rod lens 53. As a result, another reflected light R2' is generated. The reflected light R2' travels in the opposite direction to the reflected light R2, passes through the light separating layer 6, and becomes a light beam R2' traveling in the direction opposite the reflected light R2, that is, vertically downward. This light beam can be used for ground marking. Therefore, while this construction is identical to that of the line-beam-generating optical system 87 in FIG. 8, the beam splitter 14 can produce a total of six divided beams from a single incident beam.

<Second Embodiment>

Figure 10:
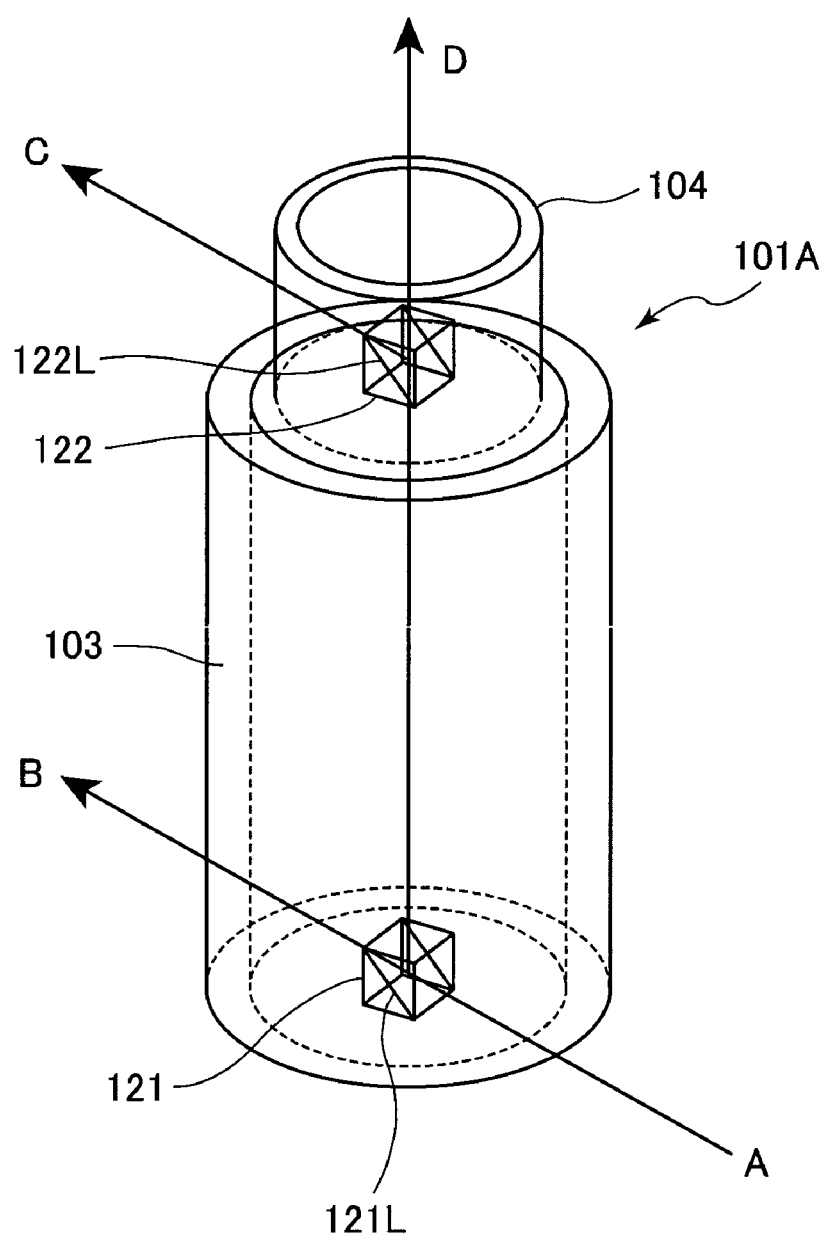
FIG. 10 is a perspective view showing a beam splitting unit according to a second embodiment of the present invention.
Figure 11:
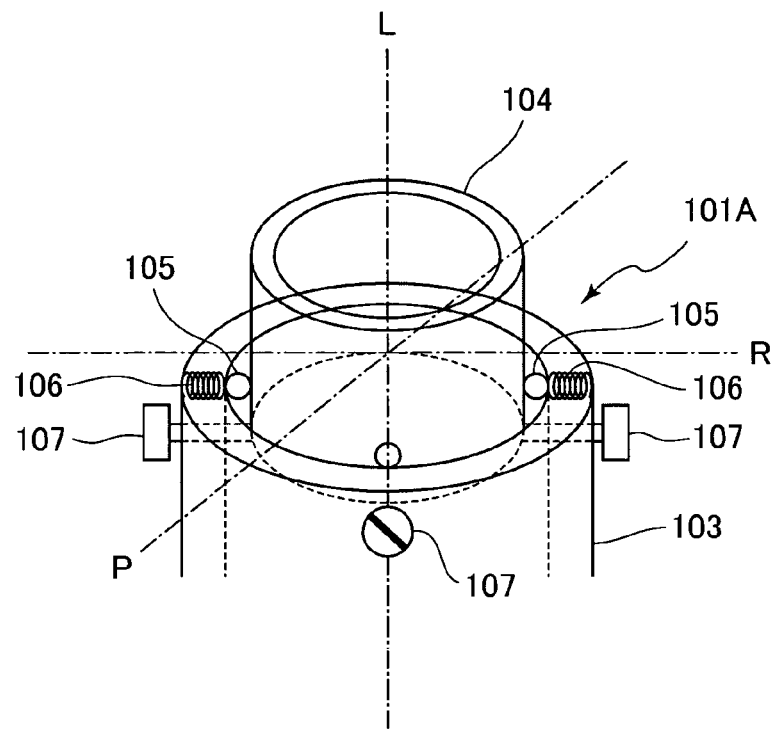
FIG. 11 is an enlarged perspective view schematically showing the beam splitting unit according to the second embodiment.
Figure 12:
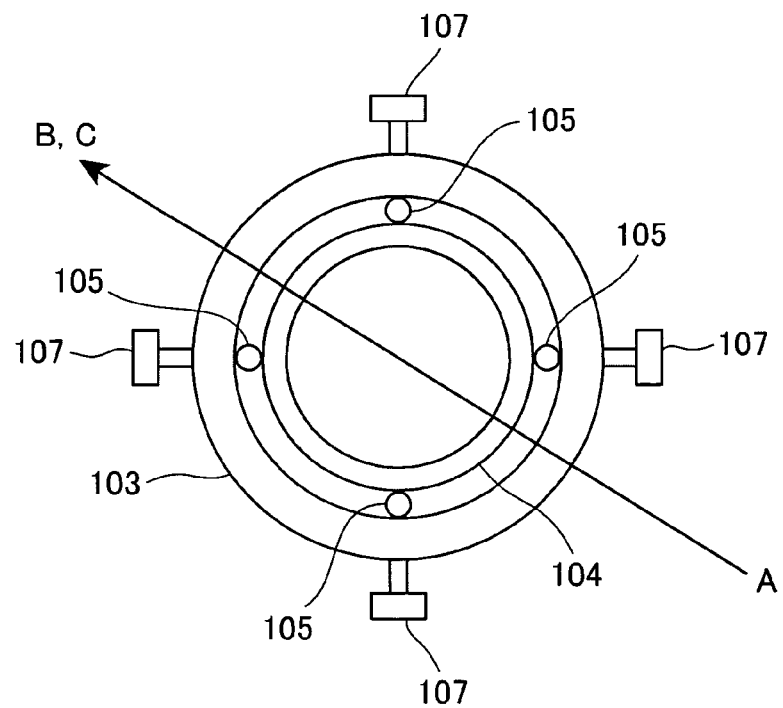
FIG. 12 is a top plan view showing the beam splitting unit shown in FIG. 11.

FIG. 10 shows a beam splitting unit 101A according to a second embodiment of the present invention. A beam splitting unit 101A employs cube-shaped beam splitters 121 and 122 having a side length of 5 mm and formed of a BK7 glass material having a refractive index of 1.5. The beam splitting unit 101A is constructed with the first beam splitter 121 and the second beam splitter 122 disposed along a vertical line therein. The first beam splitter 121 is fixed to the bottom of a holder 103 on the end of the beam splitting unit 101A onto which an incident light A is irradiated, while the second beam splitter 122 is disposed on a movable holder 104. As shown in FIGS. 11 and 12, the movable holder 104 is supported in the holder 103 at four locations. Each support point is configured of a spherical pressing body including a steel ball 105 and a spring 106, enabling the positioning of the movable holder 104 to be subtly modified in relation to the holder 103. The positioning of the movable holder 104 is adjusted such that light emitted from the second beam splitter 122 will irradiate a predetermined irradiation point. The positioning of the movable holder 104 is adjusted (including adjustments about pitching axis direction P and rolling axis direction R) and fixed using screws 107 that are provided near the support points. When necessary, rotational adjustments (adjustments about yawing axis direction L) of the movable holder 104 may also be performed. In the present embodiment, the holder 103 has a shape of a hollow cylinder having an outer diameter of 18 mm, an inner diameter of 15 mm, and a height of 30 mm. The movable holder 104 also has a shape of a hollow cylinder having an outer diameter of 12 mm, an inner diameter of 9 mm, and a height of 9 mm. The steel balls 105 have a diameter of 1.5 mm. The first beam splitter 121 and second beam splitter 122 are separated by a distance of 28 mm. The beam splitting unit 101A having this construction can easily form three light beams including light beams B and C that are parallel to the incident light A and a light beam D that is orthogonal to the incident light A. Although not shown in the drawings, a pair of windows are provided in the peripheral sides of the holder 103 for transmitting the beams A and B therethrough, and another window is provided in the peripheral side of the movable holder 104 for transmitting the beam C therethrough.

While the spherical pressing bodies are configured of steel balls 105, the spherical pressing bodies are not limited to steel balls but may be configured of ceramic balls, for example.

Figure 13:
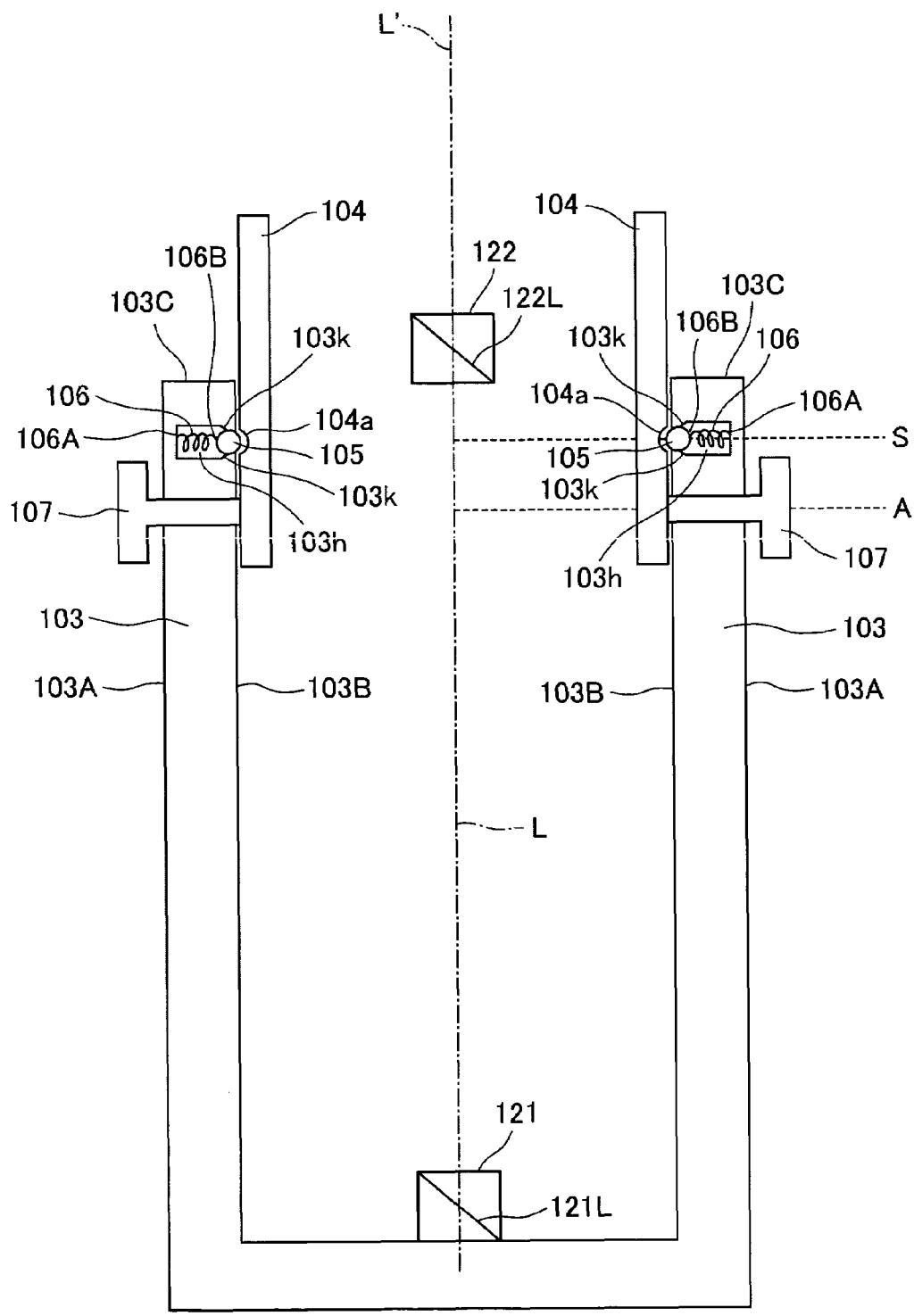
FIG. 13 is an enlarged sectional view showing an essential part of the beam splitting unit shown in FIG. 11.

FIG. 13 is an enlarged sectional view showing how the movable holder 104 is supported with the holder main body 103. The hollow cylinder 103 has an outer surface 103A defining an outer diameter and an inner surface 103B defining an inner diameter. The hollow cylinder 104 has an outer surface defining an outer diameter that is smaller than the inner diameter of the holder main body 103.

The holder main body 103 is formed with four accommodating holes 103h at locations that are near to an upper end 103C of the holder main body 103 along its central axis L. The accommodating holes 103h are arranged on the circumference of the holder main body 103 and are apart from one another by about 90 degrees. Each accommodating hole 103h extends orthogonal to the central axis L The accommodating hole 103h extends between the inner surface 103B and the outer surface 103A. The inner-side end of the accommodating hole 103h is exposed on the inner surface 103B, but the outer-side end of the accommodating hole 103h is not exposed on the outer surface 103A. At a portion 103k of the accommodating hole 103h near to the inner-side end, the inner diameter of the accommodating hole 103h decreases toward the inner-side end. One spring 106 is mounted in each accommodating hole 103h The spring 106 has a pair of opposite free ends 106A (outer-side end 106A) and 106B (inner-side end 106B). The ball 105 is attached to the inner-side end 106B of the spring 106. A part of the ball 105 protrudes from the accommodating hole 103h, and is received in a recess or groove 104a formed on the outer surface of the movable holder 104. The recess 104a extends by some length along the circumference of the movable holder 104. The recess 104a has substantially a semicircular cross-section. The spring 106 is in a compressed state, and presses the movable holder 104 via the ball 105 toward the central axis L of the holder main body 103.

As shown in FIGS. 10–13, the first beam splitter 121 is formed with a first light-separating layer 121L. The second beam splitter 122 is formed with a second light-separating layer 122L. The holder main body 103 is mounted with the first beam splitter 121. The movable holder 104 is mounted with the second beam splitter 122. The movable holder 104 is movably mounted in the holder main body 103 to maintain the positional relationship between the first and second light-separating layers 121L and 122L into a predetermined positional relationship that allows the first and second light-separating layers 121L and 122L to generate three separated light beams from the single light beam.

As shown in FIGS. 11–13, the movable holder 104 is mounted by the supporting units 105, 106 in a manner that the movable holder 104 is rotatable relative to the holder main body 103 with regard to three axial directions (yawing axis direction L, rolling axis direction R, and pitching axis direction P), which are orthogonal to one another. The holder main body 103 has a shape of a hollow cylinder having the central axis L that serves as the yawing axial direction L. The first beam splitter 121 is located at a position on the axis L of the hollow cylinder 103. The movable holder 104 has a shape of a hollow cylinder having a central axis L'. The second beam splitter 122 is located at a position on the axis L' of the hollow cylinder 104. The movable holder 104 is located relative to the holder main body 103 with the axis of the movable holder 104 being located on the axis L of the holder main body 103.

As shown in FIG. 13, the supporting units 105, 106 cooperate to support the hollow cylinder 104, with at least a part of the hollow cylinder 104 being inserted within the hollow cylinder 103. The four pairs of support units 105, 106 are located at the support position S defined along the axis L of the main holder body 103. The spring 106 has the first end and the second end and generates an urging force. The first end contacts and presses the holder main body 103 by the urging force The spherical body 105 contacts the second end of the spring and is pressed by the second end of the spring. The spherical body 105 also contacts the outer surface of the hollow cylinder 104 and presses the hollow cylinder 104 by the urging force of the spring.

The screws 107 are used for adjusting the rotational position of the movable holder 104 relative to the holder main body 103 with regard to the rolling and pitching axial directions R and P. The screws 107 are located at the adjustment position A defined along the central axis L. Each displacement applying unit 107 applies a displacement to a gap between the inner surface of the holder main body 103 and the outer surface of the movable holder 104 at the adjustment position A, thereby adjusting the rotational position of the movable holder 104 around the rolling and pitching axial directions R, P in relation to the holder main body 103.

The first beam splitter 121 is mounted in the holder main body so that the first light-separating surface 121L forms an angle of 45° with respect to the axis L of the holder main body 103. The movable holder 104 is oriented by the support units 105, 106 and the screws 107 to maintain the second light-separating surface 122L in the second beam splitter 122 as parallel to the first light-separating surface 121L and to form an angle of 45° relative to the axis L of the holder main body 103, thereby allowing the first and second light-separating layers 121L and 122L to produce the three separated light beams. In this case, each two separated light beams among the three separated light beams has either one of parallel and orthogonal relationships with each other, <First Modification>

Figure 14:
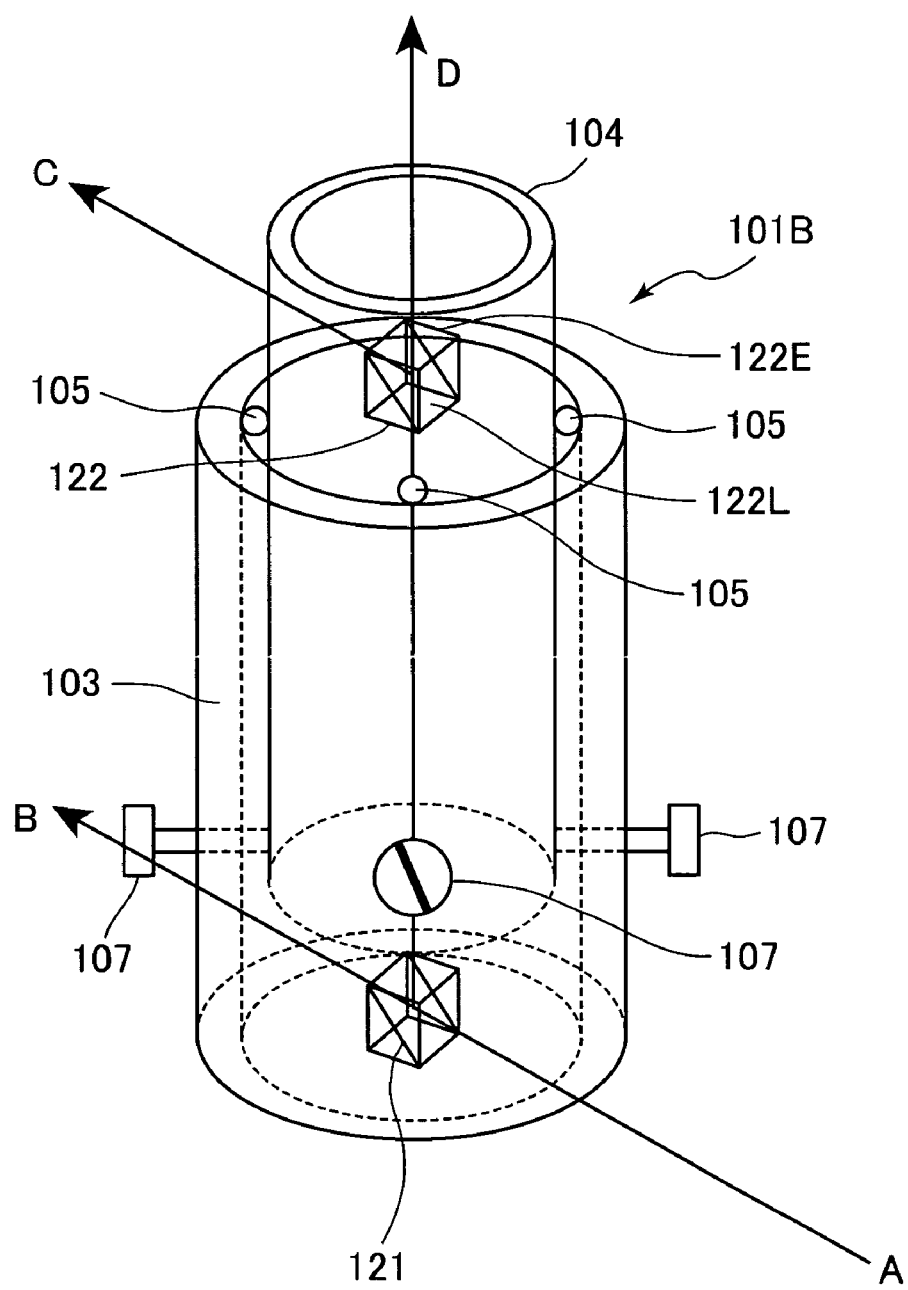
FIG. 14 is a perspective view schematically showing a beam splitting unit according to a first modification of the second embodiment.
Figure 15:
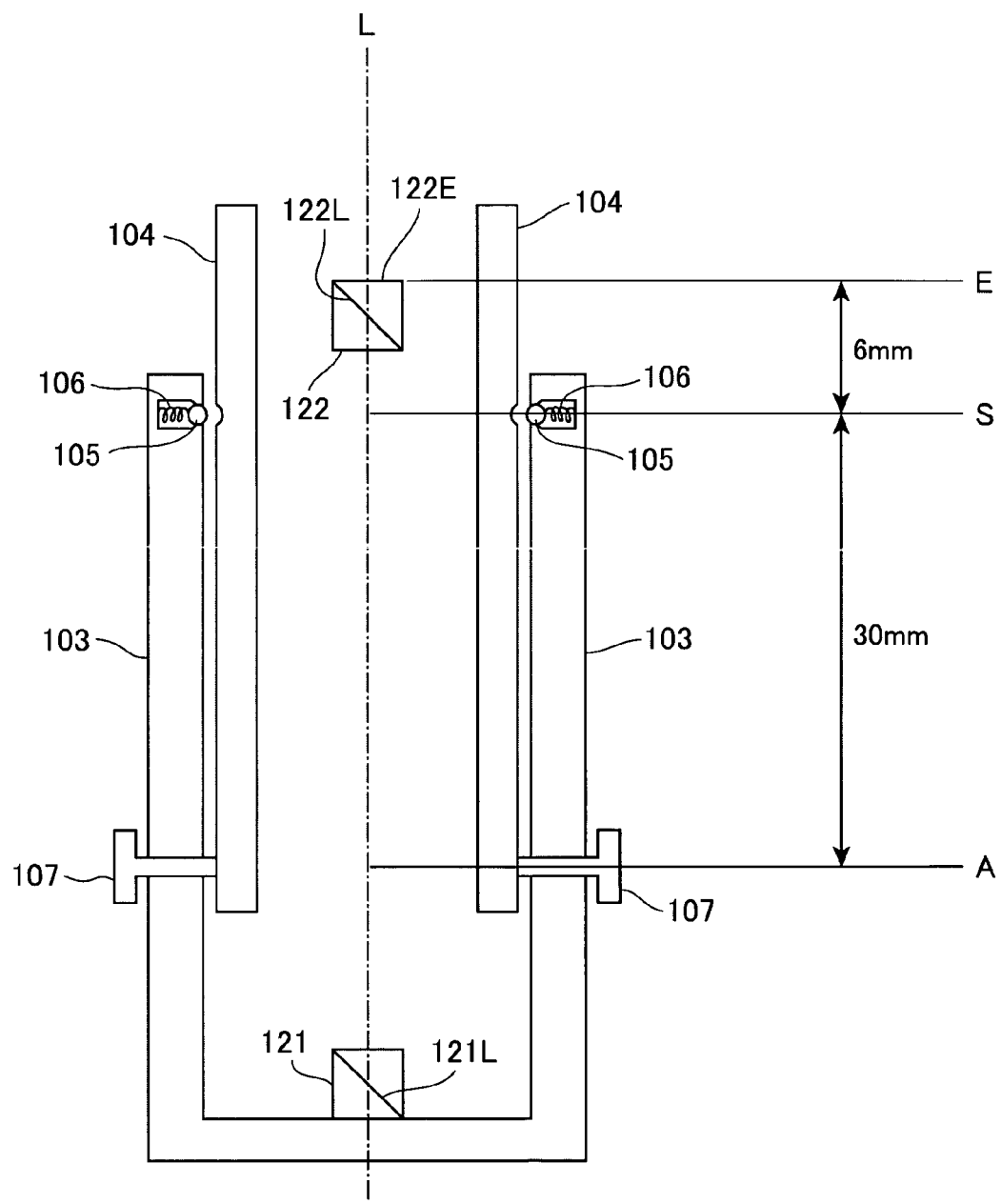
FIG. 15 is a sectional view of the beam splitting unit according to the first modification, showing positional relationships among an emitting position E, a support position S, and an adjustment position A.

In some cases it is difficult to perform subtle positioning adjustments with the beam splitting unit 501A of the present embodiment using the screws 107 provided near the support points. A beam splitting unit 101B according to a first modification is more suitable for performing such subtle positioning adjustments. As shown in FIGS. 14 and 15, the holder 103 has a shape of a hollow cylinder with an outer diameter of 18 mm, an inner diameter of 15 mm, and a height of 42 mm. The movable holder 104 also has a shape of a hollow cylinder with an outer diameter of 12 mm, an inner diameter of 9 mm, and a height of 38 mm. The screws 107 are provided at positions (adjusting position A) 30 mm from the support points S. Since the distance from the support points S to the upper emitting surface 122E (emitting position E) of the second beam splitter 122 is 6 mm and the distance from the support points to the screws 107 (adjusting points A) is 30 mm, when the movable holder 104 is displaced by rotating the screws 107, only one fifth of that displacement is applied to the upper emitting surface 122E of the second beam splitter 122. In other words, it is easier to perform adjustments with the beam splitting unit loin since the amount of displacement is reduced.

In this way, the second beam splitter 122 has an emitting surface 122E for emitting a transmitted light that has transmitted through the second light-separating layer 122L. The distance, along the axis L of the main holder body 103, between the support position S and the adjustment position A is as fifth times as long as a distance, along the axis L, between the emitting surface 122E and the support position S.

It is, however, sufficient that the distance, along the axis L, between the support position S and the adjustment position A be greater than a distance, along the axis L, between the emitting surface 122E and the support position S. It is preferable that the distance, along the axis L, between the support position S and the adjustment position A, be greater than or equal to twice a distance, along the axis L, between the emitting surface 122E and the support position S.

<Second Modification>

Figure 16:
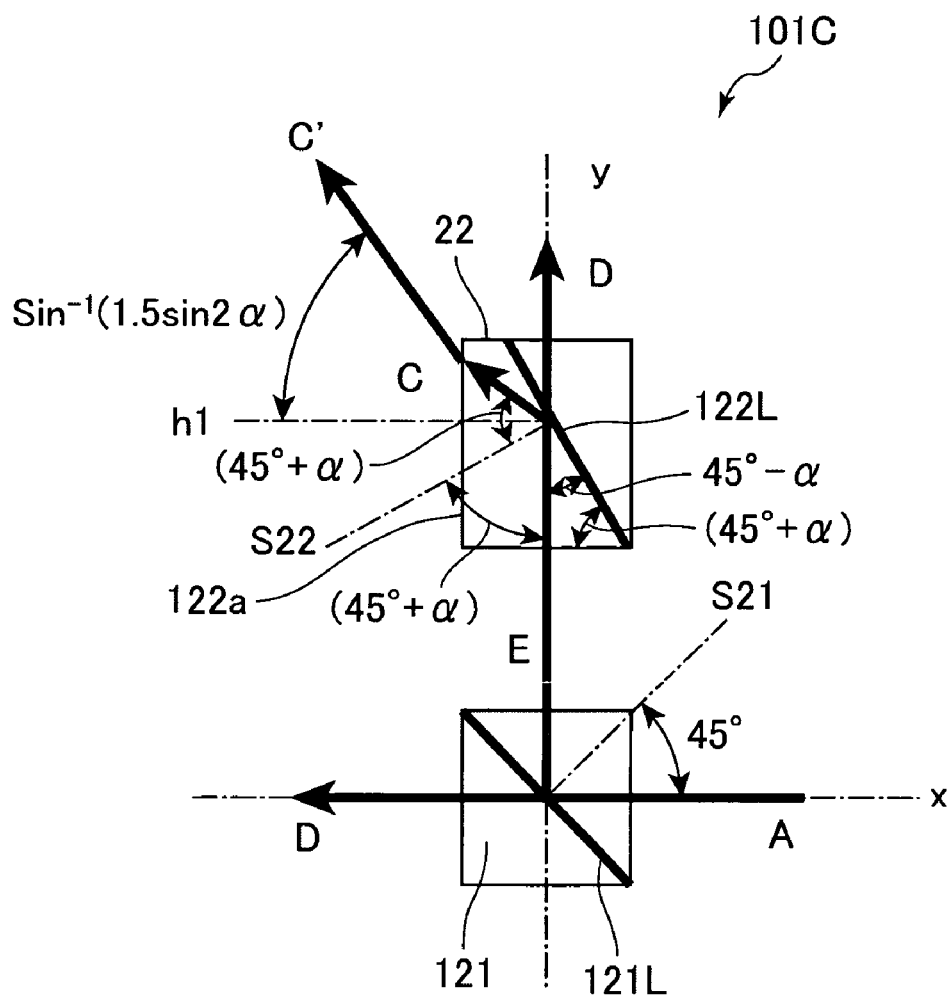
FIG. 16 is an explanatory diagram showing an essential part of a beam splitting unit according to a second modification of the second embodiment.

FIG. 16 shows a beam splitting unit 101C according to a second modification. The beam splitting unit 101C has the same structure as that of the beam splitting unit 101B except for the beam splitter 122. FIG. 16 therefore shows only the beam splitters 121 and 122 in the beam splitting unit 101C. In the first beam splitter 121, a normal S21 to the light separating surface forms an angle of 45° with the optical axis of the incident light A in the same manner as the beam splitters 121 in the beam splitting units 101A and 101B. According to the present embodiment, a normal S22 to the light separating surface in the second beam splitter 122 forms an angle of 45°+α with the optical axis of a reflected light E.

The normal S21 to the first light separating surface 121L forms an angle of 45° with the optical axis x of the incident light A, while the normal S22 to the second light separating surface 122L forms an angle of 45°+α (where 0°<α<45°) with the optical axis y of the reflected light E. In other words, the second light separating surface 122L forms an angle of 45°−α with the optical axis y of the reflected light E. Therefore, the reflected light C forms an angle of 45°+α with the normal S22. That is, the reflected light C forms an angle of 2(45°+α) with the reflected light E Therefore, the reflected light C forms an angle of 2(45°+α)−90°=2α with a horizontal line h1. The reflected light C is refracted when transmitting a surface 122a and becomes a reflected light C'. From Snell's law, the reflected light C' forms an angle of $\sin^{-1}(1.5 \sin 2\alpha)$ with the horizontal line h1. With this construction, the beam splitting unit 101C can easily form not only light beams parallel to and orthogonal to the incident light, but also a light beam having an arbitrary angle.

As described above, the first beam splitter 121 is mounted in the holder main body 103 so that the first light-separating surface 121L forms an angle of 45° with respect to the axis L of the holder main body 103. The movable holder 104 maintains an angle formed between the second light-separating surface 122L and the axis L of the holder main body 103 at an angle of 45°−α, where α is in a range of 0°<α<45°.

<Third Modification>

Figure 17:
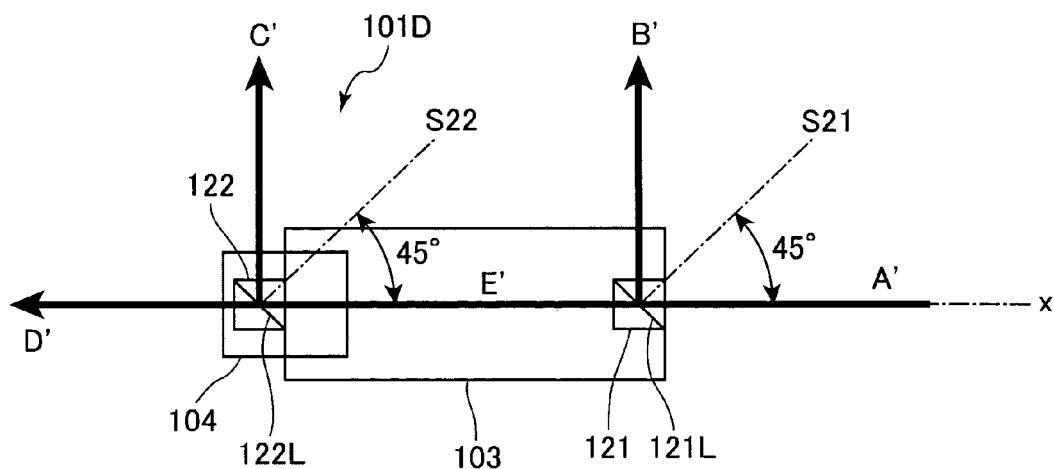
FIG. 17 is an explanatory diagram (side view) showing a beam splitting unit according to a third modification of the second embodiment.

FIG. 17 shows a beam splitting unit 101D according to a third modification. The beam splitting unit 101D is elongated in the horizontal direction. The beam splitting unit 101D has basically the same construction with the beam splitting unit 10B except for that an incident light A' is guided through the bottom of the holder 103 to the first beam splitter 121. Although not shown in the drawing, a window is formed in the bottom of the holder 103 for transmitting the incident light A' therethrough. The incident light A' is incident onto one end of the beam splitting unit 101D. The incident light A' travels along the longitudinal direction of the beam splitting unit 101D. A portion of the incident light A' is reflected off the light separating surface 121L of the first beam splitter 121 and becomes a reflected light B'. The remaining light becomes a transmitted light E'. A portion of the transmitted light E' is reflected off the light separating surface 122L of the second beam splitter 122 and becomes a reflected light C'. The remaining portion of the transmitted light E' passes through the light separating surface 122L of the second beam splitter 122 and becomes a transmitted light D'.

The beam splitting unit 101D can easily form three light beams, including the transmitted light D' that is parallel to the incident light A' and the reflected light B' and C' that are orthogonal to the incident light A'. Moreover, since the beam splitting unit 10D is formed longer from side to side, the beam splitter 101D is convenient for use in layouts having little space in the vertical direction.

<Fourth Modification>

Figure 18:
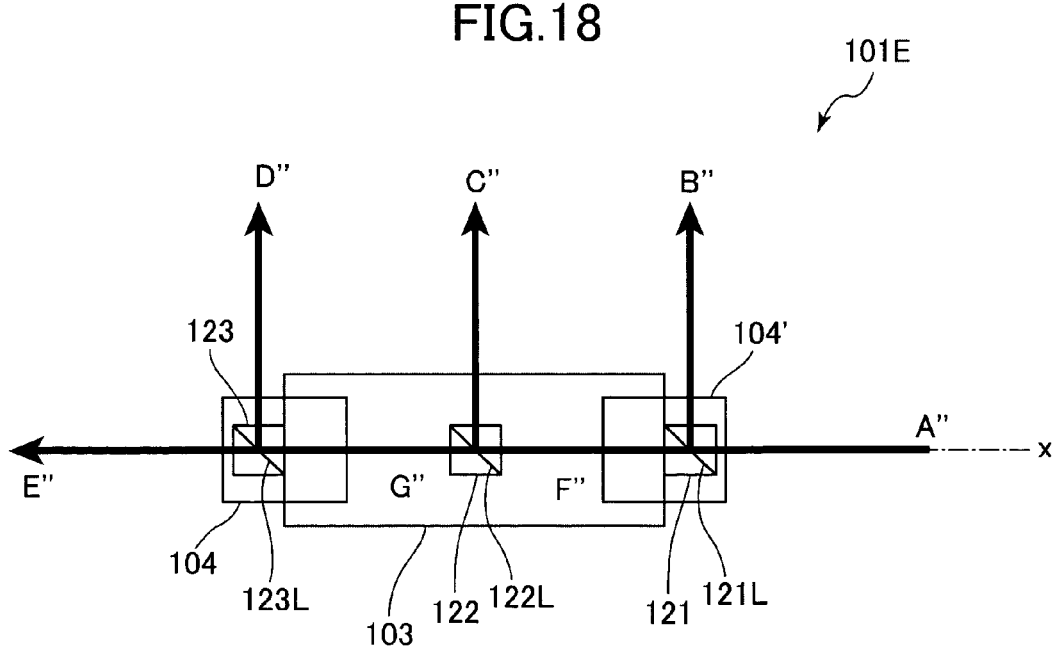
FIG. 18 is an explanatory diagram (side view) showing a beam splitting unit according to a fourth modification of the second embodiment.

FIG. 18 shows a beam splitting unit 101E according to a fourth modification. The beam splitting unit 101E is configured to produce four divided light beams from a single incident light.

In the present modification, the first beam splitter 121 and second beam splitter 122 are formed of a BK7 glass material having a refractive index of 1.5. An incident light A" is split into a transmitted light F" and a reflected light B" by the first beam splitter 121. The transmitted light F" is divided into a transmitted light G" and a reflected light C" by the second beam splitter 122. The transmitted light G" passing through the second beam splitter 122 is split into a transmitted light E" and a reflected light D" by a third beam splitter 123. Accordingly, four beams of light are separated from a single beam of incident light. A normal to each light separating surface in the beam splitters 121, 122, and 123 forms an angle of 45° with the optical axis of the incident light A". Therefore, the beam splitting unit 101E can easily form a beam of light parallel to the incident light and three beams of light orthogonal to the incident light. In the beam splitting unit 101E, the first beam splitter 121 and the third beam splitter 123 are supported by movable holders 104' and 104 respectively, while the second beam splitter 122 is supported in the holder 103.

As described above, the two movable holders 104 and 104' are movably mounted in the holder main body 103 to maintain the positional relationships among the beam splitters 121, 122, and 123 into the predetermined positional relationships so that the first, second, and third light-separating layers 121L, 122L, and 123L to generate four separated light beams from the single light beam.

[Laser Marking Apparatus]

A laser marking apparatus 185 according to the second embodiment has basically the same construction as the laser marking apparatus 85 according to the first embodiment, as shown in FIG. 6. The laser marking apparatus 185 is provided with a line-beam-generating optical system 186 instead of the line-beam-generating optical system 86. Other than that, the laser marking apparatus 185 has the same construction as the laser marking apparatus 85S

Figure 19:
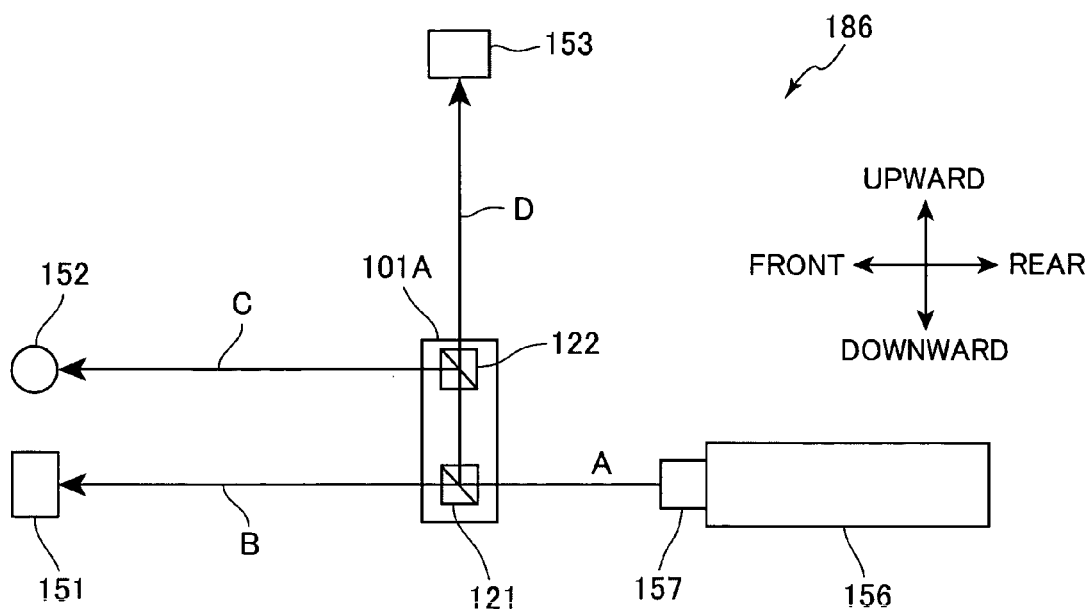
FIG. 19 is an explanatory diagram (side view) showing a line beam generating optical system provided in the laser marking apparatus of the second embodiment.

As shown in FIG. 19, the line beam generating optical system 186 includes a semiconductor laser 156 disposed horizontally in relation to the laser marking apparatus 185. A collimating lens 157 converts the laser beam emitted from the semiconductor laser 156 into a collimated light (parallel rays) or incident light A having a circular beam cross-section. In the present embodiment, the diameter of the collimated light A is set to 2 mm. The line beam generating optical system 186 further includes the beam splitting unit 101A.

According to the properties of the first beam splitter 121, 67% of the incident light A is reflected, while 33% is transmitted. Hence, 67% of the incident light A is reflected by the first beam splitter 121, while the remaining 33% of the light is transmitted through the beam splitting unit 101A and becomes a transmitted light B. According to the properties of the second beam splitter 122, 50% of incident light is reflected, and 50% is transmitted. It is also possible to produce line beams by disposing rod lenses 151, 152, and 153 on the optical paths of each beam of light. The rod lens 151 is disposed on the optical path of the light beam B such that the longitudinal direction of the rod lens 151 extends vertically and orthogonal to the light emitting direction of the semiconductor laser 156. Accordingly, the rod lens 151 produces a horizontal line beam. Further, the rod lens 152 is disposed on the optical path of the reflected light C and is oriented orthogonal to the rod lens 151. Accordingly, the rod lens 152 produces a vertical line beam.

Further, a rod lens 153 is disposed on the optical is path of the transmitted light D such that the axial direction of the rod lens 53 is parallel to the light-emitting direction of the semiconductor laser 156. Accordingly, the rod lens 153 produces a vertical line beam that spreads along an imaginary vertical plane that passes normal to the sheet of drawing. Thus, the rod lens 153 generates a vertical line beam in the left and right of the apparatus.

As described above, the laser 156 and the collimating lens 157 cooperate to generate a collimated light beam. The beam splitting unit 101 receives the collimated light beam and generates the plurality of separated light beams. The support unit 87 supports the laser 156, the collimating lens 157, the beam splitting unit 101, and the plurality of line-beam-generating optical elements 151, 152, and 153.

<Modification>

Figure 20:
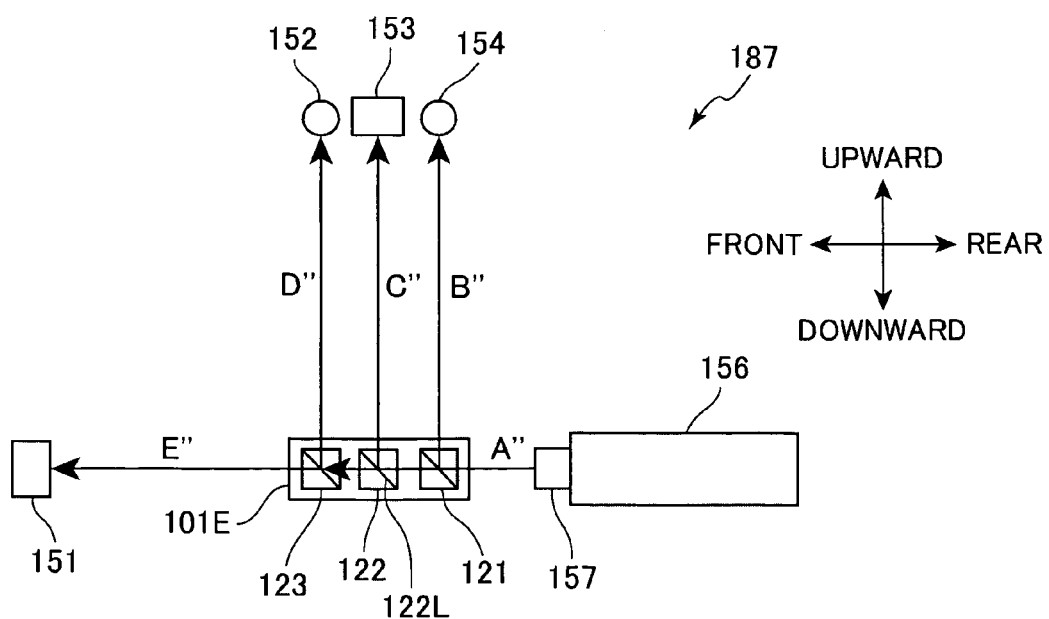
FIG. 20 is an explanatory diagram (side view) showing another line beam generating optical system equipped with the beam splitting unit according to the fourth modification.

FIG. 20 shows a line beam generating optical system 187, which is mounted in the laser marking apparatus 185 and which is equipped with the beam splitting unit 101E that is capable of obtaining four divided light beams from a single incident light beam.

The semiconductor laser 156 is disposed horizontally on the laser marking apparatus 110 for emitting a laser beam. The collimating lens 157 converts the laser beam emitted from the semiconductor laser 156 into a collimated light (parallel rays) A" having a circular beam cross section. The diameter of the collimated light A" is set to 2 mm. The incident light is divided into a total of four beams of transmitted light and reflected light by the beam splitters 121, 122, and 123. Line beams can be produced by passing each divided light beam through the rod lenses 151–154. In the present modification, the rod lens 151 generates horizontal line beams in front and in rear of the laser marking apparatus of the laser marking apparatus 185, while the rod lens 152 generates a vertical line beam in front of the laser marking apparatus 185. Further, the rod lens 153 generates a vertical line on the left and right sides of the laser marking apparatus 185, while the rod lens 154 generates a vertical line in rear of the laser marking apparatus 110.

Figure 21:
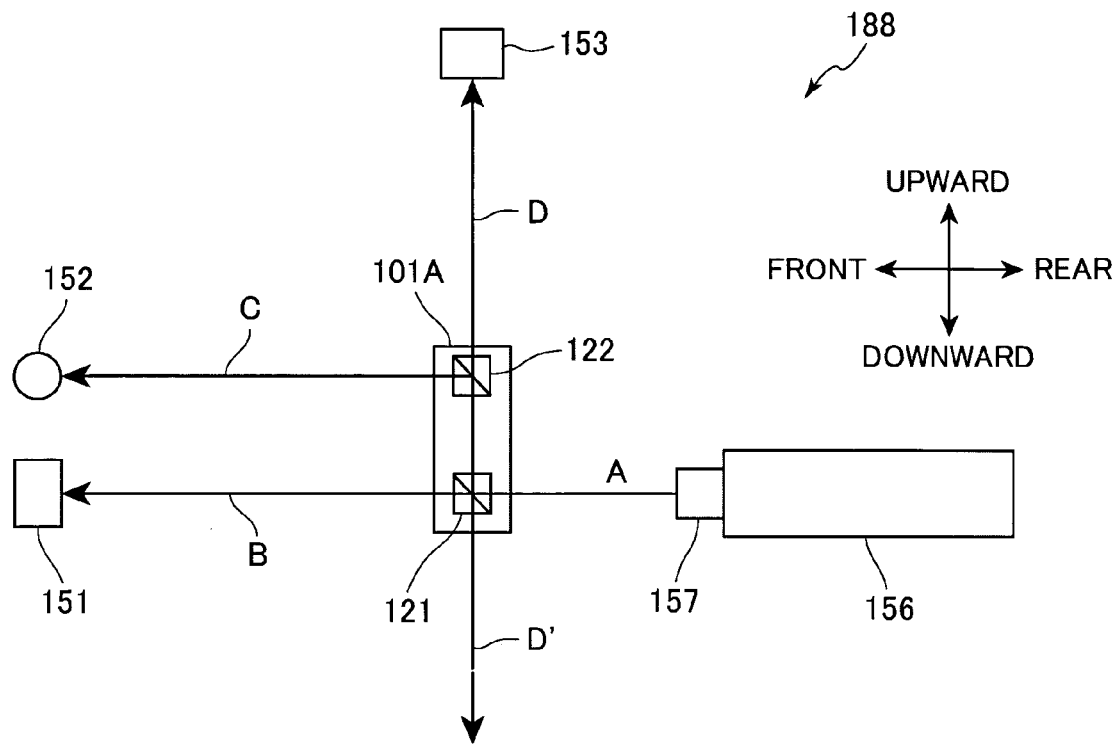
FIG. 21 is an explanatory diagram (side view) showing a modification of the line beam generating optical system in FIG. 19.

FIG. 21 shows another line beam generating optical system 188. With the equivalent construction as the line beam generating optical system 186, the light beam D can produce a reflected light D' when incident on the rod lens 153. The reflected light D' travels in the direction opposite that of the transmitted light D, passes through the light separating surfaces of the second beam splitter 122 and first beam splitter 121 and continues downward in the direction opposite that of the light beam D. Accordingly, the reflected light D' can be used for ground marking. Hence, by using the same construction, it is possible to obtain a total of four divided light beams from a single beam of incident light.

As described above, the lens 153 receives and reflects a part of the transmitted light from the second light-separating layer 122L. The second light-separating layer 122L transmits the reflected light from the lens 153, thereby obtaining four separated light beams from the single light beam.

<Third Embodiment>

Figure 22:
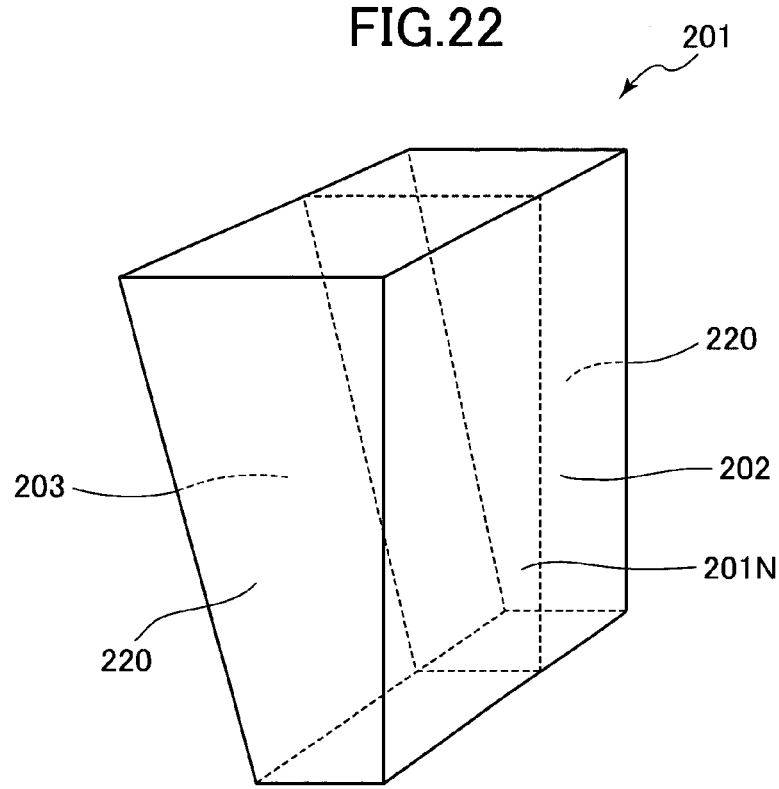
FIG. 22 is a perspective view showing a beam-emission-angle compensating element according to a third embodiment of the present invention.
Figure 23:
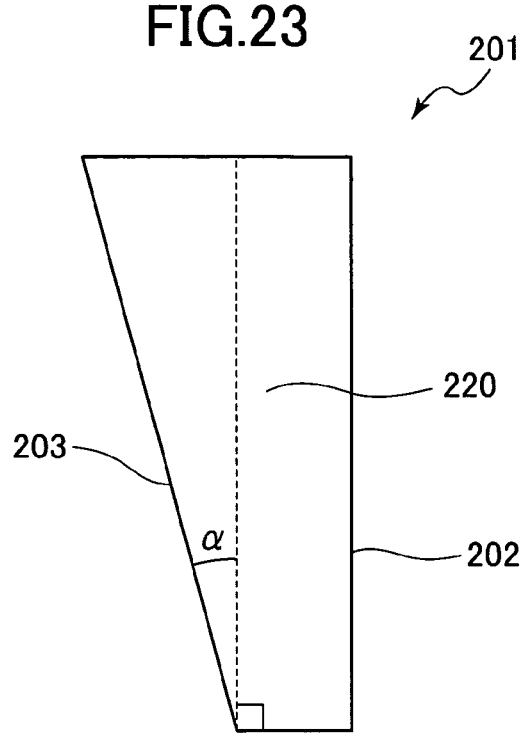
FIG. 23 is a side view of the beam-emission-angle compensating element shown in FIG. 22.

FIGS. 22 and 23 show a beam-emission-angle compensating optical element 201 according to a third embodiment of the present invention, In the present embodiment, the angle compensating element 201 is formed of a BR7 glass material having a refractive index of 1.5, although other light-transmissive material such as glass or plastic can also be used. The angle compensating element 201 has a shape of a prism with trapezoidal surfaces 220, as shown in FIGS. 22 and 23. The angle compensating element 201 also has an incident surface 202 and an emitting surface 203, such that the incident surface 202 and the emitting surface 203 form a predetermined angle $\alpha$. It should be noted that the shape of the angle compensating element 201 is not to limited to the prism with trapezoidal surfaces 220, and that other shapes can be used as long as the incident surface 202 and the emitting surface 203 form a predetermined angle $\alpha$.

Next, the principles how the angle compensating element 201 performs angle compensation or angle correction will be described with reference to FIG. 24. Here, the case is considered in which a beam B1 emitted from a separate optical system (not shown) that deviates an angle $\delta$ from the line of an ideal beam (x-axis). The incident surface 202 of the angle compensating element 201 is inclined at an angle of $\pi/2-\xi$ with the x-axis. Also, the beam B1 is incident at an angle $\theta_1$ with the normal to the incident surface 202. Further, a beam B2 that passes through the angle compensating element 201 travels at an angle $\gamma$ to the same normal. Assuming the refractive index of the angle compensating element 201 is n, the following equation can be formed according to Snell's law.

$$\sin \theta_1 = n \cdot \sin \gamma \qquad (1)$$

Since air surrounds the exterior of the angle compensating element 201, the refractive index of the outside of the angle compensating element 201 is 1.

The beam B2 traveling through the angle compensating element 201 also forms an angle $\alpha-\gamma$ with the normal to the emitting surface 203. If we call the angle at which a beam 53 emitted from the angle compensating element 201 forms with the normal to the emitting surface 203 $\theta_2$, then according to Snell's law, $$n \cdot \sin(\alpha-\gamma) = \sin \theta_2 \qquad (2)$$

Then from equation (1), $$\sin \gamma = (1/n) \cdot \sin \theta_1 \qquad (3)$$

By modifying equation (3), $$\cos \gamma = (1/n) \cdot (n^2 - \sin^2 \theta_1)^{1/2} \qquad (4)$$

Next, from equation (2), we have:

$$\sin \theta_2 = n \cdot \sin(\alpha-\gamma) = n \cdot (\sin \alpha \cdot \cos \gamma - \cos \alpha \cdot \sin \gamma) = n \cdot (\sin \alpha \cdot (1/n) \cdot (n^2 - \sin^2 \theta_1)^{1/2} - \cos \alpha \cdot (1/n) \cdot \sin \theta_1) = \sin \alpha \cdot (n^2 - \sin^2 \theta_1)^{1/2} - \cos \alpha \cdot \sin \theta_1 \qquad (5)$$

The angle $\delta$ formed by the beam B1 and the x-axis is found by the following:

$$\delta = \xi - \theta_1 \qquad (6)$$

Further, an angle $\phi$ formed by the outgoing beam B3 and the x-axis is found by the following equation:

$$\phi = \alpha - \xi - \theta_2 \qquad (7)$$

When $\alpha$, $\theta_1$, $\theta_2$, and $\delta$ are sufficiently small, the following equations are obtained:

$$\sin \theta_1 = \theta_1, \sin \theta_2 = \theta_2,$$

$$\sin \alpha = \alpha, \cos \alpha = 1, \text{ and } \theta_1^2 = 0.$$

Hence, from equation (5), $$\theta_2 = \alpha \cdot (n^2 - \theta_1^2)^{1/2} - \theta_1 = n \cdot \alpha - \theta_1 \qquad (8)$$

By substituting equation (8) into equation (7), the angle $\phi$ formed by the beam B3 and the x-axis can be found as follows:

$$\phi = \alpha - \xi - (n \cdot \alpha - \theta_1) = \alpha - n \cdot \alpha - (\xi - \theta_1) = \alpha - n \cdot \alpha - \delta \qquad (9)$$

In order to make $\phi$ 0 here, we can set $\phi = 0$ in equation (9):

$$\alpha - n \cdot \alpha - \delta = 0$$

By rearranging the above equation, we have:

$$\alpha = -\delta/(n-1) \qquad (10)$$

In other words, by transmitting a beam through the angle compensating element 201 having an angle $\alpha$ that is $1/(n-1)$ times the angle $\delta$ formed by the beam B1 and the x-axis, the light emitted from the angle compensating element 201 can be corrected to form an angle of 0° with the x-axis. When n is equal to 1.5, for example, the equation (10) can be rewritten as $\alpha = -\delta/(1.5-1) = -2\delta$.

Further, as is clear from equation (10), the angle correction is not dependent on the angle at which the angle compensating element 201 is disposed or installed in relation to the x-axis.

When a beam emitted from a predetermined optical system forms an angle of 0.010 with the x-axis, for example, angle correction can be performed using the angle compensating element 201 having an angle $\alpha = -0.01/(n-1)$, from equation (10), in order to align the direction or the beam with the x-axis. When the angle compensating element 201 is formed of a BK7 material having a refractive index of 1.5, $$\alpha = -0.01(1.5-1) = -0.02°$$

As described above, the design of the angle compensating element 201 is made extremely simple because the angle α of the angle compensating element 201 used for angle correction can be determined simply from the incidence angle of the incident beam and the refractive index of the angle compensating element.

Figure 25:
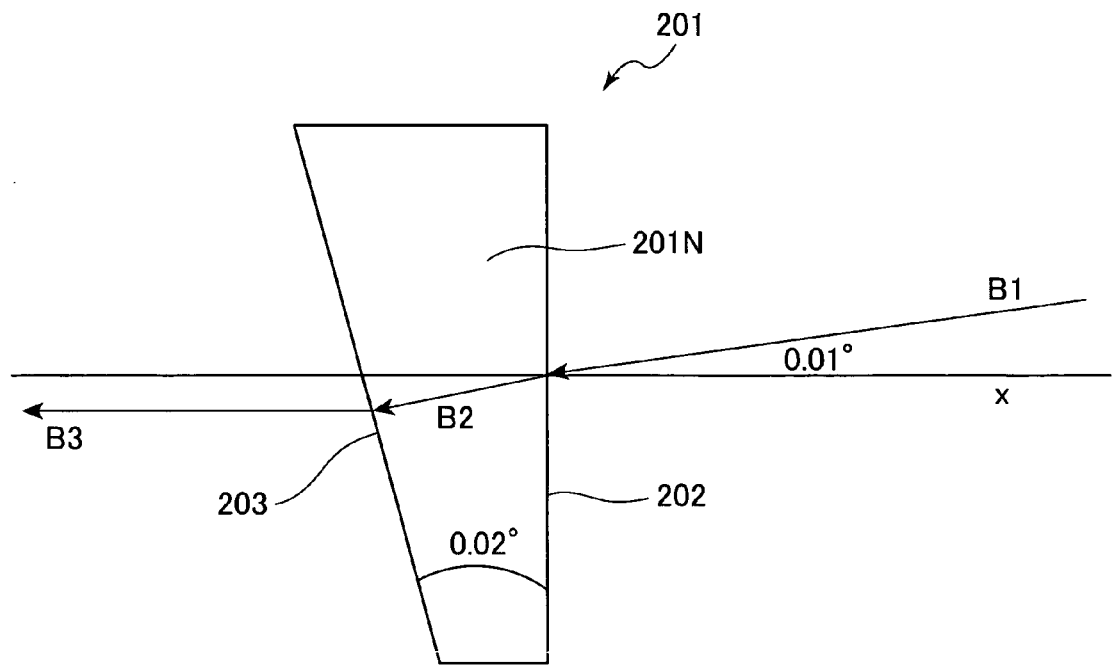
FIG. 25 is an explanatory view showing an example of using the beam-emission-angle compensating element of the third embodiment.

FIG. 25 shows an example of employing the beam-emission-angle compensating element 201 of the present embodiment. While the effects of angle correction are not dependent on the installation angle ξ formed by the angle compensating element 201 and the x-axis, as described above, the installation direction of the angle compensating element 201 is important. The installation direction of the angle compensating element 201 depends on the sign of the angle α=−δ/(n−1). As shown in FIG. 25 when the beam BE is slanted by δ=+0.01° in relation to the x-axis in the present example, the beam B1 is slanted upwardly. The angle α=−δ/(n−1) has a value of −0.02° and therefore has a negative sign. Accordingly, the angle compensating element 201 is disposed such that the portion forming the angle of 0.02° (=|α|=|−δ/(n−1)|) is directed downwardly. In other words, the angle compensating element 201 is disposed such that the narrower portion of the angle compensating element 201 is positioned below the x-axis and the wider portion above the x-axis. In contrast, if the beam B1 is slanted by δ=−0.01° in relation to the x-axis, the beam B1 is slanted downwardly relative to the x-axis. The angle α=−δ/(n−1) has a value of +0.02° and therefore has a positive sign. Accordingly, the angle compensating element 201 is oriented such that the portion forming the angle of 0.02° (=|α|=|−δ/(n−1)|) is directed upwardly. To summarize, the angle compensating element 201 having an angle of |α|=|−δ/(n−1)| is oriented with the portion forming the angle |α| being located above or below the reference axis x dependently on the sign of the value α=−δ/(n−1).

It is noted, however, that since the thickness and external size of the element 201 have no bearing on the angle correction effects, the angle compensating element 201 can be designed in any way to suit the size of the optical system needing angle correction.

With this construction, a beam emission angle can be corrected easily and with precision. Since the effects of the angle corrections are not dependent on the precision at which the angle compensating element 201 is arranged, precision is not required when incorporating the angle correcting optical element 201 in the optical system.

As described above, the beam-emission-angle correcting optical unit 201 of the present embodiment is constructed from the single optical element formed of a light-transmissive member having a refractive index n. According to the beam-emission-angle correcting optical unit 201, the light incident surface 202 receives an incident light beam in an incident beam direction which is defined with respect to the reference axis x. The light emitting surface 203 emits an output light beam in an output beam direction which is defined with respect to the reference axis x. The light incident surface 202 and the light emitting surface 203 form an angle α therebetween, the angle α having a value that depends on the refractive index n.

Figure 24:
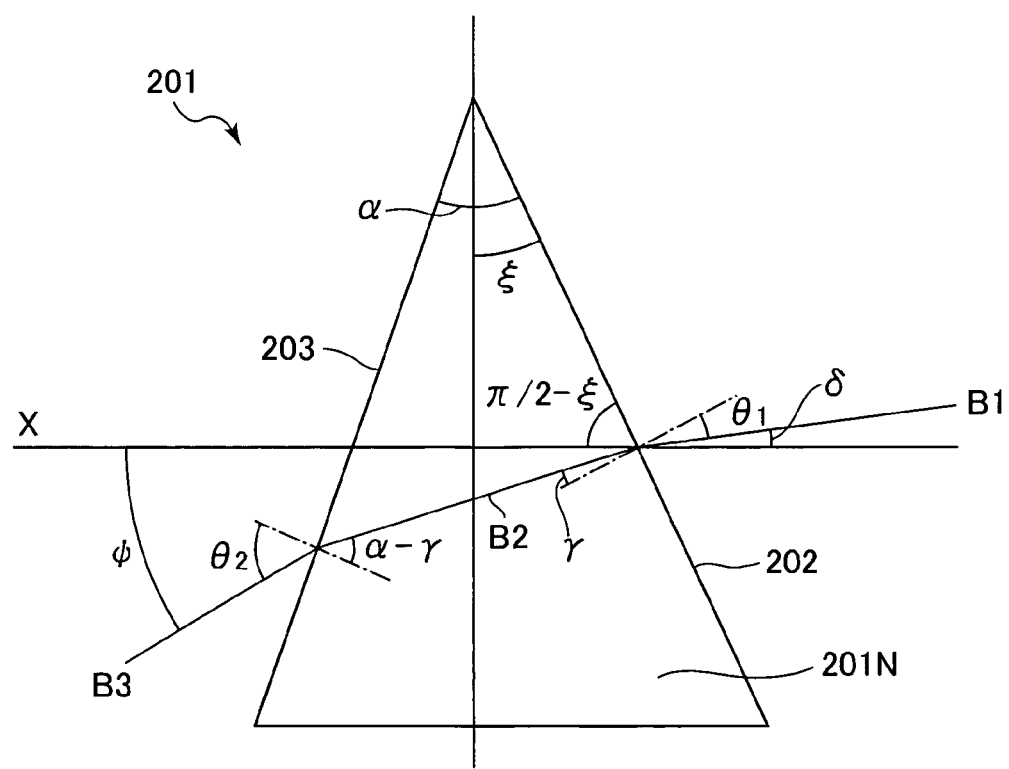
FIG. 24 is an explanatory view showing the principles of angular correction according to the beam-emission-angle compensating element of the third embodiment.

As shown in FIGS. 22, 24, and 25, the light incident surface 202 and the light emitting surface 203 define an imaginary normal plane 201N, which is orthogonal or normal to both the light incident surface 202 and the light emitting surface 203 and which extends along the reference axis K. In FIGS. 24 and 25, the imaginary normal plane 201N is located on the same plane of the sheets of the drawings. The light beams B1, B2, and B3 travel along the single imaginary normal plane 201N. More specifically, along the imaginary normal plane 201N, the light beam 51 falls incident on the light incident surface 202 and is refracted at the light incident surface 202. Along the imaginary normal plane 201N, the light beam B2 travels in the angle compensating element 201, and is refracted at the light emitting surface 203. The light beam B3 emits outward from the light emitting surface 203 along the imaginary normal plane 201N. When the incident light direction is originally shifted from the reference axis x by the angle δ, by setting the angle α to have a value that substantially satisfies an equation α=−δ/(n−1), the output beam direction becomes parallel with the reference axis x.

[Laser Marking Apparatus]

A laser marking apparatus 285 according to the third embodiment has basically the same construction as the laser marking apparatus 85 according to the first embodiment as shown in FIG. 6. The laser marking apparatus 285 is provided with a line-beam-generating optical system 286 instead of the line-beam-generating optical system 86. Other than that, the laser marking apparatus 285 has the same construction as the laser marking apparatus 8a.

Figure 26:
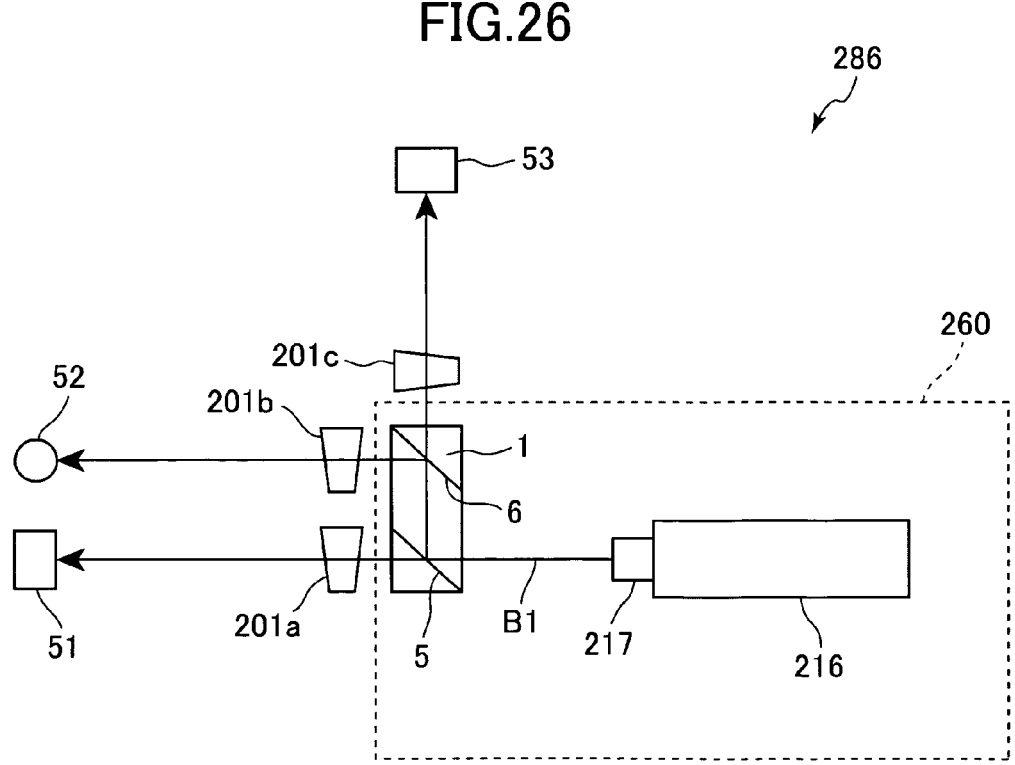
FIG. 26 is an explanatory diagram (side view) showing a line-beam generating optical system provided in the laser marking apparatus of the third embodiment.

As shown in FIG. 26, the line beam generating optical system 286 includes a semiconductor laser 216 disposed horizontally in relation to the laser marking apparatus 285. A collimating lens 217 converts the laser beam emitted from the semiconductor laser 216 into a collimated light (parallel rays) or incident light 11 having a circular beam cross-section. In the present embodiment, the diameter of the collimated light B1 is set to 2 mm.

The line beam generating optical system 286 employs the beam splitter 1 described in the first embodiment, for separating the incident light B1 into three beams of equal intensity.

Light reflected off the first light separating layer 5 travels through the beam splitter 1 and is further separated into reflected light and transmitted light by the second light separating layer 6, thereby obtaining three divided beams. Hence, three line beams are obtained by disposing rod lenses 51, 52, and 53 along the optical paths of each light beam.

If the beam splitter 1 included manufacturing variations or errors in processing, there will also be errors in the angle at which the divided light beams are emitted. However, extremely high precision is required in directions of line beams emitted from the laser marking apparatus. For example, the line beam must be directed at a precision within 1 mm at a distance of 10 m. In order to maintain precision within an error of 1 mm at a distance of 10 m, the light beam emitted from the beam splitter 1 must form an angle of 0.005° or less with the ideal horizontal line (x-axis) Hence, correction is required if the angle formed by each divided line beam and the ideal line exceeded 0.005°. In the present embodiment, angle compensating elements 201a, 201b, and 201c are disposed on the respective optical paths of the beams emitted from the beam splatter 1.

The angle compensating elements 201a, 201b, and 201c have the same configurations as the angle compensating element 201 of the present embodiment For example, when the divided beam forms an angle of 0.03° with the ideal line, an angle compensating element 201 having an angle α=−0.03/(1.5−1)=0.06° is used to perform angular correction in order that the light emitted from the compensating element forms an angle of 0° with the ideal line. By disposing the rod lens 51, rod lens 52, and rod lens 53 in the downstream side of the angle compensating elements 201a, 201b, and 201c, line beams generated by the rod lens 51, rod lens 52, and rod lens 53 can be aligned with ideal lines at a directing precision of 0.

According to the laser marking apparatus 285 of the present embodiment, the laser 216 generates a light beam. The collimating optical element 217 collimates the light beam into a collimated light beam. The beam splitting unit 1 receives the collimated light beam from the collimating optical element 217 and splits the light beam into the plurality of incident light beams. Each of the plurality of beam-emission-angle correcting optical units 201a, 201b, 201c receives a corresponding one of the plurality of incident light beams from the beam splitting unit 1, and corrects the beam emission angle of the received light beam. Each of the plurality of line-beam-generating optical elements 51, 52, 53 generates a line beam from an output light beam that is emitted from the corresponding beam-emission-angle correcting optical unit 201a, 201b, 201c.

The support unit 87 supports the laser 216, the collimating optical element 217, the beam splitting unit 1, the beam-emission-angle correcting optical units 201a, 201b, 201c, and the line-beam-generating optical elements 51, 52, and 53.

It is noted that the beam splitting unit 1 may be omitted. In this case, a single beam-emission-angle correcting optical unit 201 is mounted to receive, as an incident light beam, the collimated light beam from the collimating lens 217, and corrects its beam emission angle.

According to the present embodiment, when the angle $\alpha$ satisfies the equation $\alpha=-2\delta$ and when the reference axis x extends normal to the light incident surface 202, it is preferable that the refractive index n is within a range $1.45 \leq n \leq 1.55$ in order that the angle compensating element 201 can exhibit a suitable correcting effect.

Let us consider the case in which the incidence surface 202 of the angle compensating element 201 is positioned orthogonal to the x-axis, as shown in FIG. 25. This is equivalent to the case in which $\xi=0$ in FIG. 24, From equation (7), $$\phi = \alpha - \xi - \theta_2 = \alpha - \theta_2 \quad (11)$$

Here, since $\theta_2 = n \cdot \alpha - \theta_1$, from equation (8), by substituting this expression into equation (11) and rearranging the equation, we have:

$$\phi = (1-n)\alpha + \theta_1 \quad (12)$$

Here, the apex angle of the angle compensating element 201 is $\alpha=-2\delta$, as described above, and $\delta=\xi-\theta_1$, from equation (6). However, since to, $\xi=0$, $\delta=-\theta_1$. Hence, $\alpha=2\theta_1$. By inserting this into equation (12) and rearranging the equation, $$\phi = (1-n)(2\theta_1) + \theta_1 = (3-2n)\theta_1 \quad (13)$$

By rearranging equation (13), we have the following.

$$n = (3-\phi/\theta_1)/2 \quad (14)$$

A general optical element, such as a beam splitter, employed by a laser marking apparatus has an angular precision of approximately 3 arc-minutes. Accordingly, such an optical element can generate a line beam having a maximum line beam directing precision of approximately ±0.05°. Since the allowable line beam directing precision in the present embodiment is 0.005°, n can be calculated as follows by substituting $\theta_1=\pm0.05$ and $\phi=0.005$ in equation (14).

n=1.45, n=1.55

Hence, it is found that the line beam directing precision of the laser marking apparatus can be maintained within the range of the specification, provided that the refractive index n of the angle compensating element 201 is within the range $1.45 \leq n \leq 1.55$.

Since the refractive index of common glass or plastic materials falls within the range $1.45 \leq n \leq 1.90$, $\alpha=-1.1\delta$ and $\alpha=-2.2\delta$ are obtained by substituting these values of n into equation (10). Since $\delta=-\theta_1$ when $\xi=0$, $\alpha=1.1\theta_1$ and $\alpha=2.2\theta_1$ are obtained. It is therefore known that when the reference axis x extends normal to the light incident surface 202, it is preferable that the angle $\alpha$ satisfies an inequality $1.1\theta_1 \leq \alpha \leq 2.2\theta_1$.

As described above, according to the present embodiment, the apex angle $\alpha$ of the angle compensating element 201 used for angular correction can be easily designed when using ordinary glass or plastic When the incident light direction is shifted from the reference axis x with the angle $\theta$, by setting the angle $\alpha$ to have the value that substantially satisfies an equation $\alpha=\theta/(n-1)$, it is ensured that the output beam direction becomes parallel with the reference axis x. It is preferable that the angle $\alpha$ satisfies an inequality $1.1\theta \leq \alpha \leq 2.2\theta$. It is preferable that the refractive index n is within a range $1.45 \leq n \leq 1.55$ when the angle $\alpha$ satisfies the equation $\alpha=2\theta$.

There is also a case in which an optical element can generate a line beam having a maximum line beam directing precision of approximately ±0.08°. At this time, n can be calculated as follows by substituting $\theta_1=\pm0.08$ and $\phi=0.005$ in equation (14).

n=1.4688, n=1.5313

In this case, it is found that the line beam directing precision of the laser marking apparatus can be maintained within the range of the specification, provided that the refractive index n of the angle compensating element 201 is within the range $1.4688 \leq n \leq 1.5313$. Hence, it is known that the refractive index of the angle compensating element 201 need be approximately within the range $1.47 \leq n \leq 1.53$ when the angle $\alpha$ satisfies the equation $\alpha=2\theta$.

<First Modification>

Figure 27A:
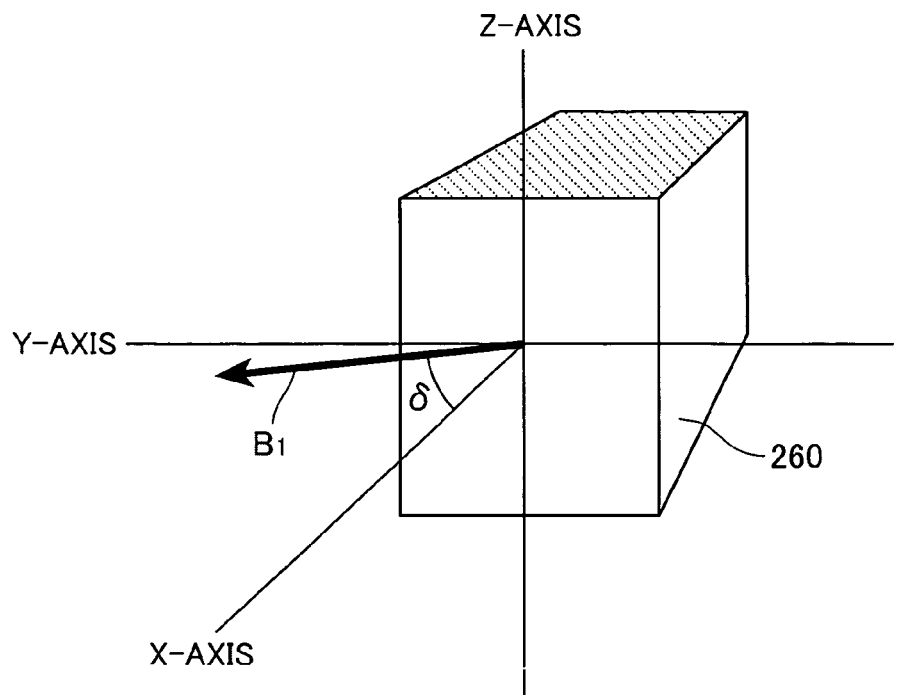
FIG. 27(a) is an explanatory diagram (perspective view) showing a beam emitted from an optical system.
Figure 27B:
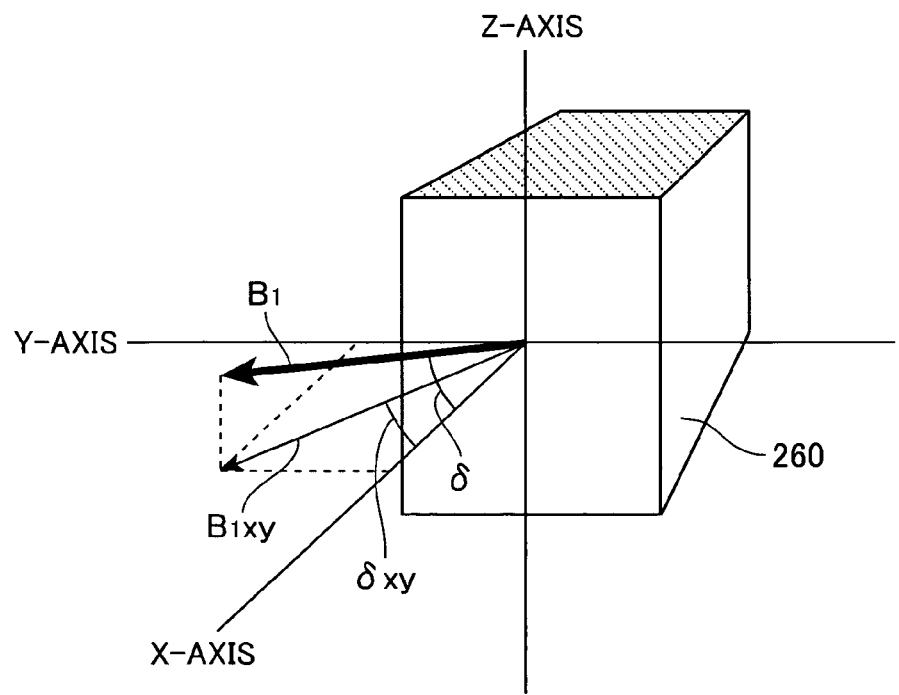
FIG. 27(b) is an explanatory diagram showing an orthogonal projection component to xy plane of the beam emitted from the optical system shown in FIG. 27(a)
Figure 27C:
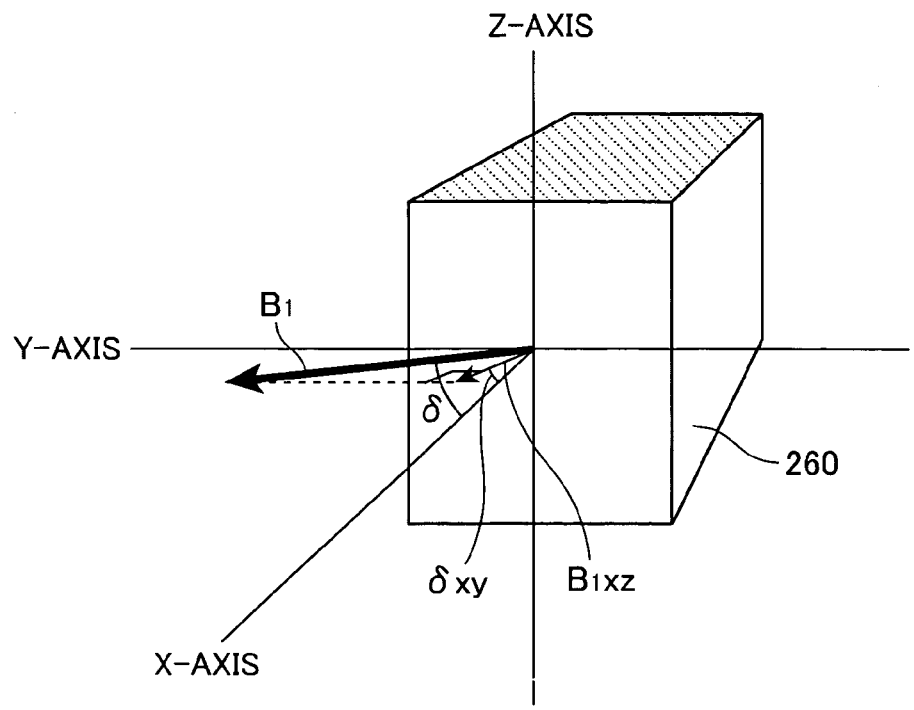
FIG. 27(c) is an explanatory diagram showing an orthogonal projection component to xz plane of the beam emitted from the optical system shown in FIG. 27(a)
Figure 27D:
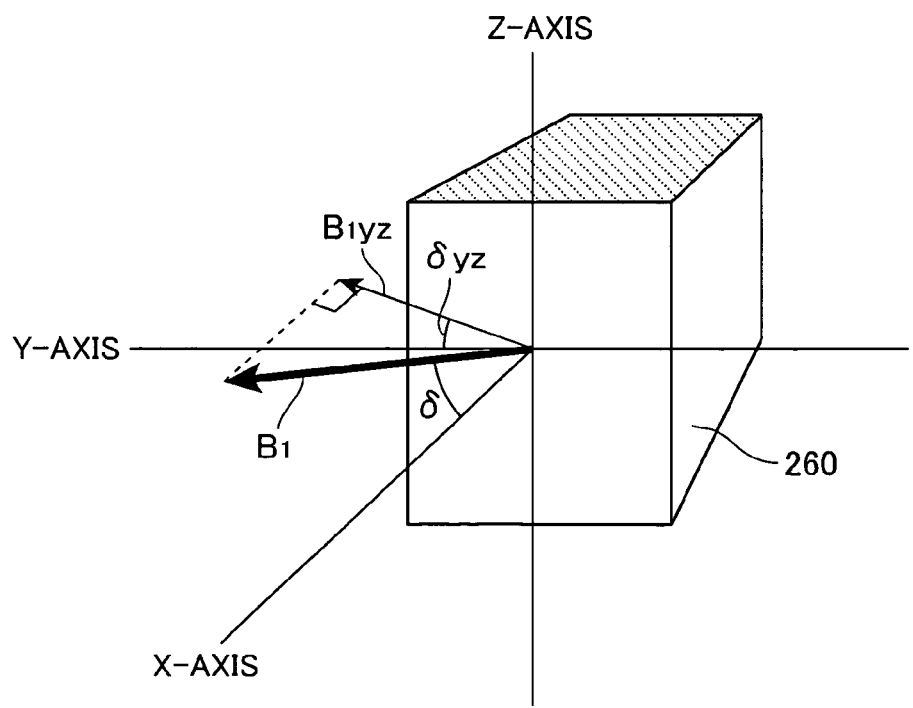
FIG. 27(d) is an explanatory diagram showing an orthogonal projection component to yz plane of the beam emitted from the optical system shown in FIG. 27(a)

Next, angular correction according to a first modification of the third embodiment will be described with reference to FIGS. 27(a) through 30. This angular correction is performed when the outgoing beam B1 emitted from a beam generating optical system 260 is slanted three-dimensionally in relation to the x-axis. The beam generating optical system 260 includes the laser 216, the collimating lens 217, and the beam splitting unit 1 (FIG. 26). An x, y, and z coordinate system is established, as shown in FIG. 27(a) In this example, the beam BE is shifted by an angle $\delta$ from the x-axis. FIGS. 27(b)–27(d) respectively show orthogonal projection components B1xy, B1xz, and B1yz of the beam B1 in relation to the xy plane, the xz plane, and the yz plane. More specifically, the direction of the beam B1 is shifted from the x-axis by the angle of $\delta$ so that an angle $\delta xy$ is formed between the x-axis and the orthogonal projection component $B1_{xy}$ of the beam B1 in the xy plane as shown in FIG. 27(b), so that an angle $\delta xz$ is formed between the x-axis and the orthogonal projection component $B1_{xz}$ of the beam B1 in the xz plane as shown in FIG. 27(c), and so that an angle $\delta yz$ is formed between the y-axis and the orthogonal projection component $B1_{yz}$ of the beam 31 in the yz plane as shown in FIG. 27(d).

Figure 28:
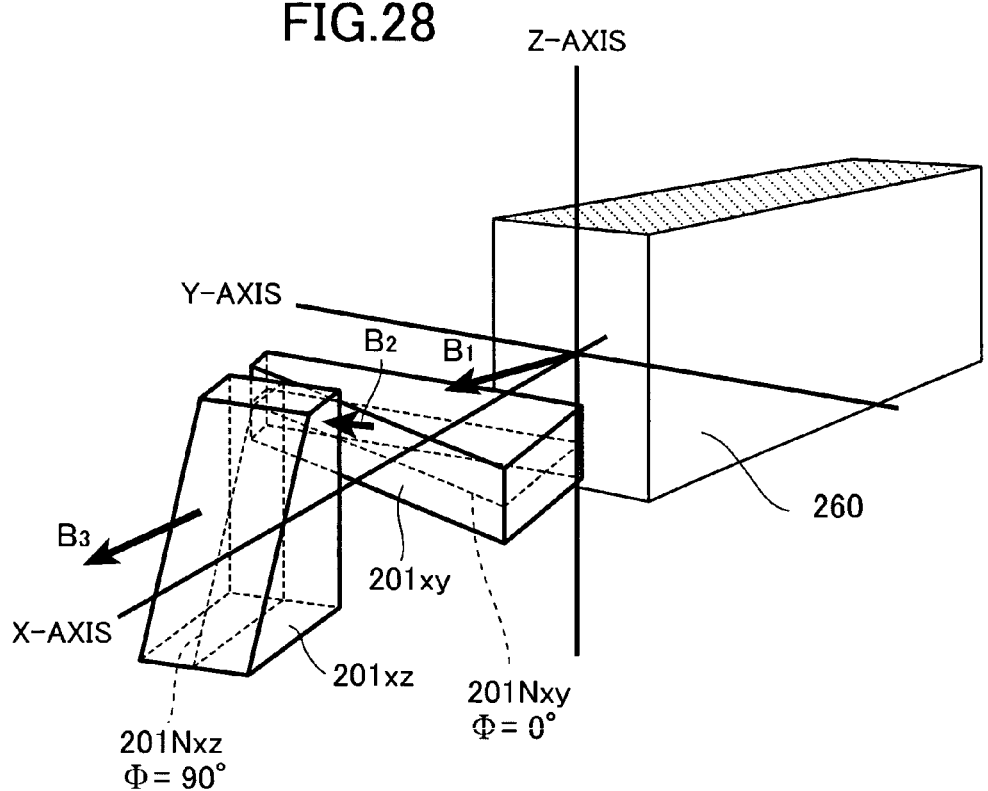
FIG. 28 is an explanatory diagram (perspective view) showing beam-emission-angle compensating elements according to a first modification of the third embodiment.
Figure 29:
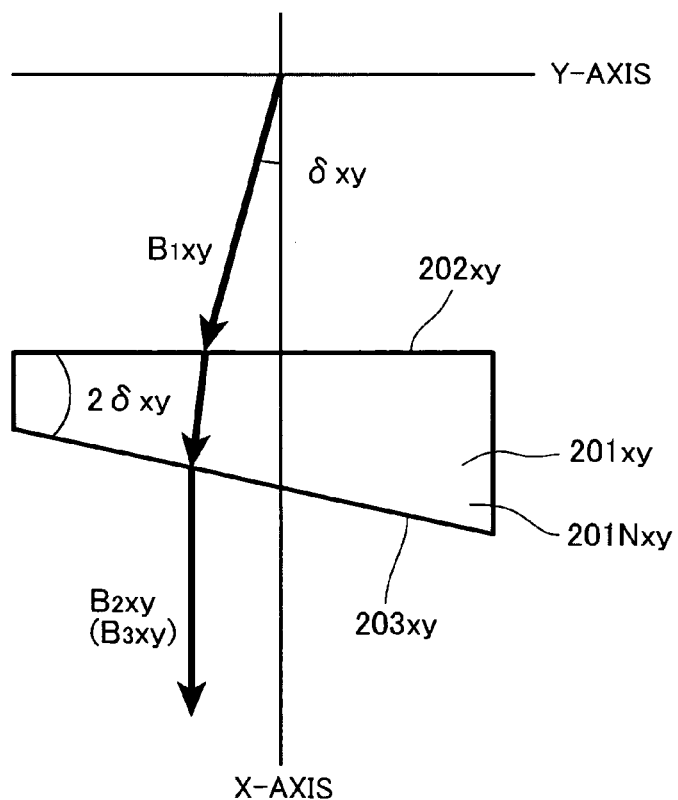
FIG. 29 is an explanatory diagram (xy plane) showing the principles of correcting a beam emission angle by using one beam-emission-angle compensating element shown in FIG. 28.
Figure 30:
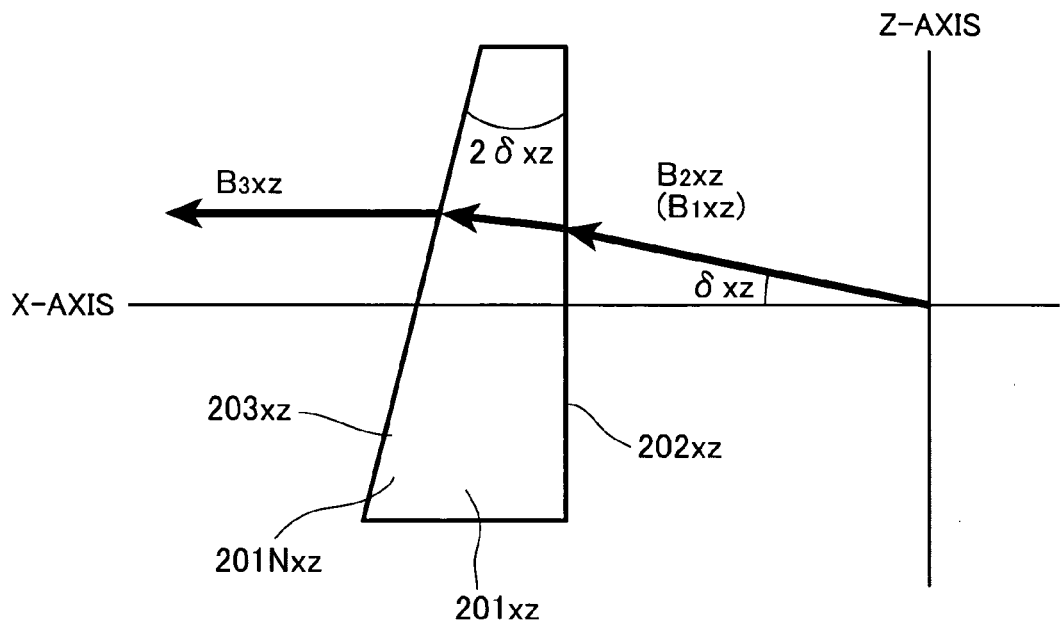
FIG. 30 is an explanatory diagram (xz plane) showing the principles of correcting a beam emission angle by using the other beam-emission-angle compensating element shown in FIG. 28.

As shown in FIG. 28, an angle compensating element $201_{xy}$ and an angle compensating element $201_{xz}$ are disposed at predetermined positions on the x-axis. The orthogonal projection of the angle compensating element $201_{xy}$ to the xy plane is shown in FIG. 29 and the orthogonal projection of the angle compensating element $201_{xy}$ to the xz plane is shown in FIG. 30. When the incident beam B1 is slanted three-dimensionally in relation to the x-axis, it is possible to correct the incident beam B1 into an output beam B3 that is parallel to the x-axis by disposing the angle compensating element $201_{xy}$ and the angle compensating element $201_{xz}$ orthogonal to each other as shown in FIG. 28. That is, the angle compensating element $201_{xy}$ is oriented along the xy plane, while the angle compensating element $201_{xz}$ is oriented along the xz plane.

Because we call the angle formed by the x-axis and the orthogonal projection $B1_{xy}$ $\delta_{xy}$ as shown in FIGS. 27(b) and 29, then from equation (10) it is known that the magnitude of the apex angle in the angle compensating element $201_{xy}$ has to be set to $-\delta_{xy}/(n-1)$. When the angle compensating element $201_{xy}$ is formed of BK7 having a refractive index of 1.5, $\alpha = -2\delta_{xy}$. The angle compensating element $201_{xy}$ performs angular correction to convert the beam B1 into an outgoing light beam 32 that is parallel to the xz plane as shown in FIG. 28. The orthogonal projection component $B2_{xy}$ of the outgoing light beam B2 in the xy plane is shown in FIG. 29, while the orthogonal projection component $B2xz$ of the outgoing light beam B2 in the xz plane is shown in FIG. 30. The angle formed between the orthogonal projection component $B2_{xy}$ and the x-axis is zero (0). The angle formed between the orthogonal projection component $B2_{xz}$ and the x-axis is equal to the angle $\delta_{xz}$ formed between the x-axis and the orthogonal projection component $B1_{xz}$ of the original beam B1 to the xz plane Because we call the angle formed by the x-axis and the orthogonal projection $B1_{xz}$ $\delta_{xz}$ as shown in FIGS. 27(c) and 30, then from equation (10) it is known that the magnitude of the apex angle in the angle compensating element $201_{xz}$ has to be set to $-\delta_{xz}/(n-1)$. When the angle compensating element $201_{xz}$ is formed of BK7 having a refractive index of 1.5, as shown in FIG. 30, the angle compensating element $201_{xz}$ has an apex $\alpha = -2\delta_{xz}$. The angle compensating element $201_{xz}$ performs angular correction to convert the beam B2, which is emitted from the angle compensating element $201_{xy}$ and which has the orthogonal projection component $B2_{xz}$ in the xz plane, into an outgoing light beam B3 that is parallel to the x-axis. The orthogonal projection component $B3_{xz}$ of the outgoing light beam B3 in the xz plane is shown in FIG. 30. The angle formed between the x-axis and the orthogonal projection component $B3_{xz}$ is zero (0). The angle formed between the orthogonal projection component $B3_{xy}$ and the x-axis is equal to the angle (0) formed between the x-axis and the orthogonal projection component $B2_{xy}$ of the intermediate beam B2 to the xy plane (FIG. 29).

More specifically, according to the present modification, the reference axis is defined in the xyz space. The xyz space is defined by x-axis, y-axis, and z-axis that are normal to one another. The x-axis and the y-axis define the xy plane, the x-axis and the z-axis define the xz plane, and the y-axis and the z-axis define the yz plane The reference axis extends along the x-axis. The incident beam direction is shifted from the x-axis by the angle of $\delta$ so that the angle $\delta xy$ is formed between the x-axis and the orthogonal projection component $B1xy$ of the incident light beam B1 in the xy plane and so that the angle $\delta xz$ is formed between the x-axis and the orthogonal projection component $B1xz$ of the incident light beam B1 in the xz plane. The first optical element $201xy$ and the second optical element $201xz$ are arranged along the reference axis x. The first optical element $201xy$ receives the incident light beam B1 and outputs the intermediate light beam B2 The second optical element $201xz$ receives the intermediate light beam B2 and outputs an output light beam B3.

The first optical element $201xy$ is formed of a light-transmissive member having a refractive index n (1.5, in this example). The first optical element $201xy$ has a first light incident surface $202xy$ and a first light emitting surface $203xy$. The first light incident surface $202xy$ receives the incident light beam B1 in the incident beam direction, and the first light emitting surface $203xy$ emits the intermediate light beam B2 in the intermediate beam direction which is defined with respect to the reference axis x. The first light incident surface $202xy$ and the first light emitting surface $203xy$ forms an angle $\alpha_1$ therebetween. The angle $\alpha_1$ has a value substantially equal to $\delta xy/(n-1)$ (=2 $\delta xy$, in this example). The first light incident surface $202ky$ and the first light emitting surface $203xy$ define the first imaginary normal plane $201Nxy$, which is normal to both the first light incident surface $202xy$ and the first light emitting surface $203xy$ and which extends along the reference axis x. The first optical element $201xy$ is disposed so that the first imaginary normal plane $201Nxy$ is oriented to extend along the xy plane. In other words, the first imaginary normal plane $201Nxy$ is oriented with a rotational angle $\Phi$ defined from the xy plane having a value equal to 0°. In FIG. 29, the first imaginary normal plane $201Nxy$ is located on the same plane of the sheet of drawing. Accordingly, the first optical element $201xy$ outputs the intermediate light beam B2 in the intermediate beam direction that extends parallel to the Kz plane.

The second optical element $201xz$ is formed of another light-transmissive member having a refractive index n (1.5 in this example) As shown in FIG. 30, the second optical element $201xz$ has a second light incident surface $202xz$ and a second light emitting surface $203xz$. The second light incident surface $202xz$ receives the intermediate light beam B2 in the intermediate beam direction from the first optical element $201xy$. The second light emitting surface $203xz$ emits the output light beam B3 in the output beam direction which is defined with respect to the reference axis x. The second light incident surface $202xz$ and the second light emitting surface $203xz$ form an angle $\alpha_2$ therebetween. The angle $\alpha_2$ has a value substantially equal to $\delta xz/(n-1)(=2 \delta xz$, in this example). The second light incident surface $202xz$ and the second light emitting surface $203xz$ define a second imaginary normal plane $201Nxz$, which is normal to both the second light incident surface $202xz$ and the second light emitting surface $203xz$ and which extends along the reference axis x. The second optical element $201xz$ is disposed with the second imaginary normal plane $201Nxz$ being oriented to extend along the xz plane. In other words, the second imaginary normal plane $201Nxz$ is oriented with a rotational angle $\Phi$ defined from the xy plane having a value equal to 90°. In FIG. 30, the second imaginary normal plane $200Nxz$ is located on the same plane with the sheet of drawing. Accordingly, the second optical element $201xz$ outputs the output light beam B3 in the output beam direction that extends parallel to the xy plane. This results in that the output beam direction extends parallel with the x axis <Second Modification>

Next, angular error correction according to a second modification of the third embodiment will be described. In this modification, as shown in FIG. 31, a single angle compensating element 201 having an apex angle of $-\delta/(n-1)$ is used to obtain a beam parallel to the x-axis.

Figure 31:
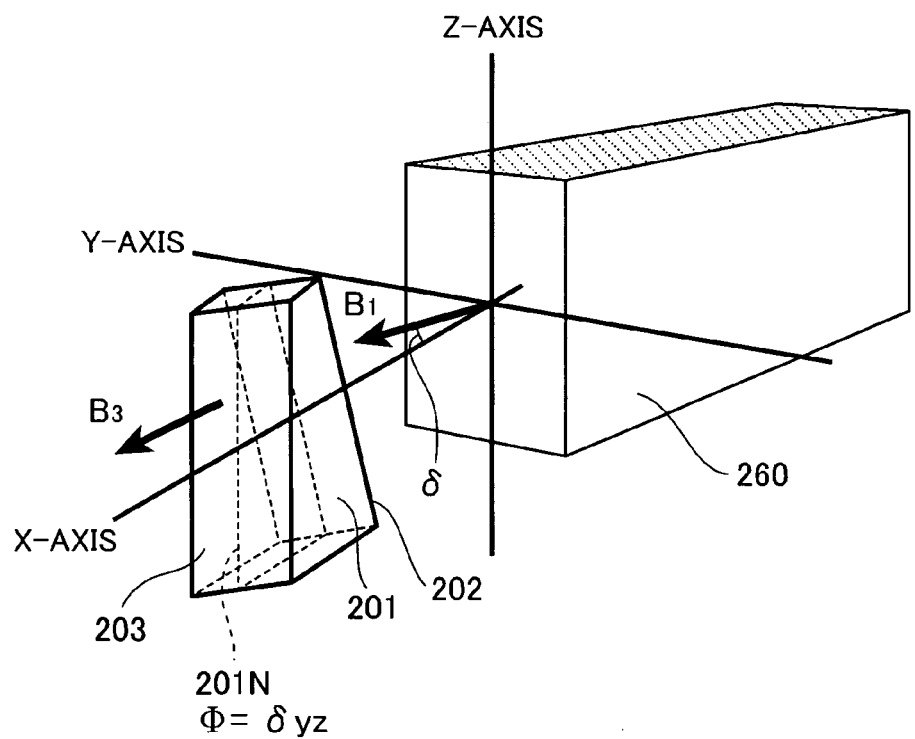
FIG. 31 is an explanatory diagram (perspective view) showing a beam-emission-angle compensating element according to a second modification of the third embodiment.
Figure 32:
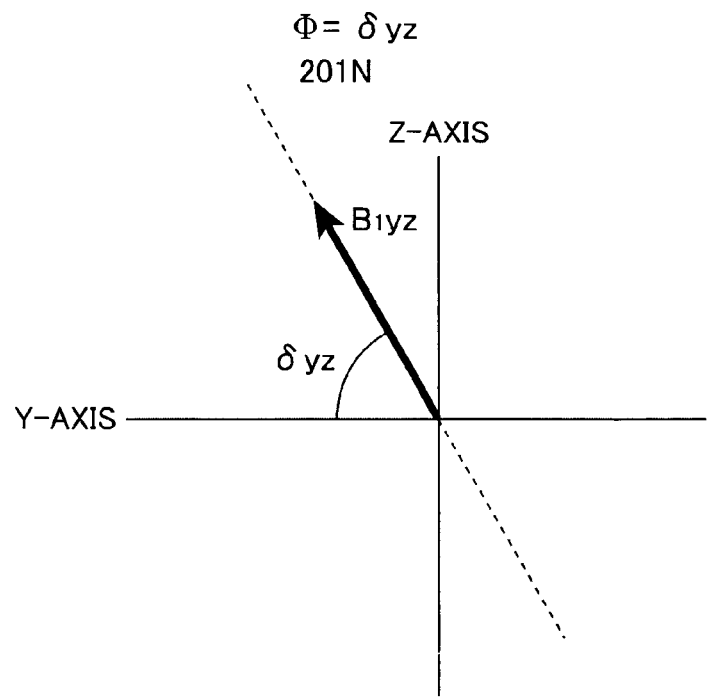
FIG. 32 is an explanatory diagram (yz plane) showing the principles of correcting a beam emission angle by using the beam-emission-angle compensating element shown in FIG. 31.

The angle formed by the incident beam B1 and the x-axis is δ, as shown in FIG. 31. Sufficient or appropriate correction cannot be achieved by disposing the angle compensating element 201 with the apex angle of −δ/(n−1) parallel to the y-axis or the z-axis. The angle compensating element 201 must be disposed at a predetermined angle to the y-axis. The angle at which the angle compensating element 201 is disposed in relation to the y-axis is determined as follows:

The orthogonal projection $B1_{yz}$ of the beam B1 to the yz plane is shown in FIGS. 27(d) and 32. Because the angle formed by the orthogonal projection $B1_{yz}$ with the y-axis is called $\delta_{yz}$, then $\delta_{yz}$ is the angle at which the angle compensating element 201 should be disposed When the angle compensating element 201 is formed of BK7 having a refractive index of 1.5, then an outgoing beam parallel to the x-axis can be obtained by disposing the beam-emission-angle compensating element 201 having the apex angle α=−2δ at an angle $\delta_{yz}$ to the y-axis, as shown in FIGS. 31 and 32. For practical purposes, the angle compensating element 201 can be rotated appropriately about the x-axis and fixed in position when the outgoing beam B3 forms an angle of 0° with the x-axis. With this construction, it is possible to correct angular error three-dimensionally using a single angle compensating element.

In this way, according to the present modification, when the incident beam direction is shifted from the reference axis x by the angle δ so that an angle δyz is formed between the y-axis and the orthogonal projection component B1yz of the incident light beam B1 in the yz plane, the angle α between the light incident surface 202 and the light emitting surface 203 has to be set to a value that substantially satisfies an equation α=δ/(n−1). The optical element 201 is disposed so that its imaginary normal plane 201N (FIG. 31) is shifted by a rotational angle δyz from the xy plane around the x-axis as shown in FIG. 32 and so that the imaginary normal plane 201N is located on the same plane with the projection component B1yz of the incident light beam B1 to the yz plane. In other words, the imaginary normal plane 201N is oriented with a rotational angle Φ defined from the xy plane having a value equal to the value of δyz. Accordingly, the light emitting surface 203 outputs the output light beam in the output beam direction that is parallel with the x axis.

In this way, the angle δ between the output beam direction and the incident beam direction depends on the refractive index n, the angle α, and the rotational position of the imaginary normal plane 201N of the beam-emission-angle correcting optical unit 201 relative to the reference axis x. Accordingly, it is possible to correct a beam emission angle of the received light by the angle δ by properly setting the refractive index n, the angle α, and the rotational position of the imaginary normal plane 201N of the beam-emission-angle correcting optical unit 201 relative to the reference axis x.

As described above, by employing the beam-emission-angle compensating element 201 of the present embodiment, the angle of beam emission can be corrected according to a simple method. Further, a line beam having extremely high directing precision can be obtained by mounting the beam-emission-angle compensating element 201 in the optical system of a laser marking apparatus. Accordingly, it is possible to generate a plurality of laser line beams for precise marking at a low cost. As a result, a laser marking apparatus for irradiating a plurality of line beams that have extremely high directing precision can be obtained at a low cost.

<Fourth Embodiment>

Figure 33:
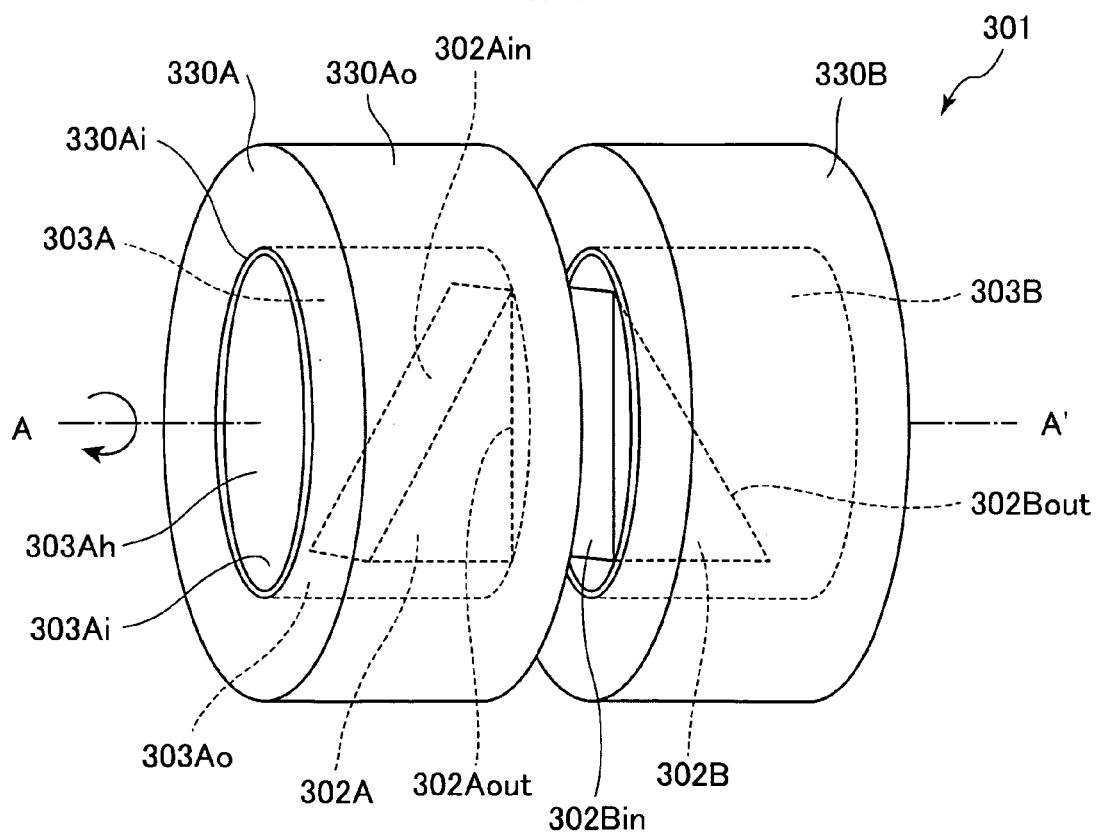
FIG. 33 is a perspective view of a beam-emission-angle compensating optical unit according to a fourth embodiment of the present invention.
Figure 34:
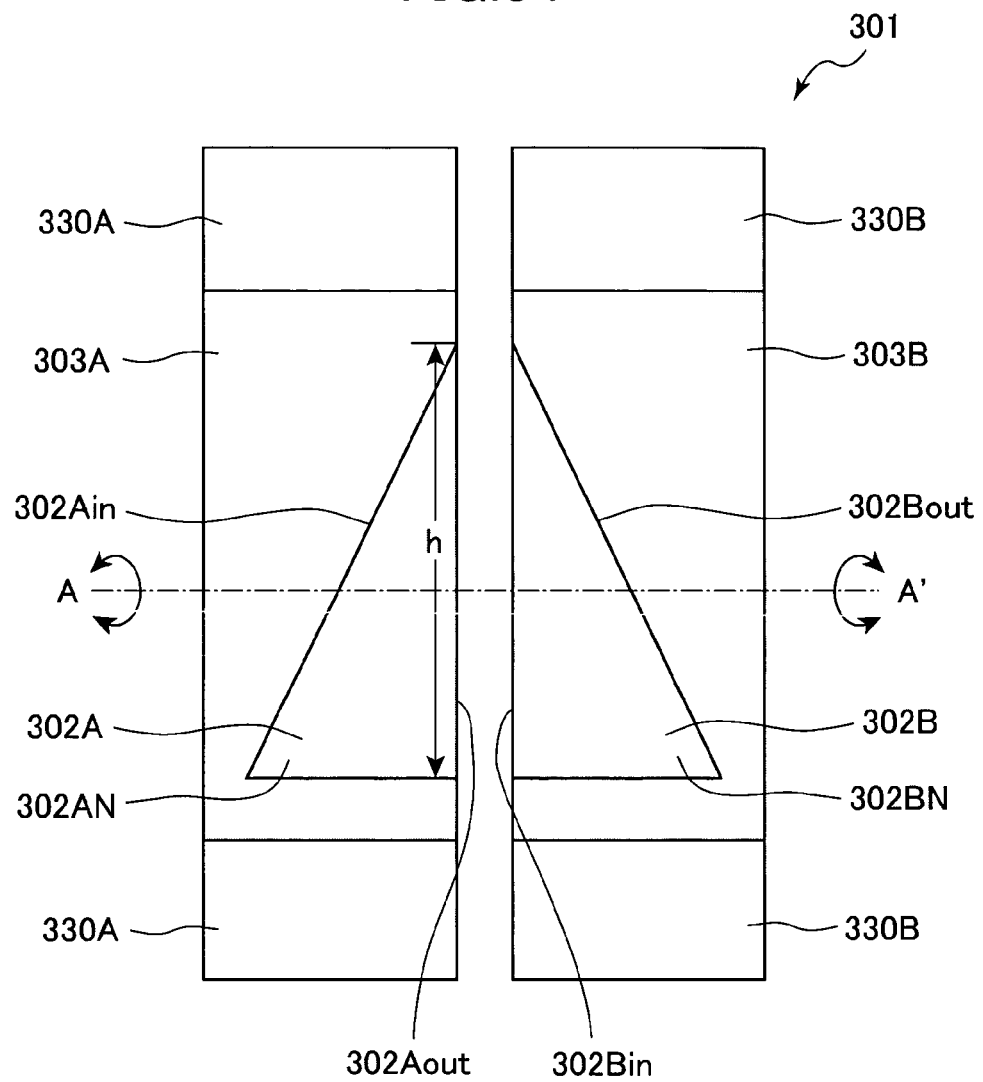
FIG. 34 is an explanatory diagram of the beam-emission-angle compensating optical unit shown in FIG. 33.

FIGS. 33 and 34 shows a beam-emission-angle compensating optical unit 301 according to a fourth embodiment of the present invention.

As shown in FIG. 33, the optical unit 301 includes a first wedge prism 302A, a second wedge prism 302S, a prism holder 303A, a prism holder 303B, a holder support 330A, and a holder support 330B.

The first wedge prism 302A and the second wedge prism 302B are formed of a BK7 glass material having a refractive index of 1.5. Other light-transmissive materials such as glass or plastic can also be used. The first wedge prism 302A has a shape of a triangular prism, and has a first light incidence surface 302Ain and a first light emitting surface 302Aout that form a predetermined angle therebetween. The second wedge prism 302B has also a shape of a triangular prism, and has a second light incidence surface 302Bin and a second light emitting surface 302Bout that form another predetermined angle therebetween.

The prism holder 303A has substantially a shape of a hollow cylinder having an outer surface 303Ao and an inner surface 303Ai. The inner surface 303Ai defines a hollow portion 303Ah for accommodating the first wedge prism 302A. Screw threads (not shown) are formed on the outer surface 303Ao. The first wedge prism 302A is accommodated in the hollow portion 303Ah of the prism holder 303A, and is fixed to the prism holder 303A.

The holder support 330A has a shape of another hollow cylinder or a ring having an outer surface 330Ao and an inner surface 330Ai. Screw threads (not shown) are formed on the inner surface 330Ai of the holder support 330A for engaging with the screw threads on the outer surface 303Ao. The holder support 330A is fixed to a part of a laser marking apparatus to be described later.

The prism holder 303A is rotatably supported by the holder support 330A. More specifically, the prism holder 303A can rotate about an imaginary A-A' axis with its screw threads engaged with the screw threads of the holder support 330A. The A-A' axis is located at a position approximately one-half a height h of the first wedge prism 302A, as shown in FIG. 34.

Similarly, the prism holder 303B is rotatably supported by the holder support 330B. More specifically, the prism holder 303B can rotate about the A-A' axis with its screw threads engaged with the screw threads of the holder support 330B. The prism holder 303B can rotate independently from the prism holder 303A.

In this embodiment, the first light emitting surface 302Aout and the second light incidence surface 302Bin are in contact with each other, However, the surfaces 302Aout and 302Bin are not necessarily in contact with each other as long as the surfaces 302Aout and 302Bin are parallel with each other. In the FIGS. 33 and 34, the surfaces 302Aout and 302Bin are not in contact or, in other words, spaced with each other, for convenience of explanation.

An imaginary normal plane 302AN extends normal to both the surfaces 302Ain and 302Bout. Another imaginary normal plane 302BN extends normal to both the surfaces 302Bin and 302Bout. The planes 302AN and 302BN are on the same plane with the sheet of drawing of FIG. 34.

With this construction, a laser beam is incident on the first light incident surface 302Ain of the first wedge prism 302A, proceeds through the first wedge prism 302A and the second wedge prism 302B, and subsequently is emitted from the second light emitting surface 302Bout of the second wedge prism 302B.

Figure 35:
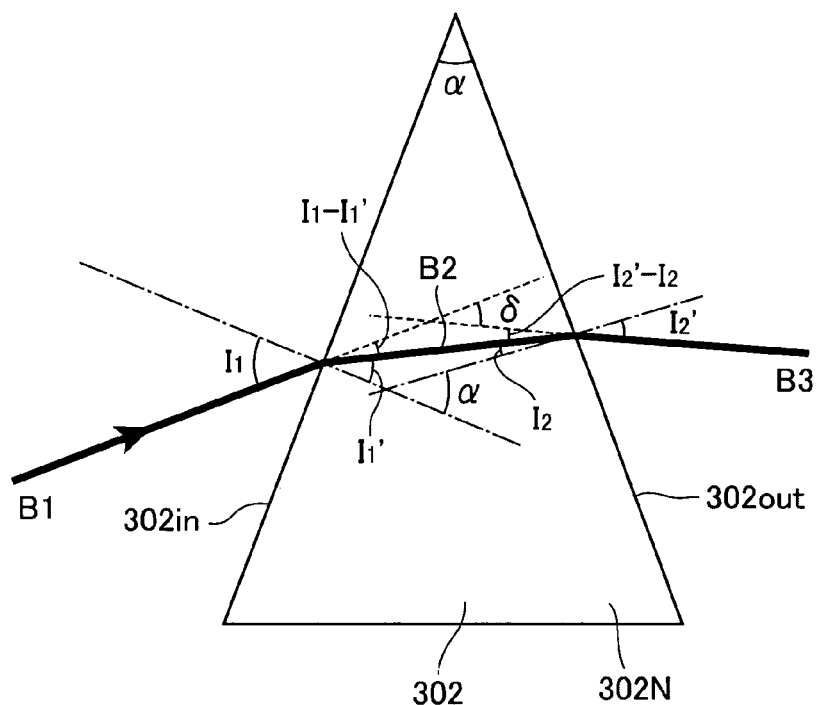
FIG. 35 is an explanatory diagram showing principles of angular correction according to the beam-emission-angle compensating optical unit of the fourth embodiment.

Next, the principles of the beam-emission-angle compensating optical unit 301 will be described. FIG. 35 shows the first wedge prism 302A and second wedge prism 302B of FIGS. 33 and 34 placed adjacent to or fixed to each other, forming a prism 302 having a predetermined apex angle α. First the angle of deviation of a beam passing through the prism 302 will be described with reference to FIG. 35.

A beam B1 emitted from a laser light source (not shown) is incident on the incidence surface of the prism 302 at an angle $I_1$ with the normal to its incident surface 302in. This incident light continues through the prism 302 and is refracted as a beam B2 and subsequently emitted as a beam B3 in a direction that forms an angle $I_2$ with the normal to the outgoing surface 302out. We will call the angle that the beam B2 forms with the normal to the incidence surface 302in in the prism 302 $I_1$ and the angle that the beam B2 forms with the normal to the outgoing surface 302out $I_2$. An imaginary normal plane 302N is defined normal both to the surfaces. 302in and 302out. The imaginary normal plane 302N is located on the same plane with the sheet of the drawing of FIG. 35.

If the refractive index of the prism 302 is n and the refractive index of air is 1, then the following equations are obtained from Snell's law.

$$\sin I_1 = n \cdot \sin I_1' \qquad (101)$$

$$n \cdot \sin I_2 = \sin I_2' \qquad (102)$$

If α is sufficiently small, then the following approximate equations are obtained from equations (101) and (102), $$I_1 = n \cdot I_1' \qquad (103)$$

$$n \cdot I_2 = I_2' \qquad (104)$$

Next, if we define the angle formed by the incident beam B1 and the outgoing beam B3 the "angle of deviation δ," then the following is obtained.

$$\delta = (I_1 - I_1') + (I_2' - I_2) = (I_1 + I_2') - (I_1' + I_2) = (n \cdot I_1' + n \cdot I_2) \\ -\alpha = n(I_1' + I_2) - \alpha = n \cdot \alpha - \alpha = (n-1)\alpha \qquad (105)$$

In other words, the angle of deviation δ can be expressed as follows.

Angle of deviation δ=(refractive index of prism−1)×(apex angle of prism)   (106)

Figure 36:
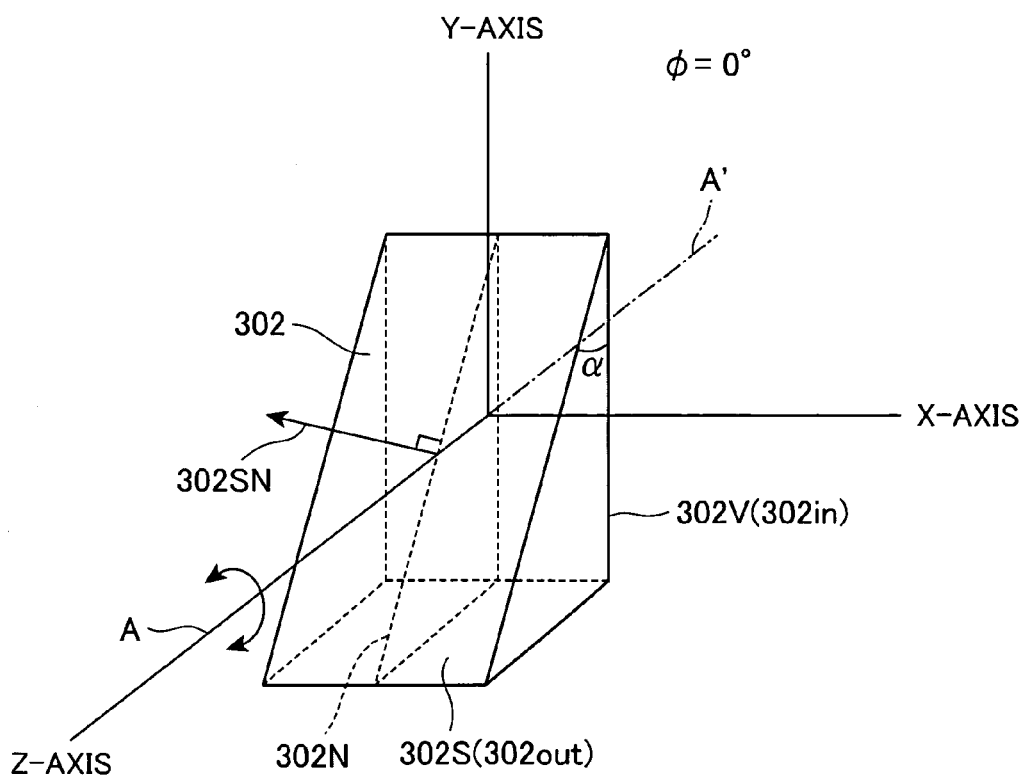
FIG. 36 is an explanatory diagram (perspective view) showing an example prism arrangement in the beam-emission-angle compensating optical unit of the fourth embodiment.

Next, a case will be considered in which the prism 302 has a vertical surface 302V (302in) and a slanted surface 302S (302out) and is disposed such that the vertical surface 302V is parallel to the xy plane, as shown in FIG. 36. The prism 302 is capable of rotating at an arbitrary angle φ about the rotational axis A-A'. In this case, the rotational axis A-A' is aligned with the z-axis. The rotational angle φ of the prism 302 is 0° in the initial state. The rotational angle φ is defined from the YZ plane. That is, the rotational angle φ is equal to zero (0°) when the prism 302 is oriented with its imaginary normal plane 302N being located on the same plane with the YZ plane as shown in FIG. 36.

The orthogonal projections of the normal 302SN to the slanted surface 302S of the prism 302 on the xz plane and the yz plane will be considered. The normal 302SN extends along the imaginary normal plane 302N.

If the rotational angle of the prism is φ and the apex angle of the prism is α, then the equation for the orthogonal projection of the normal 302SN to the yz plane is given as follows;

$$y = \tan \alpha \cdot \cos \phi \cdot z$$

Accordingly, the orthogonal projection of the apex angle is given as follows:

$$\tan^{-1}(\tan \alpha \cdot \cos \phi) \approx \alpha \cdot \cos \phi$$

Hence, the angle of deviation $\delta_{\phi yz}$ in the yz plane can be found from equation. (106) as follows.

$$\delta_{\phi yz} = (n-1)\alpha \cdot \cos \phi \qquad (107)$$

Similarly, an equation for the orthogonal projection of the normal 302SN to the xz plane is given as follows:

$$x = \tan \alpha \cdot \sin \phi \cdot z$$

Accordingly, the orthogonal projection of the apex angle is given as follows:

$$\tan^{-1}(\tan \alpha \cdot \sin \phi) \approx \alpha \cdot \sin \phi$$

Hence the angle of deviation $\delta_{\phi xz}$ in the xz plane can be found from equation (106) as follows.

$$\delta_{\phi xz} = (n-1)\alpha \cdot \sin \phi \qquad (108)$$

Figure 37:
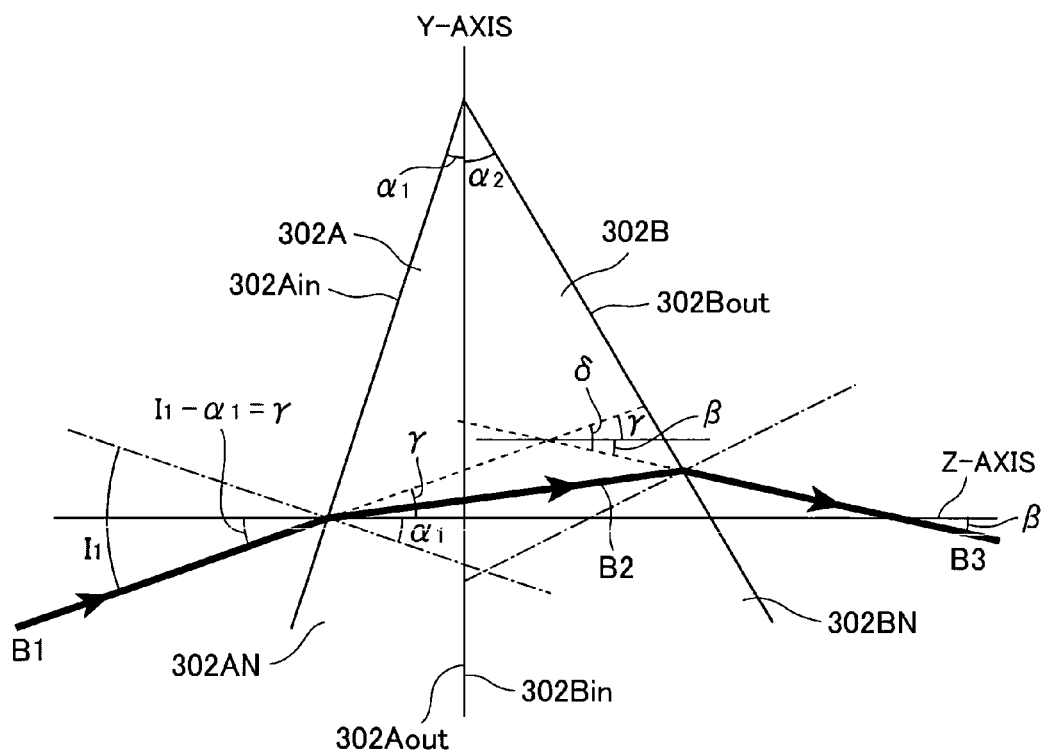
FIG. 37 is an explanatory diagram showing beam deflection effects of the combined prisms.

As shown in FIG. 37, two prisms 302A and 302B having apex angles $\alpha_1$ and $\alpha_2$ respectively are combined to form a single prism. The imaginary normal planes 302AN and 302BN are located on the same plane with the sheet of drawing of FIG. 37. As can be seen from the drawing, when a beam B1 is incident on the combined prism at an incidence angle $I_1$ on the incident surface 302Ain (302in) then an angle β formed by the outgoing beam B3 emitted from the emitting surface 302Bout (302out) and a reference axis (z-axis) is β—δ−$I_1$+$\alpha_1$. If the angle formed by the incident beam B1 and the reference axis z is γ, then since γ=$I_1$−$\alpha_1$, $$\beta = \delta - (\gamma + \alpha_1) + \alpha_1 = \delta - \gamma$$

Therefore, β can be represented as follows.

β=(angle of deviation of combined prisms)−(angle formed by reference axis and incident beam)   (109)

On the other hand, if $\delta_1$ is the angle of deviation obtained by the first wedge prism 302A having an apex angle $\alpha_1$ and $\delta_2$ is the angle of deviation obtained by the second wedge prism 302B having the apex angle $\alpha_2$, then the angle of deviation δ obtained by the combined prisms is as follows.

$$\delta = \delta_1 + \delta_2 \qquad (110)$$

A case of combining two prisms that both have an apex angle α will be considered. The yz plane components (the orthogonal projection component to the yz plane) of the angle of deviation obtained when the prism 302A on the incident beam side is rotated $\phi_1$ and the prism 302B on the outgoing beam side is rotated $\phi_2$ are found as follows from equation (107).

$$\delta_{\phi 1 yz} = (n-1)\alpha \cdot \cos \phi_1 \qquad (111)$$

$$\delta_{\phi 2 yz} = (n-1)\alpha \cdot \cos \phi_2 \qquad (112)$$

Accordingly, the angle of deviation $\delta_{\phi yz}$ of the combined prisms can be found from equation (110)

$$\delta_{\phi yz} = (n-1)\alpha \cdot \cos \phi_1 + (n-1)\alpha \cdot \cos \phi_2 \qquad (113)$$

Similarly, the xz plane components (the orthogonal projection component to the xz plane) of the angle of deviation are found from equation (108).

$$\delta_{\phi 1 xz} = (n-1)\alpha \cdot \sin \phi_1 \qquad (114)$$

$$\delta_{\phi 2 xz} = (n-1)\alpha \cdot \sin \phi_2 \qquad (115)$$

Accordingly, the angle of deviation $\delta_{\phi xz}$ of the combined prisms can be found from equation (110).

$$\delta_{\phi xz}=(n-1)\alpha\cdot\sin\phi_1+(n-1)\alpha\cdot\sin\phi_2 \tag{116}$$

Hence, the yz plane component $\beta_{yz}$ of the angle $\beta$ formed by the outgoing beam B3 and the reference axis (z-axis) is found from equations (113) and (109).

$$\beta_{yz}=(n-1)\alpha\cdot\cos\phi_1+(n-1)\alpha\cdot\cos\phi_2-\gamma_{1yz}=(n-1)\alpha\cdot(\cos\phi_1+\cos\phi_2)-\gamma_{1yz} \tag{117}$$

Similarly, the xz plane component $\beta_{xz}$ of the angle $\beta$ formed by the outgoing beam B3 and the reference axis (z-axis) is found from equations (116) and (109).

$$\beta_{xz}=(n-1)\alpha\cdot\sin\phi_1+(n-1)\alpha\cdot\sin\phi_2-\gamma_{1xz}=(n-1)\alpha\cdot(\sin\phi_1+\sin\phi_2)-\gamma_{1xz} \tag{118}$$

$\beta_{yz}$ and $\beta_{xz}$ should be set to 0 in equations (117) and (118) to perform angular correction or compensation such that the angle between the outgoing beam B3 and the reference axis z is 0°, when the incident beam S1 forms a certain angle $\gamma$ with the reference axis z.

Hence, the following equations can be formed simultaneously.

$$\cos\phi_1+\cos\phi_2=\gamma_{1yz}/((n-1)\alpha) \tag{119}$$

$$\sin\phi_1+\sin\phi_2=\gamma_{1xz}/((n-1)\alpha) \tag{120}$$

Since $\phi_1$ and $\phi_2$ are in a range of $0°\leq\phi_1\leq360°$, $0°\leq\phi_2\leq360°$, $-2\leq\cos\phi_1+\cos\phi_2\leq2$ Hence, $$-2\leq\gamma_{1yz}/((n-1)\alpha)\leq2$$

$$-2\leq\gamma_{1xz}/((n-1)\alpha)\leq2$$

Therefore, $$-2(n-1)\alpha\leq\gamma_{1yz}\leq2(n-1)\alpha \tag{121}$$

$$-2(n-1)\alpha\leq\gamma_{1xz}\leq2(n-1)\alpha \tag{122}$$

Normally the refractive index of glass or plastic material falls within the range $1.45\leq n\leq1.90$, but in actual practice ordinary materials have a refractive index of about 1.5. Hence, by substituting n=1.5 into equations (121) and (122), we get the following:

$$-\alpha\leq\gamma_{1yz}\leq\alpha \tag{123} \text{ and}$$

$$-\alpha\leq\gamma_{1xz}\leq\alpha \tag{124}.$$

Hence, it is clear that the angle of deviation can be completely compensated or corrected to 0°, provided that $\gamma_{1yx}$ and $\gamma_{1xz}$ are smaller than the apex angle $\alpha$ of the prism. The rotational angle of the prism at this time can be found from equations (119) and (120).

In the present embodiment the prism is formed of BK7, which is an ordinary optical glass having a refractive index of n=1.5. Here, a case for correcting the angle of the outgoing beam when using two prisms having an apex angle $\alpha$ of 1° will be described in detail.

[Orthogonal Projection]

Figure 38A:
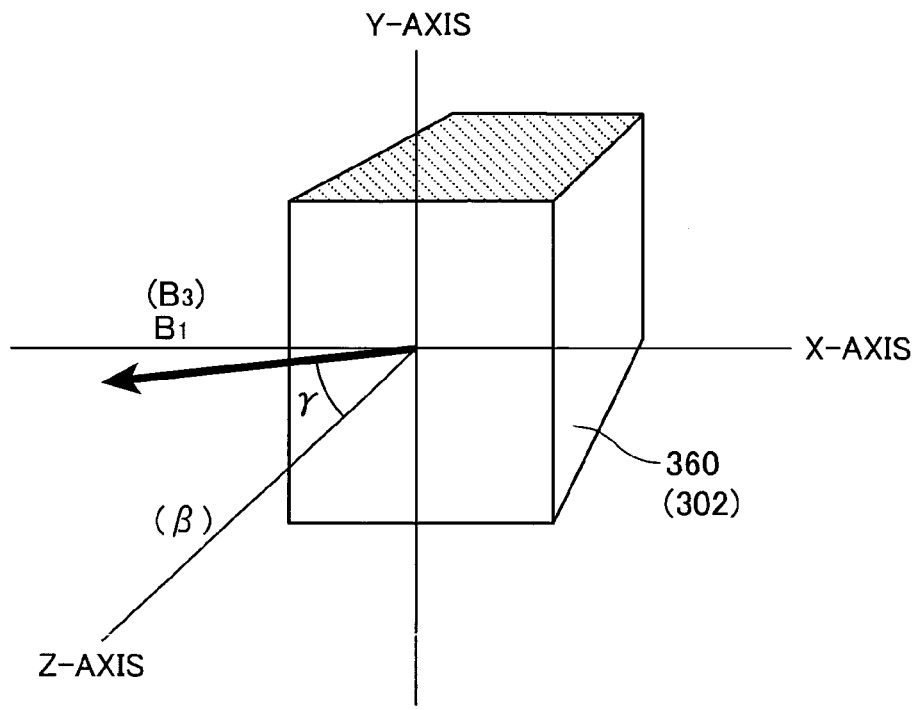
FIG. 38(a) is an explanatory diagram (perspective view) showing a beam emitted from an optical system.
Figure 38B:
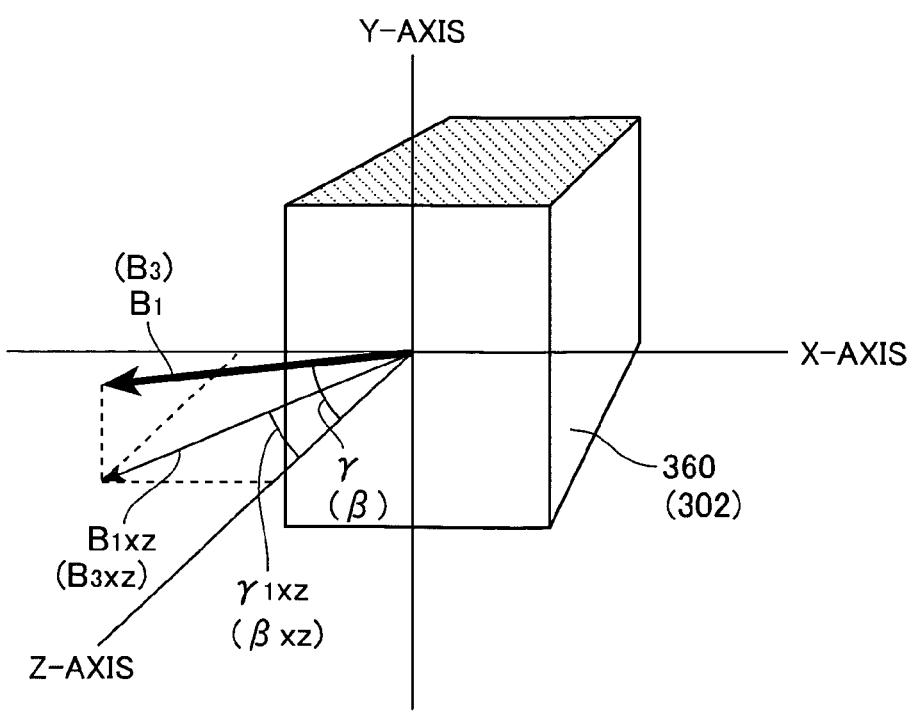
FIG. 38(b) is an explanatory diagram showing an orthogonal projection component to xz plane of the beam emitted from the optical system shown in FIG. 38(a)
Figure 38C:
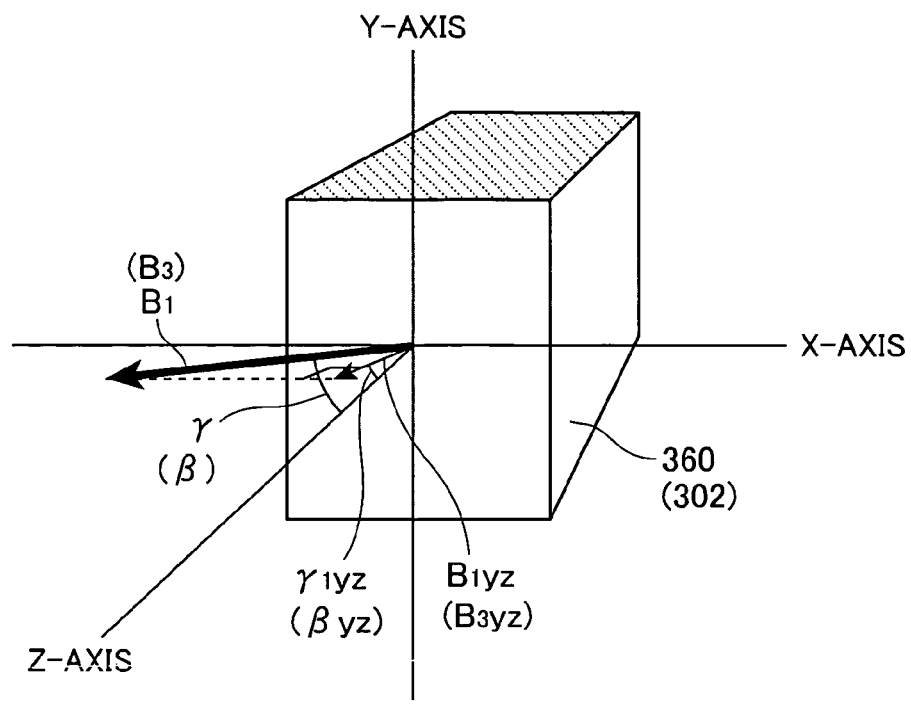
FIG. 38(c) is an explanatory diagram showing an orthogonal projection component to yz plane of the beam emitted from the optical system shown in FIG. 38(a)
Figure 38D:
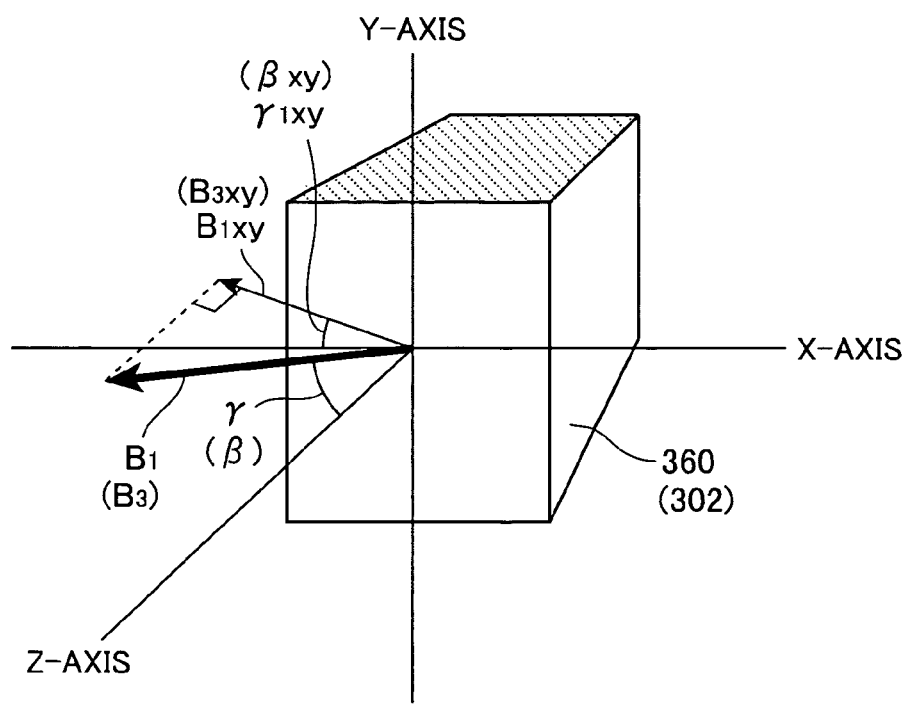
FIG. 38(d) is an explanatory diagram showing an orthogonal projection component to xy plane of the beam emitted from the optical system shown in FIG. 38(a)

It is now assumed that a beam B1 emitted from a beam generating optical system 360 (to be described later) is slanted three-dimensionally in relation to the reference axis (z-axis). The beam generating optical system 360 includes a laser 316, a collimating lens 317, and a beam splitting unit 1 as will be described later with reference to FIG. 40. An x, y, and z coordinate system is established, as shown in FIG. 38(a). In this example, the beam B1 is shifted by an angle $\gamma$ from the z-axis. FIGS. 38(b)–38(d) respectively show orthogonal projection components B1xz, B1yz, and B1xy of the beam 51 in relation to the xz plane, the yz plane, and the xy plane. More specifically, the direction of the beam B1 is shifted from the z-axis by the angle of $\gamma$ so that an angle $\gamma1xz$ is formed between the z-axis and the orthogonal projection component B1$_{xz}$ of the beam B1 in the xz plane as shown in FIG. 38(b), so that an angle $\gamma1yz$ is formed between the z-axis and the orthogonal projection component B1$_{yz}$ of the beam BE in the yz plane as shown in FIG. 38(c), and so that an angle $\gamma1xy$ is formed between the x-axis and the orthogonal projection component B1$_{xy}$ of the beam B1 in the xy plane as shown in FIG. 38(d)

Figure 39:
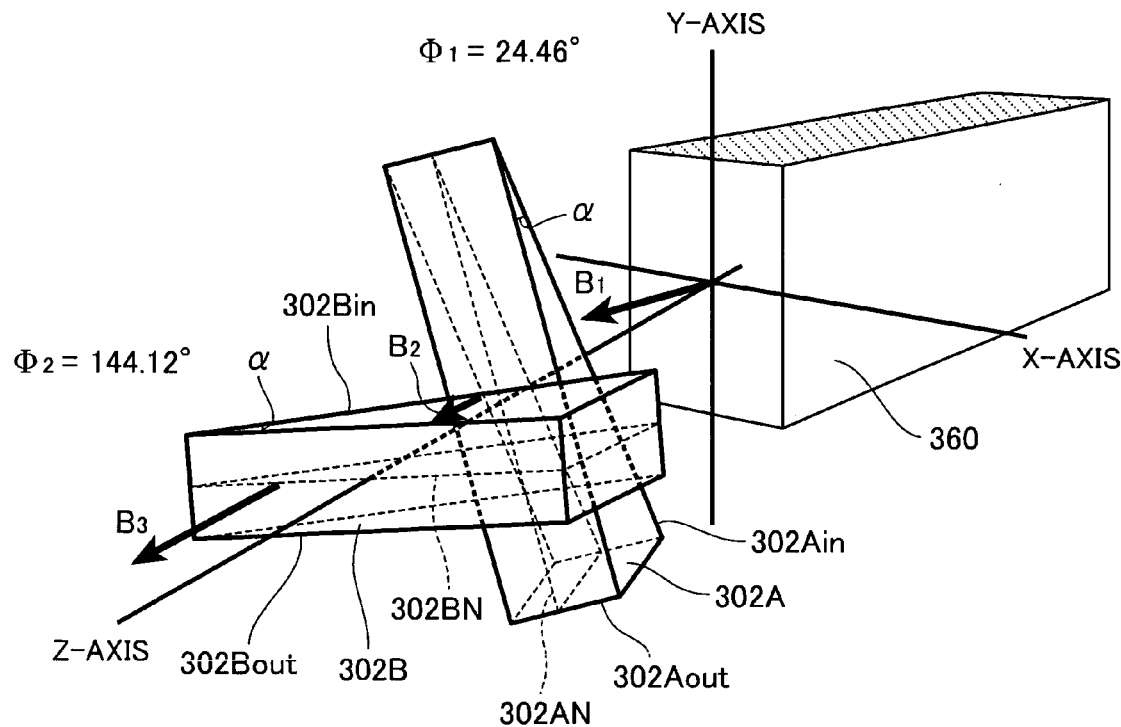
FIG. 39 is an explanatory diagram (perspective view) showing wedge prisms disposed at rotational angles according to the fourth embodiment.

When the beam B1 thus slanted three-dimensionally in relation to the z-axis falls incident on the incident surface 302Ain of the prism 302A (incident surface 3022in of the combined prism 302), as shown in FIG. 39, an intermediate beam B2 is emitted from the emitting surface 302 of the prism 302A and falls incident on the incident surface 302Bin of the prism 302B. In other words, the intermediate beam B2 travels through the prisms 302A and 302B as shown in FIG. 37. Then, an outgoing beam B3 is emitted from the emitting surface 302Bout of the prism 302B (emitting surface 302out of the combined prism 302). When the beam B3 is emitted from the combined prism 302, the beam B3 is shifted by an angle $\beta$ from the z-axis. It is noted that the beam B3 has orthogonal projection components B3xz, B3yz, and B3xy in relation to the xz plane, the yz plane, and the xy plane similarly to the beam B1 as shown in FIGS. 38(a)–38(d). More specifically, if the direction of the beam B3 is shifted from the z-axis by the angle of $\beta$ as shown in FIG. 38(a), an angle $\beta xz$ is formed between the z-axis and the orthogonal projection component B3$_{xz}$ of the beam B3 in the xz plane as shown in FIG. 38(b), an angle $\beta yz$ is formed between the z-axis and the orthogonal projection component B3y, of the beam B3 in the yz plane as shown in FIG. 38(c), and an angle $\beta xy$ is formed between the x-axis and the orthogonal projection component B3$_{xy}$ of the beam B3 in the xy plane as shown in FIG. 38(d). When the angles $\beta yz$ and $\beta xz$ are equal to zero degrees, the beam B3 is directed parallel to the z-axis. When the angle $\beta yz$ is equal to zero degrees, the beam B3 is directed parallel to the xz plane. When the angle $\beta xz$ is equal to zero degrees, the beam B3 is directed parallel to the yz plane.

If the angle $\gamma$ formed by the incident beam B1 and the reference axis z is set to $\gamma_{1yz}=0.05°$ and $\gamma_{1xz}=0.5°$, then $\phi_1$ and $\phi_2$ can be found by inserting these values into equations (119) and (120).

$$\cos\phi_1+\cos\phi_2=0.50/((1.5-1)\cdot1)$$

$$\sin\phi_1+\sin\phi_2=0.5/((1.5-1)\cdot1)$$

$$\phi_1=24.46°\ \phi_2=144.12°$$

Therefore, if the incident beam forms an angle with the reference axis z such that $\gamma_{1yz}=0.05°$ and $\gamma_{1xz}=0.5°$, then the angle formed by the outgoing beam B3 and the reference axis z can be corrected to 0° by disposing the imaginary normal plane 302AN of the prism 302A on the incidence side at a position rotated $\phi_1$ of 24.46° from the yz plane and the imaginary normal plane 302BN of the prism 302B on the outgoing side at a position rotated $\phi_2$ of 144.12° from the yz plane. FIG. 39 shows that the first wedge prism 302A is disposed with its plane 302AN being at a position rotated $\phi_1$ of 24.46° from yz plane and the second wedge prism 302B is disposed with its plane 302BN being at a position rotated $\phi_2$ of 144.12° from the yz plane.

[Laser Marking Apparatus]

A laser marking apparatus 385 according to the fourth embodiment has basically the same construction as the laser marking apparatus 85 according to the first embodiment, as shown in FIG. 6. The laser marking apparatus 385 is provided with a line-beam-generating optical system 386 instead of the line-beam-generating optical system 86. Other than that, the laser marking apparatus 385 has the same construction as the laser marking apparatus 85.

Figure 40:
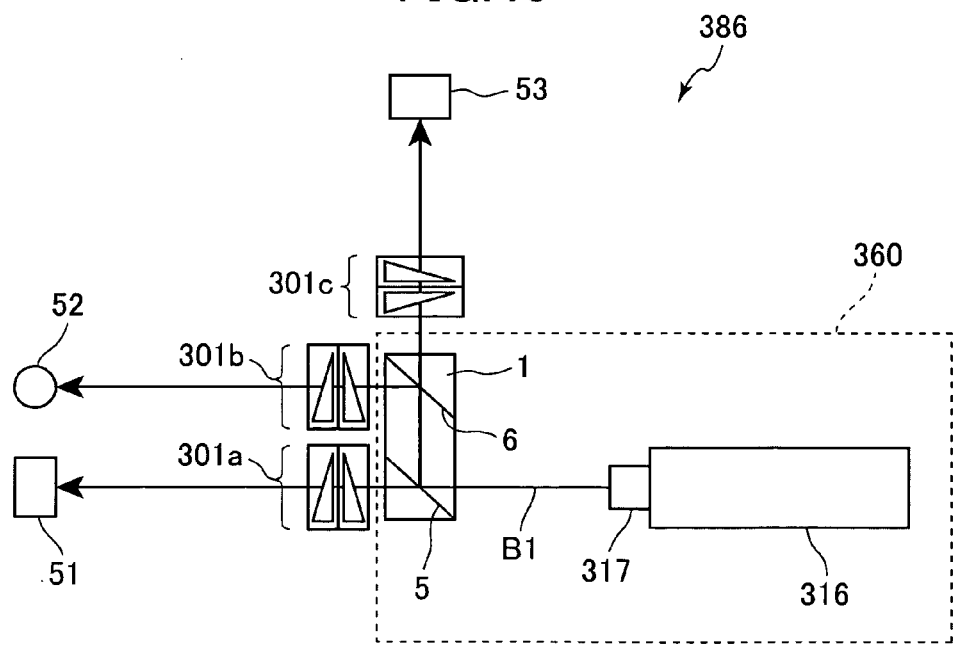
FIG. 40 is an explanatory diagram (side view) showing a line-beam generating optical system provided in the laser marking apparatus of the fourth embodiment.

As shown in FIG. 40, the line beam generating optical system 386 includes the semiconductor laser 316 disposed horizontally in relation to the laser marking apparatus 385. The collimating lens 317 converts the laser beam emitted from the semiconductor laser 316 into a collimated light (parallel rays) or incident light B1 having a circular beam cross-section. In the present embodiment, the diameter of the collimated light B1 is set to 2 mm.

The line-beam-generating optical system 386 employs the beam splitter 1 described in the first embodiment, for separating the incident light B1 into three beams B1 of equal intensity. As explained in the third embodiment, extremely high precision is required in directions of line beams emitted from the laser marking apparatus. In the present embodiment, beam-emission-angle compensating optical units 301a, 301b, and 301c are disposed on the respective optical paths of the beams emitted from the beam splitter 1. The beam-emission-angle compensating optical units 301a, 301b, and 301c have the same configurations as the beam-emission-angle compensating optical unit 301 of the present embodiment. By disposing the rod lens 51, rod lens 52, and rod lens 53 in the downstream side of the beam-emission-angle compensating optical units 301a, 301b, and 301c, line beams generated by the rod lens 51, rod lens 52, and rod lens 53 can be aligned with the ideal line at a directing precision of 0.

Now, an example is shown about one of the light beams emitted from the beam splitter 1. If the beam incident on the optical unit 301a has angular errors of $\gamma_{1yz}=0.05°$ and $\gamma_{1xz}=0.5°$ with the reference axis, then $\phi_1$ and $\phi_2$ can be calculated by inserting these values into equations (119) and (120).

$$\cos \phi_1 + \cos \phi_2 = 0.05/((1.5-1)\cdot 1)$$

$$\sin \phi_1 + \sin \phi_2 = 0.5/((1.5-1)\cdot 1)$$

$$\phi_1 = 24.46° \quad \phi_2 = 144.12°$$

Accordingly, the angle formed by the outgoing beam and the reference axis can be corrected to 0° by disposing the prism 302A on the incidence side of the beam-emission-angle compensating optical unit 301a at a position rotated 24.46° and the prism 302B on the outgoing side at a position rotated 144.12° as shown in FIG. 39. In the same way, angular correction or compensation can be performed on the remaining divided light beams using the beam-emission-angle compensating optical units 301b and 301c. As a result, it is possible to correct angular errors in line beams generated through the rod lenses 51, 52, and 53 to 0° forming ideal lines.

According to the beam-emission-angle compensating optical unit 301 of the present embodiment, the reference axis is defined in an xyz space, the xyz space being defined by x-axis, y-axis, and z-axis that are orthogonal to one another, the x-axis and the y-axis define an xy plane, the x-axis and the z-axis define an xz plane, and the y-axis and the z-axis define a yz plane, the reference axis extending along the z-axis.

As shown in FIG. 39, the first wedge prism 302A and the second wedge prism 302B are arranged along the reference axis z. The first wedge prism 302A receives the incident light beam BE and outputs an intermediate light beam B2. The wedge prism 302B receives the intermediate light beam B2 and outputs the output light beam B3. The first holding unit 303A holds the first wedge prism 302A. The second holding unit 303B holds the second wedge prism 302B.

The first holding unit 303A holds the first wedge prism 302A such that the first wedge prism 302A can rotate about the reference axis z. The second holding unit 303S holds the second wedge prism 302B such that the second wedge prism 302B can rotate about the reference axis z independently from the first wedge prism 302A.

As shown in FIGS. 38(b) and 38(c), the incident beam direction is defined by an angle $\gamma_{1yz}$ formed between the z-axis and the orthogonal projection component B1yz of the incident light beam in the yz plane and by another angle $\gamma_{1xz}$ formed between the z-axis and the orthogonal projection component B1xz of the incident light beam in the xz plane.

As shown in FIG. 39, the first optical element 302A is formed of a light-transmissive memter having a refractive index n and including a first light incident surface 302Ain and a first light emitting surface 302Aout. The first light incident surface 302Ain receives the incident light beam in the incident beam direction with $\gamma_{1yz}$, $\gamma_{1xz}$. The first light emitting surface 302Aout emits the intermediate light beam 52 in an intermediate beam direction which is defined with respect to the reference axis z. The first light incident surface 302Ain and the first light emitting surface 302Aout form an angle $\alpha$ therebetween, and define a first imaginary normal plane 302AN, which is normal to both the first light incident surface 302Ain and the first light emitting surface 302Aout and which extends along the reference axis z.

The second optical element 302B is formed of another light-transmissive member having a refractive index n and including a second light incident surface 302Bin and a second light emitting surface 302Bout. The second light incident surface 302Bin receives the intermediate light beam B2 in the intermediate beam direction. The second light emitting surface 302Bout emits the output light beam B3 in the output beam direction $\beta_{yz}$, $\beta_{xz}$ which is defined with respect to the reference axis z. The second light incident surface 302Bin and the second light emitting surface 302Bout form the angle $\alpha$ therebetween, and define a second imaginary normal plane 302BN, which is normal to both the second light incident surface 302Bin and the second light emitting surface 302Bout and which extends along the reference axis Z.

The angle $\alpha$ satisfies the inequalities:

$$-2 \leq \gamma_{1yz}/((n-1)\alpha) \leq 2 \text{ and } -2 \leq \gamma_{1xz}/((n-1)\alpha) \leq 2$$

The first holding unit 303A orients the first optical element 302A so that the first imaginary normal plane 302AN forms a rotational angle $\phi_1$ from the yz plane around the z-axis. The second holding unit 303B orients the second optical element 302B so that the second imaginary normal plane 302BN forms a rotational angle $\phi_2$ from the yz plane around the z-axis.

The second light emitting surface 302Bout of the second optical element 302B emits the output light beam B3 with an angle $\beta_{yz}$ defined between the z-axis and the orthogonal projection component B3yz of the output light beam B3 in the yz plane (FIG. 38(c)) and an angle $\beta_{xz}$ defined between the z-axis and the orthogonal projection component B3xz of the output light beam B3 in the xz plane. The angles $\beta_{yz}$ and $\beta_{xz}$ satisfy equations:

$\beta_{yz}=(n-1)\alpha\cdot(\cos\phi_1+\cos\phi_2)-\gamma_{1yz}$ and $\beta_{xz}=(n-1)\alpha\cdot(\sin\phi_1+\sin\phi_2)-\gamma_{1xz}.$ Accordingly, the output beam direction extends parallel with the z-axis when the rotational angles $\phi_1$ and $\phi_2$ satisfy equations of:

$\beta_{yz}=0=(n-1)\alpha\cdot(\cos\phi_1+\cos\phi_2)-\gamma_{1yz}$ and $\beta_{xz}=0=(n-1)\alpha\cdot(\sin\phi_1+\sin\phi_2)-\gamma_{1xz}.$ According to the laser marking apparatus 386 of the present embodiment (FIG. 40), the laser 316 generates a light beam. The collimating optical element 317 collimates the light beam into a collimated light beam. The beam splitting unit 1 receives the collimated light beam from the collimating optical element 317 and splits the light beam into the plurality of incident light beams. Each of the plurality of beam-emission-angle compensating optical units 301a, 301b, 301c receives a corresponding one of the plurality of incident light beams from the beam splitting unit 1, and corrects the beam emission angle of the received light beam. Each of the plurality of line-beam-generating optical elements 51, 52, 53 generates a line beam from an output light beam that is emitted from the corresponding beam-emission-angle compensating optical unit 301a, 301b, 301c.

The support unit 87 supports the laser 316, the collimating optical element 317, the beam splitting unit 1, the beam-emission-angle compensating optical units 301a, 301b, 301c, and the line-beam-generating optical elements 51, 52, and 53.

It is noted that the beam splitting unit 1 may be omitted. In this case, a single beam-emission-angle compensating optical unit 301 is mounted to receive, as an incident light beam, the collimated light beam from the collimating lens 317, and corrects its beam emission angle.

<First Modification>

Figure 41:
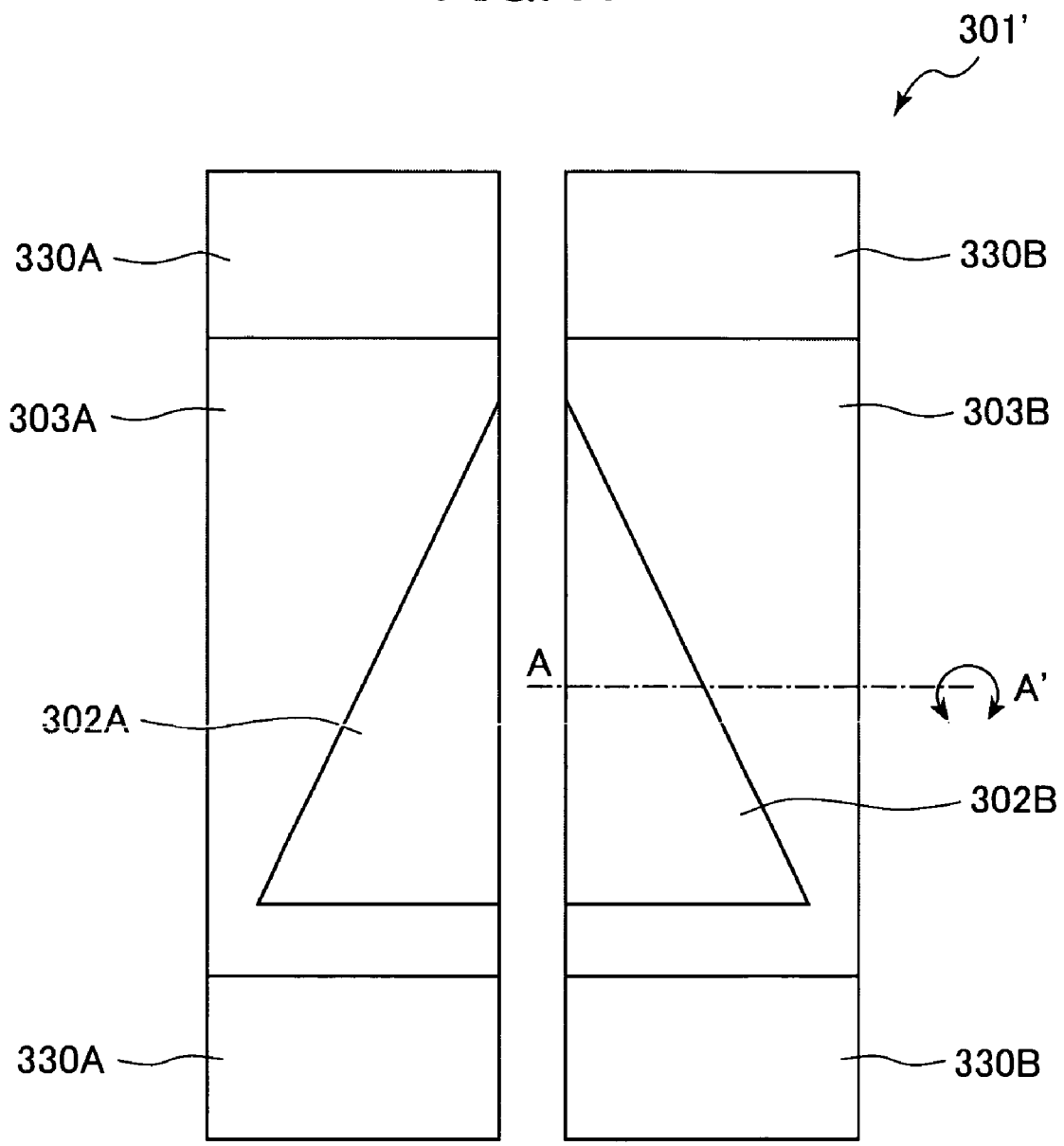
FIG. 41 is an explanatory diagram of a beam-emission-angle compensating optical unit according to a first modification of the fourth embodiment.

FIG. 41 shows an optical unit 301' according to a first modification of the fourth embodiment. As in FIGS. 33 and 34, the optical unit 301' includes a first wedge prism 302A and a second wedge prism 302B that are placed near to or in contact with each other. However the prism holder 303A holding the first wedge prism 302A is provided fixedly, while only the prism holder 303B holding the second wedge prism 302B is capable of rotating in the direction of the arrow shown in the drawing around the axis A-A'.

In this modification, the outgoing beam angle is corrected by rotating only the second wedge prism 302B on the outgoing side, which corresponds to the case in which $\phi_1=0°$ in equations (117) and (118). That is, $\beta_{yz}=(n-1)\alpha\cdot(1+\cos\phi_2)-\gamma_{1yz}$ (125)

$\beta_{xz}=(n-1)\alpha\cdot\sin\phi_2-\gamma_{1xz}$ (126)

Here, $\beta_{yz}=0$ and $\beta_{xz}=0$ in the above equations when $\beta_{yz}$ and $\beta_{xz}$ become 0°. Therefore, $1+\cos\phi_2=\gamma_{1yz}/((n-1)\alpha)$ $\sin\phi_2=\gamma_{1yz}/((n-1)\alpha)$ Since $\phi_2$ is in a range of $0\leq\phi_2\leq 360°$, $0\leq\gamma_{1yz}/((n-1)\alpha)\leq 2$ $-1\leq\gamma_{1xz}/((n-1)\alpha)\leq 1$ Hence, $0\leq\gamma_{1yz}\leq 2(n-1)\alpha$ (127)

$-(n-1)\alpha\leq\gamma_{1xz}\leq(n-1)\alpha$ (128)

By substituting n=1.5 into equations (127) and (128), $0\leq\gamma_{1yz}\leq\alpha$ (129)

$-0.5\alpha\leq\gamma_{1xz}\leq 0.5\alpha$ (130)

Therefore, when correcting the outgoing beam angle by rotating only the second wedge prism 302B on the outgoing side, either the yz plane component $\beta_{yz}$ or the xz plane component $\beta_{xz}$ of the angle of the outgoing beam B3 from the reference axis z can be corrected to 0°. At this time, the relationship shown in equations (129) and (130) between the prism apex angle $\alpha$ and the angle $\gamma$ formed by the incident beam B1 and the reference axis z must be satisfied.

Next, the case for correcting the angle of the outgoing beam (yz plane component $\beta_{yz}$) in the present modification will be described in detail. In this case, BK7 having a refractive index n=1.5 is used as the prism material and two prisms 302A and 302B having an apex angle $\alpha$ of 1° are used but only the prism 302B is rotated. If the angle $\gamma$ formed by the incident beam B1 and the reference axis z is such that $\gamma_{1yz}=0.05°$, then the following equation can be found by inserting this value into equation (125).

$0=(1.5-1)\cdot 1\cdot(1+\cos\phi_2)-0.05$ $\phi_2=154.16°$

Figure 42:
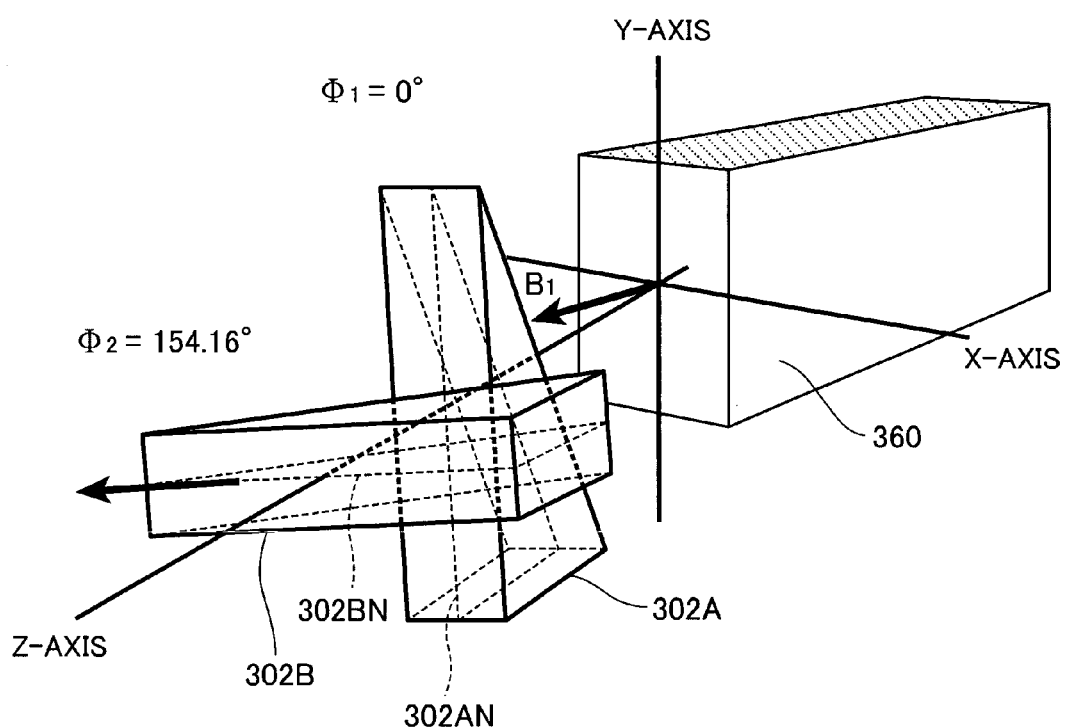
FIG. 42 is an explanatory diagram (perspective view) showing wedge prisms disposed at rotational angles according to the first modification.

Hence, when the angle formed by the incident beam B1 and the reference axis z is $\gamma_{1zy}=0.05°$, the $\beta_{yz}$ can be corrected to 0° by disposing the second wedge prism 302B with its imaginary normal plane 302BN being located at a position rotated $\phi_2$ of 154.16° from the yz plane. FIG. 42 shows that the first wedge prism 302A is disposed fixedly at the reference position. That is, the imaginary normal plane 302AN of the prism 302A is oriented by $\phi_1$ of 0° from the yz plane. That is, the imaginary normal plane 302AN is located on the yz plane. The second wedge prism 302B is disposed with its imaginary normal plane 302BN being located at a position rotated $\phi_2$ of 154.16° from the yz plane.

According to this modification, the first holding unit 303A holds the first wedge prism 302A fixedly at the predetermined rotational position $\phi_1=0°$, while the second holding unit 303B holds the second wedge prism 302B such that the second wedge prism 302B can rotate about the reference axis Z independently from the first wedge prism 302A.

The incident beam direction is defined by an angle $\gamma_{1yz}$ formed between the z-axis and the orthogonal projection component B1yz of the incident light beam in the yz plane and by another angle $\gamma_{1xz}$ formed between the z-axis and the orthogonal projection component B1xz of the incident light beam in the xz plane.

In this modification, the angle $\alpha$ satisfies the inequalities:

$0\leq\gamma_{1yz}/((n-1)\alpha)\leq 2$ and $-1\leq\gamma_{1xz}/((n-1)\alpha)\leq 1$, As shown in FIG. 42, the first holding unit 303A orients the first optical element 302A so that the first imaginary normal plane 302AN forms a rotational angle $\phi_1$ of a zero degree (0°) from the yz plane around the z-axis. The second holding unit 303B orients the second optical element 302B so that the second imaginary normal plane 302BN forms a rotational angle $\phi_2$ from the yz plane around the z-axis.

The second light emitting surface 302Bout of the second optical element 302B emits the output light beam B3 with an angle $\beta_{yz}$ defined between the z-axis and the orthogonal projection component B3yz of the output light beam B3 in the yz plane and an angle $\beta_{xz}$ defined between the z-axis and the orthogonal projection component B3xz of the output light beam B3 in the xz plane. The angles $\beta_{yz}$ and $\beta_{xz}$ satisfy equations:

$$\beta_{yz}=(n-1)\alpha\cdot(1+\cos\phi_2)-\gamma_{1yz} \text{ and}$$

$$\beta_{xz}=(n-1)\alpha\cdot\sin\phi_2-\gamma_{1xz}$$

Accordingly, the output beam direction extends parallel with the xz plane when the rotational angle $\phi_2$ satisfies an equation of $\beta_{yz}=0=(n-1)\alpha\cdot(1+\cos\phi_2)-\gamma_{1yz}$.

The output beam direction extends parallel with the yz plane when the rotational angle $\phi_2$ satisfies an equation of $$\beta_{xz}=0=(n-1)\alpha\cdot\sin\phi_2-\gamma_{1xz}.$$

It is noted that the second holding unit 303B may hold the second optical element 302B fixedly about the reference axis z, while the first holding unit 303A holding the first optical element 302A rotatably about the reference axis z independently from the second optical element 302B.

<Second Modification>

Figure 43:
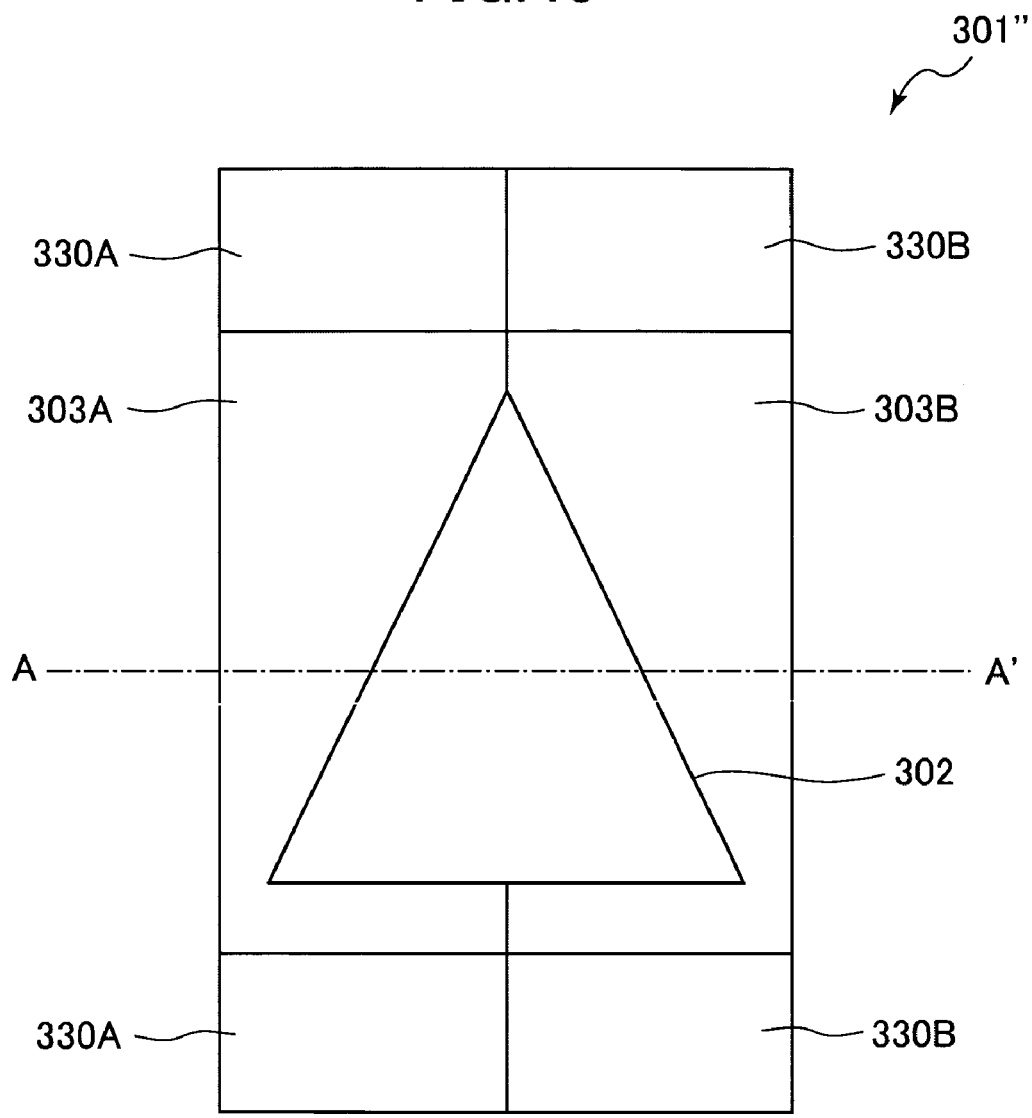
FIG. 43 is an explanatory diagram of a beam-emission-angle compensating optical unit according to a second is modification of the fourth embodiment.

FIG. 43 shows an optical unit 301″ according to a second modification of the fourth embodiment, wherein a single wedge prism 302 is held by the prism holder 303A and the prism holder 303B. The wedge prism 302 is capable of rotating about the A-A' axis.

Employing a single wedge prism 302 to correct the outgoing beam angle is equivalent to the case in which a term of $(n-1)\alpha\cdot\cos\phi_1$ in equation (117) and a term of $(n-1)\alpha\cdot\sin\phi_1$ in equation (118) are deleted, Hence, $$\beta_{yz}=(n-1)\alpha\cdot\cos\phi_2-\gamma_{1yz} \quad (131)$$

$$\beta_{xz}=(n-1)\alpha\cdot\sin\phi_2-\gamma_{1xz} \quad (132)$$

Here, $\beta_{yz}=0$ and $\beta_{xz}=0$ when $\beta_{yz}$ and $\beta_{xz}$ become 0°. Therefore, $$\cos\phi_2=\gamma_{1yz}/((n-1)\alpha)$$

$$\sin\phi_2=\gamma_{1xz}/((n-1)\alpha)$$

Since $\phi_2$ is in a range of $0\leq\phi_2\leq 360°$, $$-1\leq\gamma_{1yz}/((n-1)\alpha)\leq 1$$

$$-1\leq\gamma_{1xz}/((n-1)\alpha)\leq 1$$

Hence, $$-(n-1)\alpha\leq\gamma_{1yz}\leq(n-1)\alpha \quad (133)$$

$$-(n-1)\alpha\leq\gamma_{1xz}\leq(n-1)\alpha \quad (134)$$

By substituting n=1.5 into equations (133) and (134), $$-0.5\alpha\leq\gamma_{1yz}\leq 0.5\alpha \quad (135)$$

$$-0.5\alpha\leq\gamma_{1xz}\leq 0.5\alpha \quad (136)$$

Accordingly, when correcting the outgoing beam angle using a single prism, either the yz plane component $\beta_{yz}$ or the xz plane component $\beta_{xz}$ of the angle of the outgoing beam B3 from the z-axis can be corrected to 0°. At this time, the relationships in equations (135) and (136) between the prism apex angle $\alpha$ and the angle $\gamma$ formed by the incident beam B1 and reference axis z must be satisfied.

Next, the case of the present modification for correcting the angle of the outgoing beam (yz plane component $\beta yz$) will be described in detail. In this case, BK7 having a refractive index n=1.5 is used as the prism material and a single prism having an apex angle $\alpha$ of 1° is rotated. If the angle $\gamma$ formed by the incident beam and the reference axis z is such that $\gamma_{1yz}=0.05°$, then the following calculation can be made by inserting this value into equation (131).

$$0=(1.5-1)\cdot 1\cdot\cos\phi_2-0.05$$

$$\phi_2=84.26°$$

Figure 44:
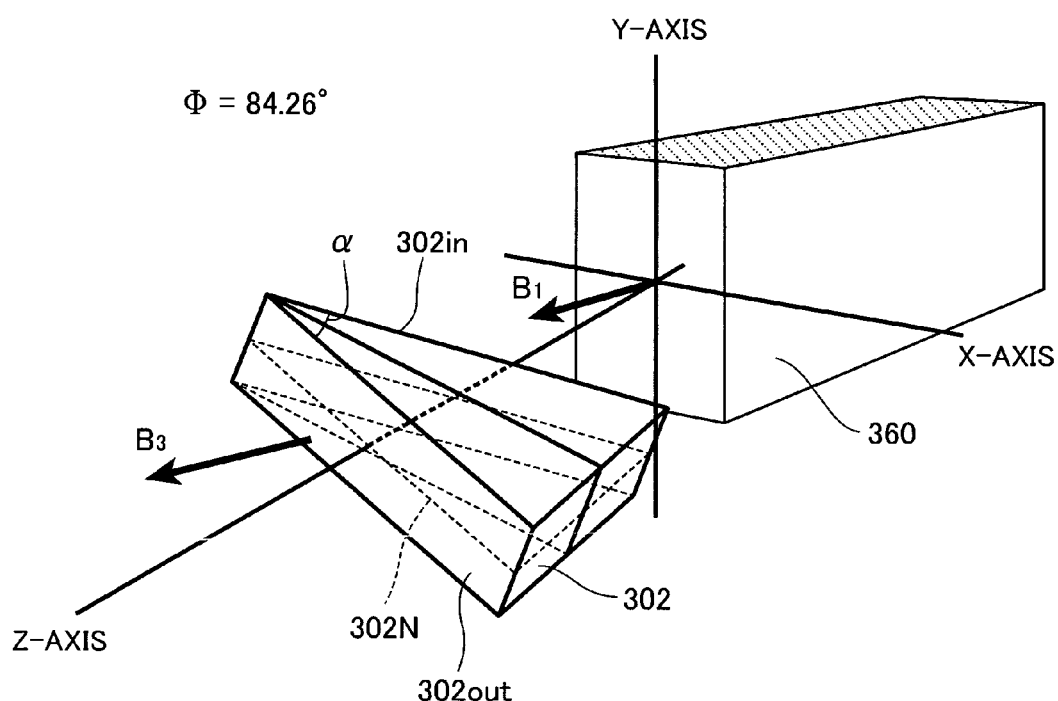
FIG. 44 is an explanatory diagram (perspective view) showing a wedge prism disposed at a rotational angle according to the second modification.

In other words, when the angle formed by the incident beam and the reference axis z is $\gamma_{1yz}=0.05°$, then $\beta_{yz}$ can be corrected to 0° by disposing the prism 302 with its imaginary normal plane 302N being located at a position rotated $\phi$ of 84.26° from the YZ plane. FIG. 44 shows that the wedge prism 302 is disposed with its imaginary normal plane 302N being oriented at a position rotated $\phi$ of 84.26° from the YZ plane.

The wedge prism 302 is formed of a light-transmissive member, and includes a first surface 302in and a second surface 302out. The first surface 302in receives an incident light beam B1. The second surface 302out emits an output light beam B3. The first surface 302in and the second surface 302out form an apex angle $\alpha$ therebetween. The holding units 303A, 303B hold the wedge prism 302 such that the wedge prism 302 is capable of rotating about the reference axis z. The holding units 303A, 303B hold the wedge prism 302 at a rotational angle $\phi$ about the reference axis Z from a reference rotational position (YZ plane).

The optical element 302 is formed of a light-transmissive member having a refractive index n and includes: a light incident surface 302in and a light emitting surface 302out. The light incident surface 302in receives an incident light beam B1 in an incident beam direction which is defined with respect to the reference axis z. The light emitting surface 302out emits an output light beam B3 in an output beam direction which is defined with respect to the reference axis z. The light incident surface 302in and the light emitting surface 302out form an angle $\alpha$ therebetween, and defines an imaginary normal plane 302N, which is normal to both the light incident surface 302in and the light emitting surface 302out and which extends along the reference axis z. The output beam direction is shifted by an angle $\delta$ from the incident beam direction The angle $\delta$ has a value that depends on the refractive index n, the angle $\alpha$, and the rotational position of the imaginary normal plane 302N relative to the reference axis z from the YZ plane.

More specifically, the incident beam direction is defined by an angle $\gamma_{1yz}$ formed between the z-axis and the orthogonal projection component B1yz of the incident light beam in the yz plane and by another angle $\gamma_{1xz}$ formed between the z-axis and the orthogonal projection component B1xz of the incident light beam in the xz plane. The angle $\alpha$ satisfies inequalities:

$$-1\leq\gamma_{1yz}/((n-1)\alpha)\leq 1 \text{ and } -1\leq\gamma_{1xz}/(n-1)\alpha)\leq 1,$$

As shown in FIG. 44, the holding units 303A, 303B orient the imaginary normal plane 302N of the optical element 302 to form a rotational angle $\phi$ from the yz plane around the z-axis.

The light emitting surface 302out emits the output light beam B3 with an angle $\beta_{yz}$ defined between the z-axis and the orthogonal projection component B3yz of the output light beam B3 in the yz plane and an angle $\beta_{xz}$ defined between the z-axis and the orthogonal projection component B3xz of the output light beam B3 in the xz plane. The angles $\beta_{yz}$ and $\beta_{xz}$ satisfy equations:

$$\beta_{yz}=(n-1)\alpha\cdot\cos\phi-\gamma_{1yz} \text{ and}$$

$$\beta_{xz}=(n-1)\alpha\cdot\sin\phi-\gamma_{1xz}.$$

Accordingly, the output beam direction extends parallel with the xz plane when the rotational angle $\phi$ satisfies an equation of $\beta_{yz}=0=(n-1)\alpha\cdot\cos\phi-\gamma_{1yz}$.

The output beam direction extends parallel with the yz plane when the rotational angle $\phi$ satisfies an equation of $\beta_{xz}=0=(n-1)\alpha\cdot\sin\phi-\gamma_{1xz}$.

[Other Modifications]

Figure 45A:
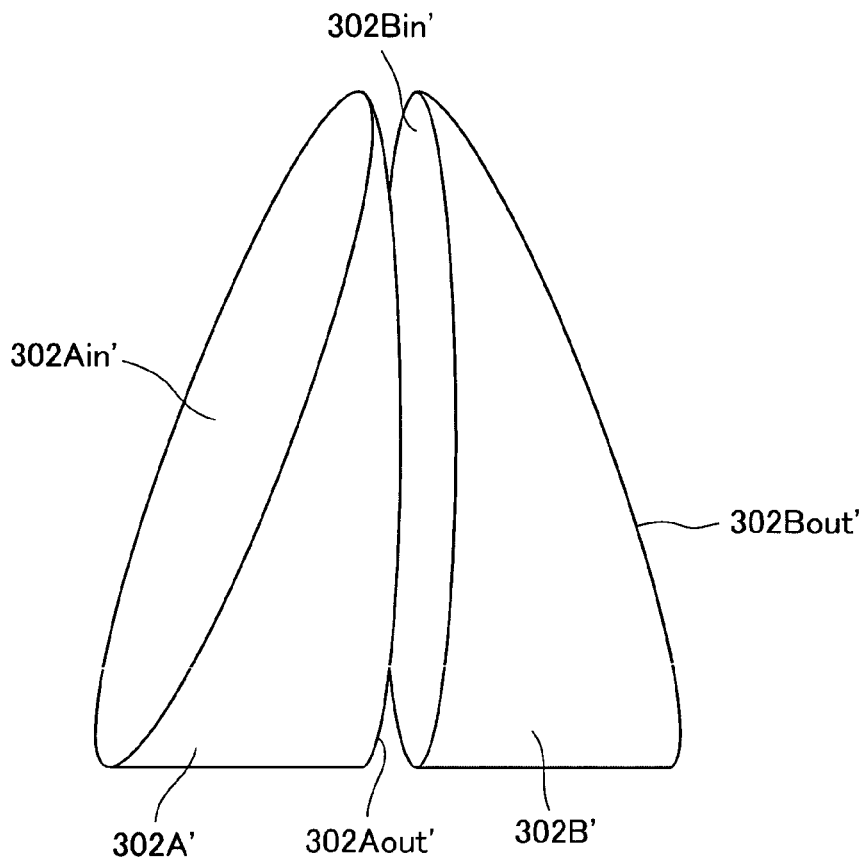
FIG. 45(a) is a perspective view showing wedge prisms with different shapes according to another modification.
Figure 45B:
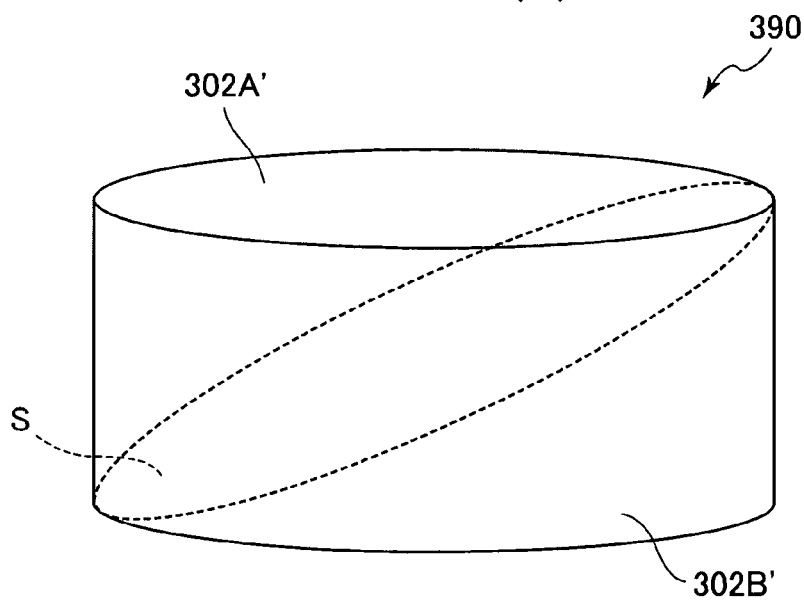
FIG. 45(b) is a perspective view showing a circular column from which the wedge prisms in FIG. 45(a) are obtained.

In the present embodiment and its modifications, the wedge prisms 302A and 302B having shapes of triangular prisms are used. However, the shapes of the prisms are not limited to triangular prisms. For example, wedge prisms 302A' and 302B' shown in FIG. 45(a) can also be used for a beam-emission-angle compensating optical unit. The wedge prisms 302A' and 302B' are obtained by cutting a circular column 390 in a surface S in FIG. 45(b). In this case, a first light incidence surface 302Ain' and a first light emitting surface 302Aout' form a predetermined angle therebetween. Similarly, a second light incidence surface 302Bin' and a second light emitting surface 302Bout' form another predetermined angle therebetween. The wedge prisms 302A, and 302B' are inserted and disposed easily in the hollow portions of the prism holders 303A and 303B (FIG. 33), because the wedge prisms 302A' and 302B' have circular shapes. Accordingly, the wedge prisms 302A' and 302B' are advantageous in production.

In the present embodiment and its modifications, the rotational angles were determined when the wedge prisms 302A and 302B have the same apex angle $\alpha$. However, the apex angles of the wedge prisms 302A and 302B may have different values.

In the present embodiment, the beam splitter 1 was used, in the line-beam-generating optical system 386, for separating an incident light into three beams. However, other beam splitting devices such as half mirrors can also be used.

While the invention has been described in detail with reference to the specific embodiments thereof, it would be apparent to those skilled in the art that various changes and modifications may be made therein without departing from the spirit of the invention.

For example, in the above-described second embodiment, the movable holder 104 is mounted in the holder body 103 by the support units 105, 106 and the screws 107 to facilitate positioning control of the movable holder 104 in the pitch, roll, and yaw directions. However, the movable holder 104 may be mounted in the holder body 103 in other various ways to facilitate positioning control of the movable holder 104.

What is claimed is:

1. A beam-emission-angle compensating optical unit for correcting a beam emission angle, comprising:
an optical element formed of a light-transmissive member having a refractive index n, including:
a light incident surface receiving an incident light beam in an incident beam direction which is defined with respect to a reference axis; and
a light emitting surface emitting an output light beam in an output beam direction which is defined with respect to the reference axis, the light incident surface and the light emitting surface forming an angle $\alpha$ therebetween and defining an imaginary normal plane, which is orthogonal to both the light incident surface and the light emitting surface and which extends along the reference axis, the output beam direction being shifted by an angle $\delta$ from the incident beam direction, the angle $\delta$ having a value that depends on the refractive index n, the angle $\alpha$, and a rotational position of the imaginary normal plane relative to the reference axis and substantially satisfies an equation $\alpha=\delta/(n-1)$; and
wherein the reference axis is defined in an xyz space, the xyz space being defined by x-axis, y-axis, and z-axis that are orthogonal to one another, the x-axis and the y-axis defining an xy plane, the x-axis and the z-axis defining an xz plane, and the y-axis and the z-axis defining a yz plane, the reference axis extending along the x-axis, the incident beam direction being shifted from the x-axis by the angle $\delta$, which defines an angle $\delta yz$ between the y-axis and an orthogonal projection component of the incident light beam in the yz plane; and
wherein the optical element is disposed with its imaginary normal plane being located at a rotational angle $\phi$ from the xy plane around the x-axis, the rotational angle $\phi$ being equal to the angle $\delta yz$ to allow the light emitting surface to output the output light beam in the output beam direction that is parallel with the x axis.

2. A beam-emission-angle compensating optical unit for correcting a beam emission angle, comprising:
an optical element formed of a light-transmissive member having a refractive index n, including:
a light incident surface receiving an incident light beam in an incident beam direction which is defined with respect to a reference axis; and
a light emitting surface emitting an output light beam in an output beam direction which is defined with respect to the reference axis, the light incident surface and the light emitting surface forming an angle $\alpha$ therebetween and defining an imaginary normal plane, which is orthogonal to both the light incident surface and the light emitting surface and which extends along the reference axis, the output beam direction being shifted by an angle $\delta$ from the incident beam direction, the angle $\delta$ having a value that depends on the refractive index n, the angle $\alpha$, and a rotational position of the imaginary normal plane relative to the reference axis, and
wherein the reference axis is defined in an xyz space, the xyz space being defined by x-axis, y-axis, and z-axis that are orthogonal to one another, the x-axis and the y-axis defining an xy plane, the x-axis and the z-axis defining an xz plane, and the y-axis and the z-axis defining a yz plane, the reference axis extending along the x-axis, the incident beam direction being defined by an angle $\delta xy$ formed between the x-axis and an orthogonal projection component of the incident light beam in the xy plane and another angle $\delta xz$ formed between the x-axis and an orthogonal projection component of the incident light beam in the xz plane,
wherein the optical element includes a first optical element and a second optical element, which are arranged along the reference axis, the first optical element receiving the incident light beam and outputting an intermediate light beam, the second optical element receiving the intermediate light beam and outputting an output light beam, wherein the first optical element is formed of a light-transmissive member having a refractive index n and including:
  a first light incident surface receiving the incident light beam in the incident beam direction; and
  a first light emitting surface emitting the intermediate light beam in an intermediate beam direction which is defined with respect to the reference axis, the first light incident surface and the first light emitting surface forming an angle $\alpha_1$ therebetween, the angle $\alpha_1$ having a value substantially equal to $\delta xy/(n-1)$, and defining a first imaginary normal plane, which is orthogonal to both the first light incident surface and the first light emitting surface and which extends along the reference axis,
the first optical element being disposed with the first imaginary normal plane being oriented to extend along the xy plane, thereby outputting the intermediate light beam in the intermediate beam direction that extends parallel to the xz plane; and
wherein the second optical element is formed of another light-transmissive member having a refractive index n and including:
  a second light incident surface receiving the intermediate light beam in the intermediate beam direction; and
  a second light emitting surface emitting the output light beam in the output beam direction which is defined with respect to the reference axis, the second light incident surface and the second light emitting surface forming an angle $\alpha_2$ therebetween, the angle $\alpha_2$ having a value substantially equal to $\delta xz/(n-1)$, and defining a second imaginary normal plane, which is orthogonal to both the second light incident surface and the second light emitting surface and which extends along the reference axis,
the second optical element being disposed with the second imaginary normal plane being oriented to extend along the xz plane, thereby outputting the output light beam in the output beam direction that extends parallel to the xy plane, resulting in that the output beam direction extends parallel with the x axis.

3. A beam-emission-angle compensating optical unit for correcting a beam emission angle, comprising:
  an optical element formed of a light-transmissive member having a refractive index n, including:
    a light incident surface receiving an incident light beam in an incident beam direction which is defined with respect to a reference axis;
    a light emitting surface emitting an output light beam in an output beam direction which is defined with respect to the reference axis, the light incident surface and the light emitting surface forming an angle $\alpha$ therebetween and defining an imaginary normal plane, which is orthogonal to both the light incident surface and the light emitting surface and which extends along the reference axis, the output beam direction being shifted by an angle $\delta$ from the incident beam direction, the angle $\delta$ having a value that depends on the refractive index n, the angle $\alpha$, and a rotational position of the imaginary normal plane relative to the reference axis; and
  a holding unit holding the optical element rotatably about the reference axis;
wherein the reference axis is defined in an xyz space, the xyz space being defined by x-axis, y-axis, and z-axis that are orthogonal to one another, the x-axis and the y-axis defining an xy plane, the x-axis and the z-axis defining an xz plane, and the y-axis and the z-axis defining a yz plane, the reference axis extending along the z-axis,
the incident beam direction being defined by an angle $\gamma_{1yz}$ formed between the z-axis and an orthogonal projection component of the incident light beam in the yz plane and by another angle $\gamma_{1xz}$ formed between the z-axis and an orthogonal projection component of the incident light beam in the xz plane;
wherein the angle $\alpha$ satisfies inequalities:

$$-1 \leq \gamma_{1yz}/((n-1)\alpha) \leq 1 \text{ and } -1 \leq \gamma_{1xz}/((n-1)\alpha) \leq 1,$$

wherein the holding unit orients the imaginary normal plane of the optical element to form a rotational angle $\phi$ from the yz plane around the z-axis, and
wherein the light emitting surface emits the output light beam with an angle $\beta_{yz}$ defined between the z-axis and an orthogonal projection component of the output light beam in the yz plane and an angle $\beta_{xz}$ defined between the z-axis and another orthogonal projection component of the output light beam in the xz plane, the angles $\beta_{yz}$ and $\beta_{xz}$ satisfying equations:

$$\beta_{yz} = (n-1)\alpha \cdot \cos\phi - \gamma_{1yz} \text{ and}$$

$$\beta_{xz} = (n-1)\alpha \cdot \sin\phi - \gamma_{1xz}.$$

4. The beam-emission-angle compensating optical unit as claimed in claim 3, wherein the output beam direction extends parallel with the xz plane where the rotational angle $\phi$ satisfies an equation of $\beta_{yz} = 0 = (n-1)\alpha \cdot \cos\phi - \gamma_{1yz}$.

5. The beam-emission-angle compensating optical unit as claimed in claim 3, wherein the output beam direction extends parallel with the yz plane where the rotational angle $\phi$ satisfies an equation of $\beta_{xz} = 0 = (n-1)\alpha \cdot \sin\phi - \gamma_{1xz}$.

6. A beam-emission-angle compensating optical unit for correcting a beam emission angle, comprising:
  an optical element formed of a light-transmissive member having a refractive index n, including:
    a light incident surface receiving an incident light beam in an incident beam direction which is defined with respect to a reference axis; and
    a light emitting surface emitting an output light beam in an output beam direction which is defined with respect to the reference axis, the light incident surface and the light emitting surface forming an angle $\alpha$ therebetween and defining an imaginary normal plane, which is orthogonal to both the light incident surface and the light emitting surface and which extends along the reference axis, the output beam direction being shifted by an angle $\delta$ from the incident beam direction, the angle $\delta$ having a value that depends on the refractive index n, the angle $\alpha$, and a rotational position of the imaginary normal plane relative to the reference axis; and
  a holding unit holding the optical element rotatably about the reference axis;
wherein the reference axis is defined in an xyz space, the xyz space being defined by x-axis, y-axis, and z-axis that are orthogonal to one another, the x-axis and the y-axis define an xy plane, the x-axis and the z-axis define an xz plane, and the y-axis and the z-axis define a yz plane, the reference axis extending along the z-axis,
the incident beam direction being defined by an angle $\gamma_{1yz}$ formed between the z-axis and an orthogonal projection component of the incident light beam in the yz plane and by another angle $\gamma_{1xz}$ formed between the z-axis and an orthogonal projection component of the incident light beam in the xz plane;

wherein the optical element includes a first optical element and a second optical element, which are arranged along the reference axis, the first optical element receiving the incident light beam and outputting an intermediate light beam, the second optical element receiving the intermediate light beam and outputting the output light beam, wherein the holding unit includes:
  a first holding unit holding the first optical element rotatably about the reference axis; and
  a second holding unit holding the second optical element rotatably about the reference axis independently from the first optical element, wherein the first optical element is formed of a light-transmissive member having a refractive index n and including:
  a first light incident surface receiving the incident light beam in the incident beam direction; and
  a first light emitting surface emitting the intermediate light beam in an intermediate beam direction which is defined with respect to the reference axis, the first light incident surface and the first light emitting surface forming an angle α therebetween and defining a first imaginary normal plane, which is orthogonal to both the first light incident surface and the first light emitting surface and which extends along the reference axis, wherein the second optical element is formed of another light-transmissive member having a refractive index n and including:
  a second light incident surface receiving the intermediate light beam in the intermediate beam direction; and
  a second light emitting surface emitting the output light beam in the output beam direction which is defined with respect to the reference axis, the second light incident surface and the second light emitting surface forming the angle α therebetween, and defining a second imaginary normal plane, which is orthogonal to both the second light incident surface and the second light emitting surface and which extends along the reference axis, wherein the angle α satisfies the inequalities:

$$-2 \leq \gamma_{1yz}/((n-1)\alpha) \leq 2 \text{ and } -2 \leq \gamma_{1xz}/((n-1)\alpha) \leq 2,$$

wherein the first holding unit orients the first imaginary normal plane to form a rotational angle $\phi_1$ from the yz plane around the z-axis, wherein the second holding unit orients the second imaginary normal plane to form a rotational angle $\phi_2$ from the yz plane around the z-axis, and wherein the second light emitting surface of the second optical element emits the output light beam with an angle $\beta_{yz}$ defined between the z-axis and an orthogonal projection component of the output light beam in the yz plane and an angle $\beta_x$ defined between the z-axis and another orthogonal projection component of the output light beam in the xz plane, the angles $\beta_{yz}$ and $\beta_{xz}$ satisfying equations:

$$\beta_{yz}=(n-1)\alpha \cdot (\cos \phi_1 + \cos \phi_2) - \gamma_{1yz} \text{ and}$$

$$\beta_{xz}=(n-1)\alpha \cdot (\sin \phi_1 + \sin \phi_2) - \gamma_{1xz}.$$

7. The beam-emission-angle compensating optical unit as claimed in claim 6, wherein the output beam direction extends parallel with the z-axis where the rotational angles $\phi_1$ and $\phi_2$ satisfy equations of:

$$\beta_{yz}=0=(n-1)\alpha \cdot (\cos \phi_1 + \cos \phi_2) - \gamma_{1yz} \text{ and}$$

$$\beta_{xz}=0=(n-1)\alpha \cdot (\sin \phi_1 + \sin \phi_2) - \gamma_{1xz}.$$

8. A beam-emission-angle compensating optical unit for correcting a beam emission angle, comprising:
  an optical element formed of a light-transmissive member having a refractive index n, including:
    a light incident surface receiving an incident light beam in an incident beam direction which is defined with respect to a reference axis; and
    a light emitting surface emitting an output light beam in an output beam direction which is defined with respect to the reference axis, the light incident surface and the light emitting surface forming an angle α therebetween and defining an imaginary normal plane, which is orthogonal to both the light incident surface and the light emitting surface and which extends along the reference axis, the output beam direction being shifted by an angle δ from the incident beam direction, the angle δ having a value that depends on the refractive index n, the angle α, and a rotational position of the imaginary normal plane relative to the reference axis; and
  a holding unit holding the optical element rotatably about the reference axis;

wherein the reference axis is defined in an xyz space, the xyz space being defined by x-axis, y-axis, and z-axis that are orthogonal to one another, the x-axis and the y-axis define an xy plane, the x-axis and the z-axis define an xz plane, and the y-axis and the z-axis define a yz plane, the reference axis extending along the z-axis, the incident beam direction being defined by an angle $\gamma_{1yz}$ formed between the z-axis and an orthogonal projection component of the incident light beam in the yz plane and by another angle $\gamma_{1xz}$ formed between the z-axis and an orthogonal projection component of the incident light beam in the xz plane;

wherein the optical element includes a first optical element and a second optical element, which are arranged along the reference axis, the first optical element receiving the incident light beam and outputting an intermediate light beam, the second optical element receiving the intermediate light beam and outputting the output light beam, wherein the holding unit includes:
  a first holding unit holding the first optical element fixedly about the reference axis; and
  a second holding unit holding the second optical element rotatably about the reference axis independently from the first optical element, wherein the first optical element is formed of a light-transmissive member having a refractive index n and including:
  a first light incident surface receiving the incident light beam in the incident beam direction; and
  a first light emitting surface emitting the intermediate light beam in an intermediate beam direction which is defined with respect to the reference axis, the first light incident surface and the first light emitting surface forming an angle α therebetween and defining a first imaginary normal plane, which is orthogonal to both the first light incident surface and the first light emitting surface and which extends along the reference axis, wherein the second optical element is formed of another light-transmissive member having a refractive index n and including:

a second light incident surface receiving the intermediate light beam in the intermediate beam direction; and a second light emitting surface emitting the output light beam in the output beam direction which is defined with respect to the reference axis, the second light incident surface and the second light emitting surface forming the angle $\alpha$ therebetween, and defining a second imaginary normal plane, which is orthogonal to both the second light incident surface and the second light emitting surface and which extends along the reference axis, wherein the angle $\alpha$ satisfies the inequalities:

$$0 \leq \gamma_{1yz}/((n-1)\alpha) \leq 2 \text{ and } -1 \leq \gamma_{1xz}/((n-1)\alpha) \leq 1,$$

wherein the first holding unit orients the first imaginary normal plane to form a rotational angle $\phi_1$ of a zero degree (0°) from the yz plane around the z-axis, wherein the second holding unit orients the second imaginary normal plane to form a rotational angle $\phi_2$ from the yz plane around the z-axis, and wherein the second light emitting surface of the second optical element emits the output light beam with an angle $\beta_{yz}$ defined between the z-axis and an orthogonal projection component of the output light beam in the yz plane and an angle $\beta_{xz}$ defined between the z-axis and another orthogonal projection component of the output light beam in the xz plane, the angles $\beta_{yz}$ and $\beta_{xz}$ satisfying equations:

$$\beta_{yz}=(n-1)\alpha\cdot(1+\cos \phi_2)-\gamma_{1yz} \text{ and}$$

$$\beta_{xz}=(n-1)\alpha\cdot\sin \phi_2-\gamma_{1xz}.$$

9. The beam-emission-angle compensating optical unit as claimed in claim 8, wherein the output beam direction extends parallel with the xz plane where the rotational angle $\phi_2$ satisfies an equation of $\beta_{yz}=0=(n-1)\alpha\cdot(1+\cos \phi_2)-\gamma_{1yz}$.

10. The beam-emission-angle compensating optical unit as claimed in claim 8, wherein the output beam direction extends parallel with the yz plane where the rotational angle $\phi_2$ satisfies an equation of $\beta_{xz}=0=(n-1)\alpha\cdot\sin \phi_2-\gamma_{1xz}$.

11. A beam-emission-angle compensating optical unit for correcting a beam emission angle, comprising:

an optical element formed of a light-transmissive member having a refractive index n, including:

a light incident surface receiving an incident light beam in an incident beam direction which is defined with respect to a reference axis; and a light emitting surface emitting an output light beam in an output beam direction which is defined with respect to the reference axis, the light incident surface and the light emitting surface forming an angle $\alpha$ therebetween, the angle $\alpha$ having a value that depends on the refractive index n;

wherein the light incident surface and the light emitting surface define an imaginary normal plane, which is orthogonal to both the light incident surface and the light emitting surface and which extends along the reference axis, the incident light direction being shifted from the reference axis with an angle $\theta$, the angle $\alpha$ having a value that substantially satisfies an equation $\alpha=\theta/(n-1)$ and that allows the output beam direction to be parallel with the reference axis.

12. The beam-emission-angle compensating optical unit as claimed in claim 11, wherein the reference axis extends normal to the light incident surface, and wherein the angle $\alpha$ satisfies an inequality $1.1\theta \leq \alpha \leq 2.2\theta$.

13. The beam-emission-angle compensating optical unit as claimed in claim 11, wherein the reference axis extends normal to the light incident surface, wherein the refractive index n is within a range $1.45 \leq n \leq 1.55$, and the angle $\alpha$ satisfies an equation $\alpha=2\theta$.

14. A beam-emission-angle compensating optical unit for correcting a beam emission angle, comprising:

a wedge prism formed of a light-transmissive member and including:

a first surface receiving an incident light beam; and a second surface emitting an output light beam, the first surface and the second surface forming an apex angle $\alpha$; and a holding unit holding the wedge prism such that the wedge prism is capable of rotating about a reference axis, the holding unit holding the wedge prism at a rotational angle about the reference axis from a reference rotational position;

wherein the wedge prism includes a first wedge prism and a second wedge prism which are arranged along the reference axis, the first optical element receiving the incident light beam and outputting an intermediate light beam, the second optical element receiving the intermediate light beam and outputting the output light beam;

wherein the holding unit includes:

a first holding unit holding the first wedge prism; and a second holding unit holding the second wedge prism, wherein the reference axis is defined in an xyz space, the xyz space being defined by x-axis, y-axis, and z-axis that are orthogonal to each other;

wherein the reference rotational position is defined by the yz plane and the reference axis is the z-axis such that the first and second wedge prisms are disposed at the rotational angles $\phi_1$ and $\phi_2$ around the z-axis respectively from the yz plane; and wherein the apex angle $\alpha$ satisfies the inequalities:

$$-2 \leq \gamma_{1yz}/((n-1)\alpha) \leq 2 \text{ and } -2 \leq \gamma_{1xz}/((n-1)\alpha) \leq 2,$$

wherein an angle $\gamma_{1yz}$ is formed between the z-axis and an orthogonal projection component of the incident light beam in the yz plane, and an angle $\gamma_{1xz}$ is formed between the z-axis and another orthogonal projection component of the incident light beam in the xz plane, and wherein the rotational angles $\phi_1$ and $\phi_2$ satisfy equations;

$$\beta_{yz}=(n-1)\alpha\cdot(\cos \phi_1+\cos \phi_2)-\gamma_{1yz} \text{ and}$$

$$\beta_{xz}=(n-1)\alpha\cdot(\sin \phi_1+\sin \phi_2)-\gamma_{1xz},$$

wherein an angle $\beta_{yz}$ is formed between the z-axis and an orthogonal projection component of the output light beam in the yz plane, and an angle $\beta_{xz}$ is formed between the z-axis and another orthogonal projection component of the output light beam in the xz plane.

* * * * *